(12) United States Patent
Thompson et al.

(10) Patent No.: US 7,877,312 B2
(45) Date of Patent: *Jan. 25, 2011

(54) APPARATUS AND METHOD FOR DISPLAYING TRADING TRENDS

(75) Inventors: George Thompson, Carrollton, TX (US); Greg Schardt, Plano, TX (US)

(73) Assignee: WGAL, LLP, Plano, TX (US)

( * ) Notice: Subject to any disclaimer, the term of this patent is extended or adjusted under 35 U.S.C. 154(b) by 939 days.

This patent is subject to a terminal disclaimer.

(21) Appl. No.: 10/691,227

(22) Filed: Oct. 22, 2003

(65) Prior Publication Data

US 2004/0133500 A1 Jul. 8, 2004

Related U.S. Application Data

(63) Continuation-in-part of application No. 09/888,040, filed on Jun. 23, 2001, now abandoned.

(60) Provisional application No. 60/213,576, filed on Jun. 22, 2000.

(51) Int. Cl.
*G06Q 40/00* (2006.01)
(52) U.S. Cl. .......................... 705/37; 705/28
(58) Field of Classification Search ............ 705/37, 705/35
See application file for complete search history.

(56) References Cited

U.S. PATENT DOCUMENTS

| | | | | |
|---|---|---|---|---|
| 5,347,452 A | * | 9/1994 | Bay, Jr. ................. | 705/37 |
| 5,689,651 A | * | 11/1997 | Lozman ................. | 705/37 |
| 5,897,621 A | * | 4/1999 | Boesch et al. ......... | 705/26 |
| 6,211,880 B1 | * | 4/2001 | Impink, Jr. ............. | 345/418 |
| 6,772,132 B1 | | 8/2004 | Kemp, II et al. | |
| 6,772,146 B2 | * | 8/2004 | Khemlani et al. ...... | 705/36 R |
| 6,792,399 B1 | * | 9/2004 | Phillips et al. ......... | 705/36 R |
| 6,882,985 B1 | * | 4/2005 | Kay et al. .............. | 705/37 |
| 6,897,867 B2 | * | 5/2005 | Katayama .............. | 345/440 |
| 6,993,504 B1 | * | 1/2006 | Friesen et al. .......... | 705/37 |
| 7,043,449 B1 | * | 5/2006 | Li et al. ................. | 705/36 R |
| 7,130,789 B2 | * | 10/2006 | Glodjo et al. .......... | 705/37 |
| 7,171,384 B1 | * | 1/2007 | Fitzpatrick et al. ..... | 705/36 R |
| 7,194,434 B2 | * | 3/2007 | Piccioli ................. | 705/36 R |
| 7,461,023 B1 | * | 12/2008 | Helweg ................. | 705/37 |
| 2001/0042037 A1 | * | 11/2001 | Kam et al. ............. | 705/36 |

(Continued)

OTHER PUBLICATIONS

Babcock, B., "Trend Indicators and Price Components," Reality Based Trading Company, 1999, pp. 1-3.

*Primary Examiner*—Ella Colbert
*Assistant Examiner*—John A Anderson
(74) *Attorney, Agent, or Firm*—Daniel J. Chalker; Chalker Flores, LLP

(57) ABSTRACT

The present invention provides an apparatus and method of determining and displaying trading trends for an investment underlying one or more options wherein an opening value and a closing value for the underlying investment for two or more time intervals is obtained. An opening value trend using a market trend indicator and the opening values for the investment is calculated, and a closing value trend using the market trend indicator and the closing values for the underlying investment is calculated. A visual indicator comparing the opening value trend to the closing value trend for the underlying investment is then displayed. This method may be incorporated into a computer program embodied in a computer readable medium using code segments to accomplish the method described above.

35 Claims, 42 Drawing Sheets

U.S. PATENT DOCUMENTS

| | | | |
|---|---|---|---|
| 2001/0056398 A1* | 12/2001 | Scheirer | 705/38 |
| 2002/0055899 A1* | 5/2002 | Williams | 705/37 |
| 2002/0069152 A1* | 6/2002 | B.C et al. | 705/37 |
| 2002/0087455 A1* | 7/2002 | Tsagarakis et al. | 705/37 |
| 2002/0156722 A1* | 10/2002 | Greenwood | 705/37 |
| 2002/0161692 A1* | 10/2002 | Loh et al. | 705/37 |
| 2002/0184134 A1* | 12/2002 | Olsen et al. | 705/37 |
| 2002/0194114 A1* | 12/2002 | Erdmier | 705/37 |
| 2003/0088495 A1 | 5/2003 | Gilbert et al. | |
| 2005/0187866 A1* | 8/2005 | Lee | 705/39 |
| 2006/0271475 A1* | 11/2006 | Brumfield et al. | 705/39 |
| 2007/0078755 A1* | 4/2007 | Olsen et al. | 705/37 |

* cited by examiner

APPARATUS AND METHOD FOR DISPLAYING TRADING TRENDS

PRIORITY CLAIM

This patent application is a continuation-in-part of U.S. patent application Ser. No. 09/888,040 filed on Jun. 22, 2001, which is a U.S. non-provisional patent application of U.S. provisional patent application Ser. No. 60/213,576 filed on Jun. 22, 2000.

FIELD OF THE INVENTION

The present invention relates in general to the field of investment software and more particularly to an apparatus and method for providing a visual display of a two-line crossover method signaling buying and selling opportunities of stock options and accompanying trading strategies.

BACKGROUND OF THE INVENTION

With the advent of electronic trading, it is more critical than ever to make appropriate entry and exit decisions quickly to maximize profits while minimizing losses. This is especially true with options trading. The options investor can be easily overwhelmed by the vast amount of information about particular options within an underlying equity, the equity itself, and the multiple calculations and formulations within various options trading strategies. In addition, when investors trade the live market without any trend indication relative to the stock or option being traded, they are not trading with the trend. As each option has a particular strike price and an expiration date, timing is critical in determining an investor's success. Although not every equity holds options, there may be multiple options available within an optionable stock. Without the proper tools, an investor may spend many hours of time calculating which of these options and strategies offer greater leverage and risk/reward ratio.

There is, therefore, a need for an apparatus and method to analyze market data and develop trade information, which reduces the risk and loss for the investor. There is also a need for an apparatus and method to provide the investor with greater order entry/exit guidance than might be received through a broker, through the investor's own mathematical calculations, or through monitoring the raw market data.

SUMMARY OF THE INVENTION

The present invention related to investment software and provides an apparatus and method for displaying trading trends and performing options calculations. Such an apparatus and method can be used, for example, to display signals for buying and selling opportunities of stock options. The present invention can be used by anyone interested in investments, such as individual investors, investment brokers and mutual fund managers. As a result, the present invention provides an apparatus and method for minimizing risk when trading in the market, displaying investment movement and trends, and identifying investments that have a specific trend.

The present invention can be used to analyze market data and develop trade information, which reduces the risk and loss for the investor. Thus, traders of stock options can manage their investment portfolios from their home, office or location of their choice. By providing them with greater order entry/exit guidance than might be received through a broker or through calculating or monitoring their own raw data, the present invention enables the trader to make better trade decisions because it is easier to track the performance of the stock option and underlying equity.

In addition, the present invention extrapolates trade trends in a selected investment and provides the investor with current price information, trade trends, trade indicators, fundamental information relative to the stock option, Bullish, Bearish and Neutral strategies, and active trade information. The investor can watch for an intersection cross of the trade trends and, guided by colors, take the appropriate action. For example, the color green may indicate that the price of the selected investment is going up and signal the investor that it is time to buy a call or sell a put. Conversely, the color red may indicate that the price is going down and signal the investor that it is time to sell a call or buy a put. Other colors can be used. The present invention also shows the number of options contracts, the strike price, and the last active price per share of the underlying security. Trade indicators with time intervals (short-term, mid-term and long-term) are also color coded. These time intervals allow the investor to monitor the time to best apply the trade.

The present invention allows the investor to access market information or trade data via Internet web sites, dial-up and other network connections and enter the symbol for a security to view a two-line crossover chart indicating the trend of the stock. Based upon the chart, the investor selects various strategies which display data indicating desirable trade opportunities. Locating and identifying these trend friendly trades reduces risk. The present invention will also alert the investor when an exit of an investment should occur.

The present invention provides an apparatus for determining and displaying trading trends for an investment underlying one or more options having a computer and a display. The computer is communicably connected to a market information source, and the display is communicably connected to the computer. The computer receives an opening value and a closing value for the underlying investment for two or more time intervals from the market information source, calculates an opening value trend using a market trend indicator and the opening values for the underlying investment, calculates a closing value trend using the market trend indicator and the closing values for the underlying investment, and displays a visual indicator comparing the opening value trend to the closing value trend for the underlying investment on the display.

In addition, the present invention provides a method of determining and displaying trading trends for an investment underlying one or more options. Market information is obtained for the underlying investment for two or more time intervals. An opening value trend is calculated using a market trend indicator and the opening values for the underlying investment. A closing value trend is also calculated using the market trend indicator and the closing values for the underlying investment. Thereafter, a visual indicator is displayed comparing the opening value trend to the closing value trend for the underlying investment. This method may be incorporated into a computer program embodied in a computer readable medium using code segments to accomplish the method described above.

Other features and advantages of the present invention will be apparent to those of ordinary skill in the art upon reference to the following detailed description taken in conjunction with the accompanying drawings.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts in which.

DETAILED DESCRIPTION OF THE INVENTION

Figure 1:
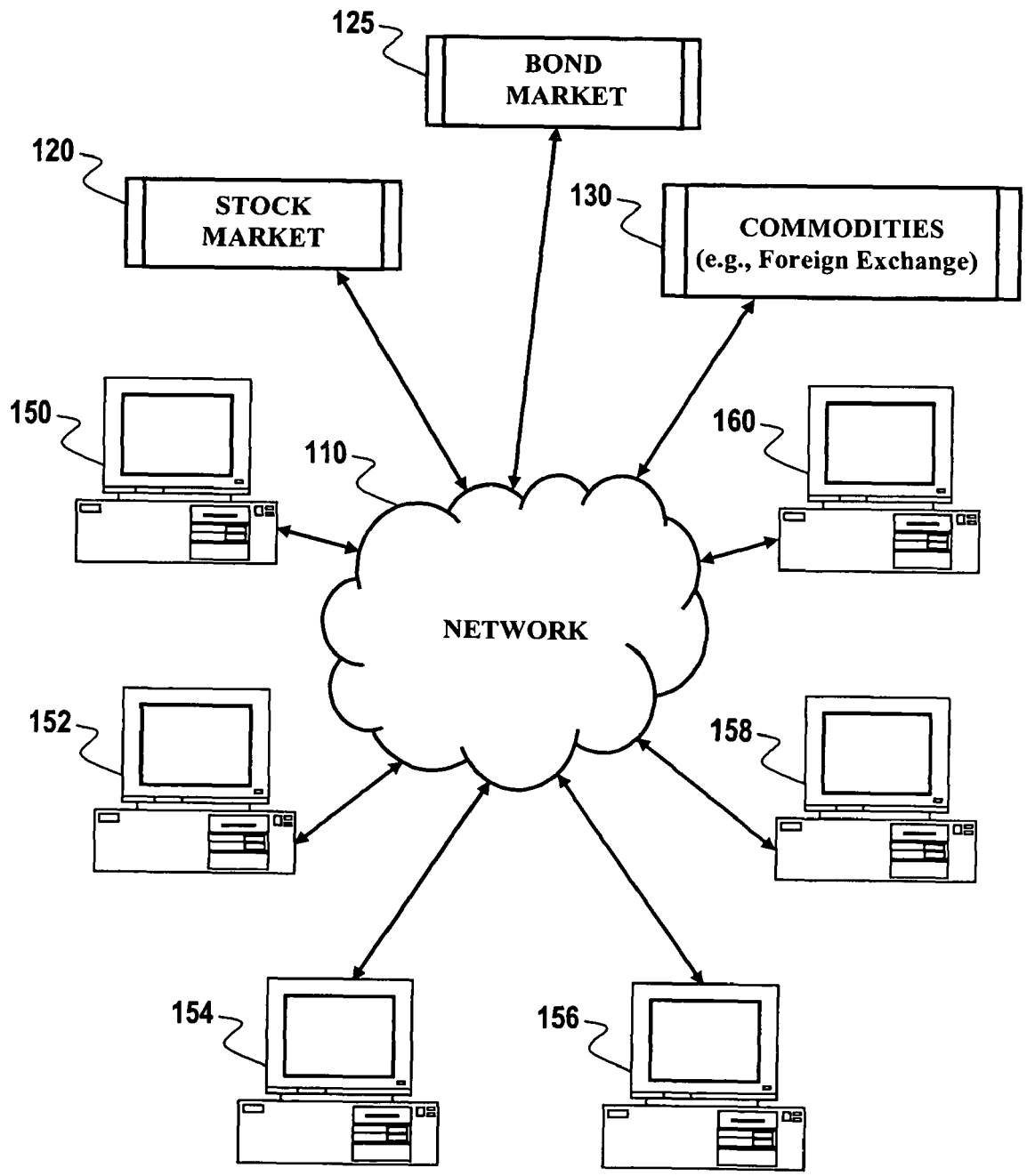
FIG. 1 is a block diagram illustrating the possible interaction between data systems in accordance with one embodiment of the present invention.

It should be understood that the principles and applications disclosed herein can be applied to a wide range of trading scenarios, such as stocks, bonds and commodities. For purposes of explanation and illustration, the present invention is hereafter described in reference to the management of investment portfolios. The present invention related to investment software and provides an apparatus and method for displaying trading trends and performing options calculations. Such an apparatus and method can be used, for example, to display signals for buying and selling opportunities of stock options. The present invention can be used by anyone interested in investments, such as individual investors, investment brokers and mutual fund managers. As a result, the present invention provides an apparatus and method for minimizing risk when trading in the market, displaying investment movement and trends, and identifying investments that have a specific trend.

The present invention can be used to analyze market data and develop trade information, which reduces the risk and loss for the investor. Thus, traders of stock options can manage their investment portfolios from their home, office or location of their choice. By providing them with greater order entry/exit guidance than might be received through a broker or through calculating or monitoring their own raw data, the present invention enables the trader to make better trade decisions because it is easier to track the performance of the stock option and underlying equity.

In addition, the present invention extrapolates trade trends in a selected investment and provides the investor with current price information, trade trends, trade indicators, fundamental information relative to the stock option, Bullish, Bearish and Neutral strategies, and active trade information. The investor can watch for an intersection cross of the trade trends and, guided by colors, take the appropriate action. For example, the color green may indicate that the price of the selected investment is going up and signal the investor that it is time to buy a call or sell a put. Conversely, the color red may indicate that the price is going down and signal the investor that it is time to sell a call or buy a put. Other colors can be used. The present invention also shows the number of options contracts, the strike price, and the last active price per share of the underlying security. Trade indicators with time intervals (short-term, mid-term and long-term) are also color coded. These time intervals allow the investor to monitor the time to best apply the trade.

The present invention allows the investor to access market information or trade data via Internet web sites, dial-up and other network connections and enter the symbol for a security to view a two-line crossover chart indicating the trend of the stock. Based upon the chart, the investor selects various strategies which display data indicating desirable trade opportunities. Locating and identifying these trend friendly trades reduces risk. The present invention will also alert the investor when an exit of an investment should occur.

Now referring to FIG. 1, a block diagram illustrating the possible interaction between data systems in accordance with one embodiment of the present invention is shown. Investors 150, 152, 154, 156, 158 and 160 interact with the various investment markets (Stocks) 120, (Bonds) 125 and (Commodities) 130 via network 110, which may comprise any typical communications network such as telephone, Internet, satellite or any combination thereof. Access to the market information sources or markets 120, 125 and 130 can be achieved through a service specific to each market, or through a third-party server that will allow access to one or more of the markets 120, 125 or 130. Investors 150, 152, 154, 156, 158 and 160 can access the network 110 using a personal computer, workstation or laptop computer. The present invention can be implemented as an application on each investor's computer 150-160, or as a server-based application accessible by investors 150-160 via a network or other communications link. The number of investors 150, 152, 154, 156, 158 and 160 shown in FIG. 1 is simply representative and does not indicate a limitation on the number of investors that may use the present invention at a given time. Nor is the number of investment types or markets 120, 125 and 130 intended to limit the number or types of investments that may analyzed with the present invention.

In one method of accessing the present invention, a personal computer 150-160 equipped with a modem can be used to obtain this data from the market information source or market 120, 125 and 130 via the network 110 at a fee for the exchange in a manner well known in the art. A subscription to a real-time or near-real-time investment reporting system is needed. An example of such a system is PCQuote, which interfaces with the Taltrade ActiveX components. The Taltrade components execute Taltrade Query Language (TQL) commands. These commands retrieve investment information from the markets in real-time. The present invention can use data from multiple sources. The minimum system requirements for a personal computer would be Windows 98/ME/2000/XP/NT 4.0 (Service Pack 3), 64 MB RAM, CD-ROM, 25 MB available hard drive space, an Internet connection and Level I or Level II data feed. The preferred system requirements for a personal computer would be Windows XP, 128 MB RAM, CD-ROM, 25 MB available hard drive space and a high speed Internet connection such as: ISDN, DSL, T1, T3 or cable; or better.

Figure 2:
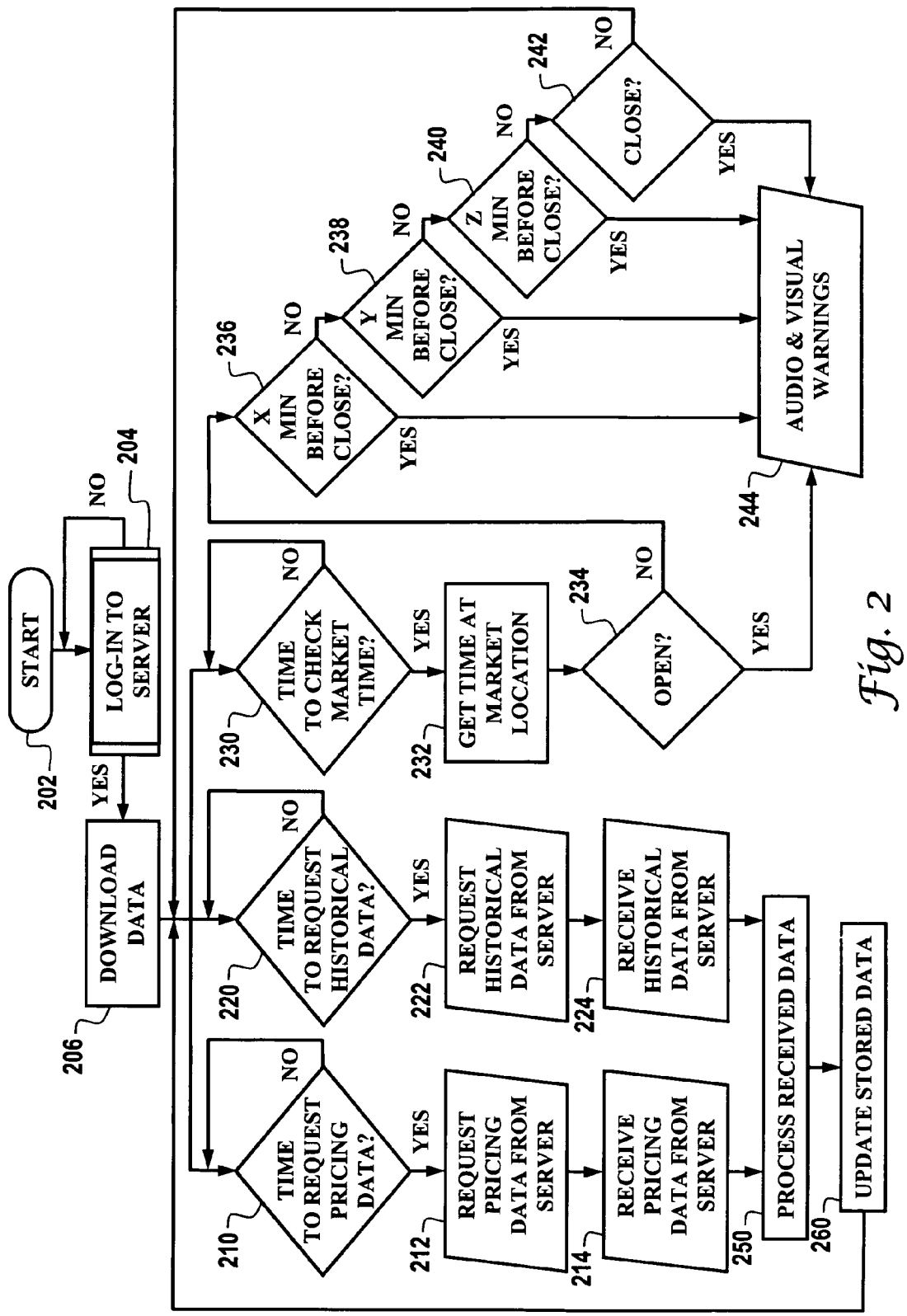
FIG. 2 is a flowchart illustrating the data update process in accordance with one embodiment of the present invention.

Referring now to FIG. 2, a flowchart illustrating the data update process in accordance with one embodiment of the present invention is shown. The present invention starts in block 202 where the investor 150-160 (FIG. 1) selects one or more markets 120, 125 or 130 (FIG. 1) to connect to. The specific servers that may be connected to and the details regarding the connection to be established are typically setup during the installation process of the software. The investor 150-160 (FIG. 1) can change, add or delete available connections and/or markets. Next, the present invention prompts the investor to log-on to a server, which preferably supplies investment information updates in real-time or near-real-time 204. At this point, the present invention downloads investment information in block 206. The download can be performed in a variety of ways. For example, the data may be requested on a regularly scheduled basis, such as every 10 seconds, or in response to the occurrence of some selected event, such as a mouse click. Alternatively, the data may be sent from the market 120, 125, 130 (FIG. 1) or other data source to the investor 150-160 (FIG. 1) on a regularly scheduled basis or in response to the occurrence of some selected event, such as a change in the data. In one embodiment, the data is acquired by executing TQL (Taltrade Query Language) commands through the Taltrade ActiveX components.

These commands are executed on a regular basis by two application timer controls 210 and 220, which send TQL requests to the server at regular intervals via Taltrade controls 212 and 222. Taltrade controls 214 and 224 receive the results from the TQL queries. The results are preferably returned from Taltrade servers in an asynchronous manner. That is, the requests do not have to wait on the returned data. Window events are fired when the results are returned. The present invention then processes the received data 250, which is used to update the stored pricing and volume data 260. Historical data that is retrieved from the Taltrade server is also used to update the stored data 260.

It is beneficial for the investor to be aware of the time at the market location because trading cannot occur prior to the opening of a given market nor after its close. Therefore, a way to notify the investor of the given market's opening and to warn the investor of the given market's impending close also improves the investor's ability to make trade decision. In a preferred embodiment shown in FIG. 2, application timer 230 monitors the time at the market location 232 in order to notify the investor of the opening of the market Setpoint 234 and at several intervals approaching the close of the market Setpoints 236, 238, 240 and 242. If the time at the market location 232 equals the time in any of Setpoints 234, 236, 238, 240 and 242, the investor is notified 244. For example, the opening of the market Setpoint 234 could be 10 a.m., while the intervals approaching the close of the market Setpoints 236, 238, 240 and 242 could be 3:30 p.m., 3:45 p.m., 3:55 p.m. and close at 4 p.m., respectively.

Figure 3:
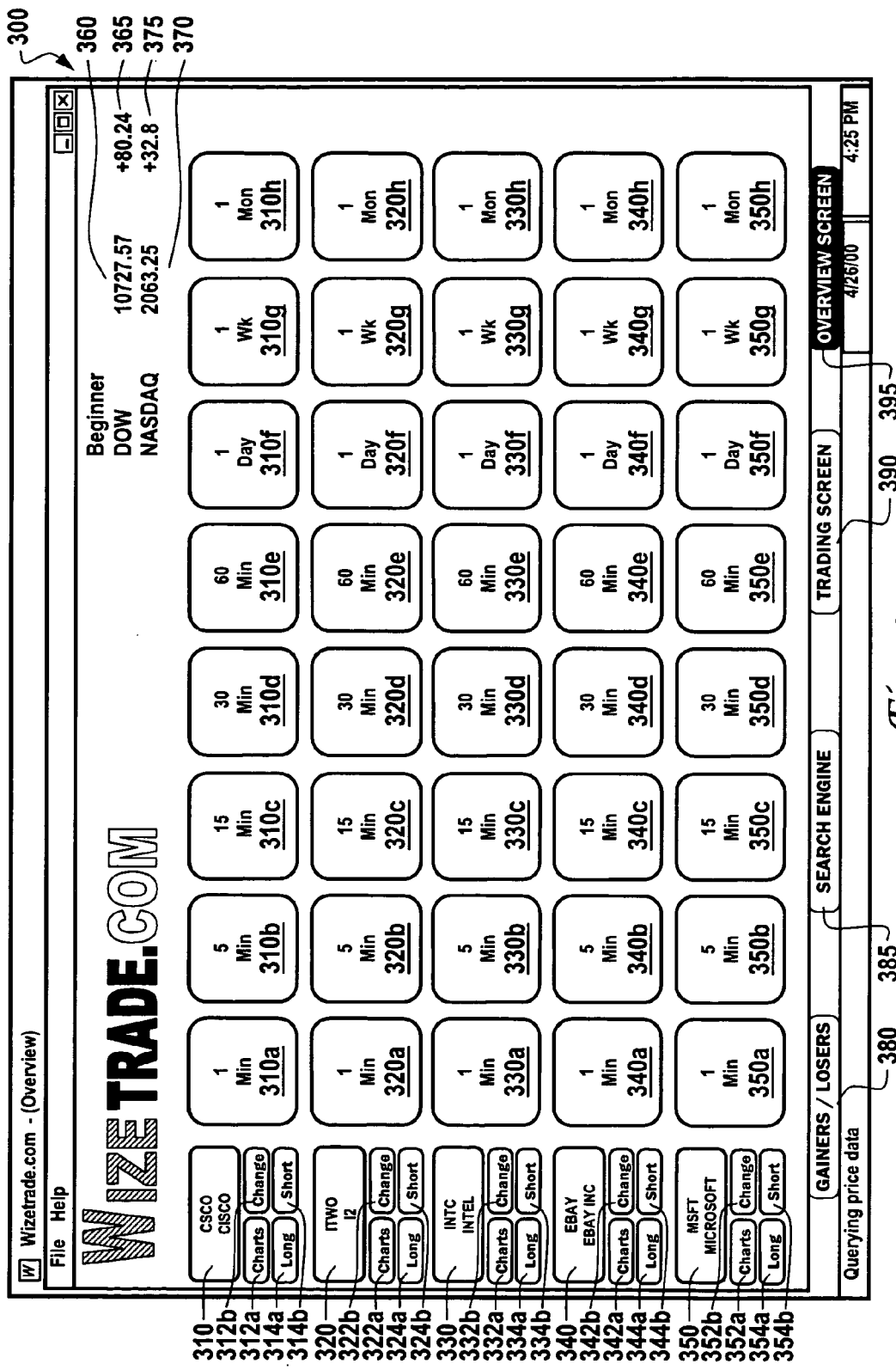
FIG. 3 is the Overview Screen in Overview Mode in accordance with one embodiment of the present invention.

FIG. 3 is the Overview Screen 300 in Overview Mode in accordance with one embodiment of the present invention. The Overview Screen 300 enables the investor to recognize trends and directional movements. This screen is visible most of the time. Overview Screen 300 contains information about several selected investments 310, 320, 330, 340 and 350. In this example, investment 310 is Cisco, 320 is I2, 330 is Intel, 340 is Ebay and 350 is Microsoft. Color coded indicators 310*a*-310*h*, 320*a*-320*h*, 330*a*-330*h*, 340*a*-340*h* and 350*a*-350*h* are displayed for each of the selected investments 310, 320, 330, 340 and 350. These indicators are preferably laid out in a grid fashion, but can be otherwise configured. Each indicator 310*a*-310*h*, 320*a*-320*h*, 330*a*-330*h*, 340*a*-340*h* and 350*a*-350*h* represents information for an associated single investment. Each indicator 310*a*-310*h*, 320*a*-320*h*, 330*a*-330*h*, 340*a*-340*h* and 350*a*-350*h* displays the chosen time interval for that indicator. Time intervals may be in minutes, hours, days, weeks or months. In the example shown, the time interval for indicators 310*a*, 320*a*, 330*a*, 340*a* and 350*a* is one minute; the time interval for indicators 310*b*, 320*b*, 330*b*, 340*b* and 350*b* is five minutes; the time interval for indicators 310*c*, 320*c*, 330*c*, 340*c* and 350*c* is fifteen minutes; the time interval for indicators 310*d*, 320*d*, 330*d*, 340*d* and 350*d* is thirty minutes; the time interval for indicators 310*e*, 320*e*, 330*e*, 340*e* and 350*e* is sixty minutes; the time interval for indicators 310*f*, 320*f*, 330*f*, 340*f* and 350*f* is one day; the time interval for indicators 310*g*, 320*g*, 330*g*, 340*g* and 350*g* is one week; and the time interval for indicators 310*h*, 320*h*, 330*h*, 340*h* and 350*h* is one month.

As will be described below in reference to FIG. 5, the present invention uses a regression analysis to calculate an opening value trend and a closing value trend for each of the time intervals for each of the investments 310, 320, 330, 340 and 350. The color of the indicators 310*a-h*, 320*a-h*, 330*a-h*, 340*a-h* and 350*a-h* is based on a comparison of the opening value trend to the closing value trend for each time interval for each investment 310, 320, 330, 340 and 350, and whether a long trade 314*a*, 324*a*, 334*a*, 344*a* and 354*a* or short trade 314*b*, 324*b*, 334*b*, 344*b* and 354*b* has been selected. If a long trade 314*a*, 324*a*, 334*a*, 344*a* and 354*a* is selected, the indicators 310*a-h*, 320*a-h*, 330*a-h*, 340*a-h* and 350*a-h* will be a first color when the closing value trend is greater than the opening value trend for each time interval for each investment 310, 320, 330, 340 and 350, and a second color when the closing value trend is less than the opening value trend for each time interval for each investment 310, 320, 330, 340 and 350. For example, indicators 310*a*, 310*b*, 310*c*, 310*e*, 310*f*, 310*g*, 310*h*, 320*a*, 320*b*, 320*c*, 320*d*, 320*f*, 320*g*, 320*h*, 330*a*, 330*f*, 330*g*, 330*h*, 340*a*, 340*d*, 340*h*, 350*a*, 350*b* and 350*g* are green in FIG. 3 indicating favorable trading conditions for investments 310, 320, 330, 340 and 350 within the specified time intervals. Indicators 310*d*, 320*e*, 330*b*, 330*c*, 330*d*, 330*e*, 340*b*, 340*c*, 340*e*, 340*f*, 340*g*, 350*c*, 350*d*, 350*e*, 350*f* and 350*h* are red in FIG. 3 indicating unfavorable trading conditions for investments 310, 320, 330, 340 and 350 within the specified time intervals. If, however, a short trade 314*b*, 324*b*, 334*b*, 344*b* and 354*b* is selected, the indicators 310*a-h*, 320*a-h*, 330*a-h*, 340*a-h* and 350*a-h* will be the first color when the closing value trend is less than the opening value trend for each time interval for each investment 310, 320, 330, 340 and 350, and the second color when the closing value trend is greater than the opening value trend for each time interval for each investment 310, 320, 330, 340 and 350. Other colors may be used as the first color or the second color.

Figure 6:
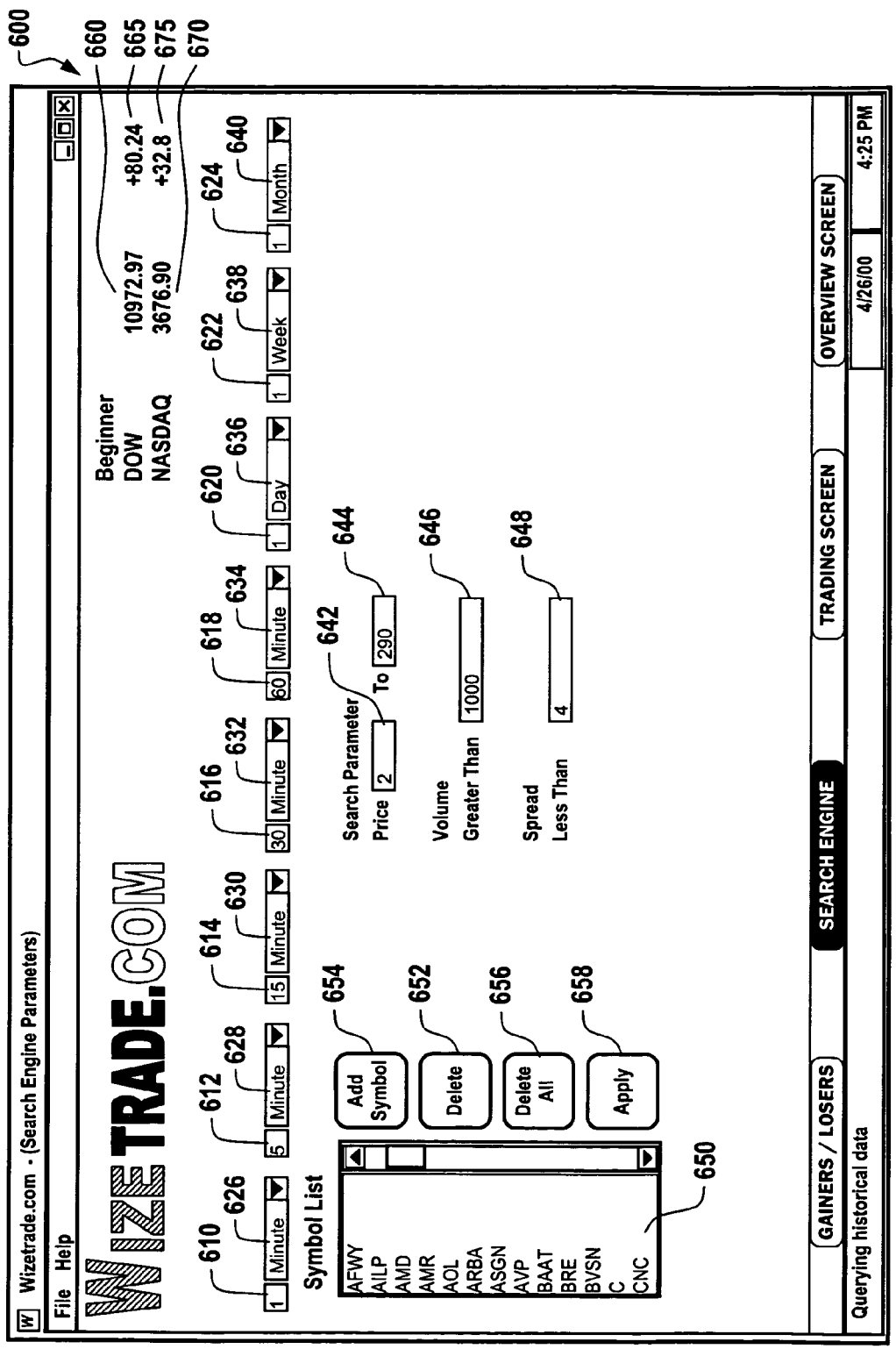
FIG. 6 is the Search Screen in accordance with one embodiment of the present invention.

DOW current totals 360 and 365 and NASDAQ current totals 370 and 375 are also displayed. Chart buttons 312*a*, 322*a*, 332*a*, 342*a* and 352*a* display charts for an associated single investment. For example, chart button 312*a* displays charts for investment 310. Change buttons 312*b*, 322*b*, 332*b*, 342*b* and 352*b* enable the investor to change the associated investment. For example, change button 312*b* changes investment 310. Buttons 380, 385, 390 and 395 enable the investor to navigate through the application screens. This strip of buttons is repeated on each screen and has identical functionality on each screen. For example, selecting button 385 from any screen will take the investor to Search Screen 600 (FIG. 6).

Figure 4:
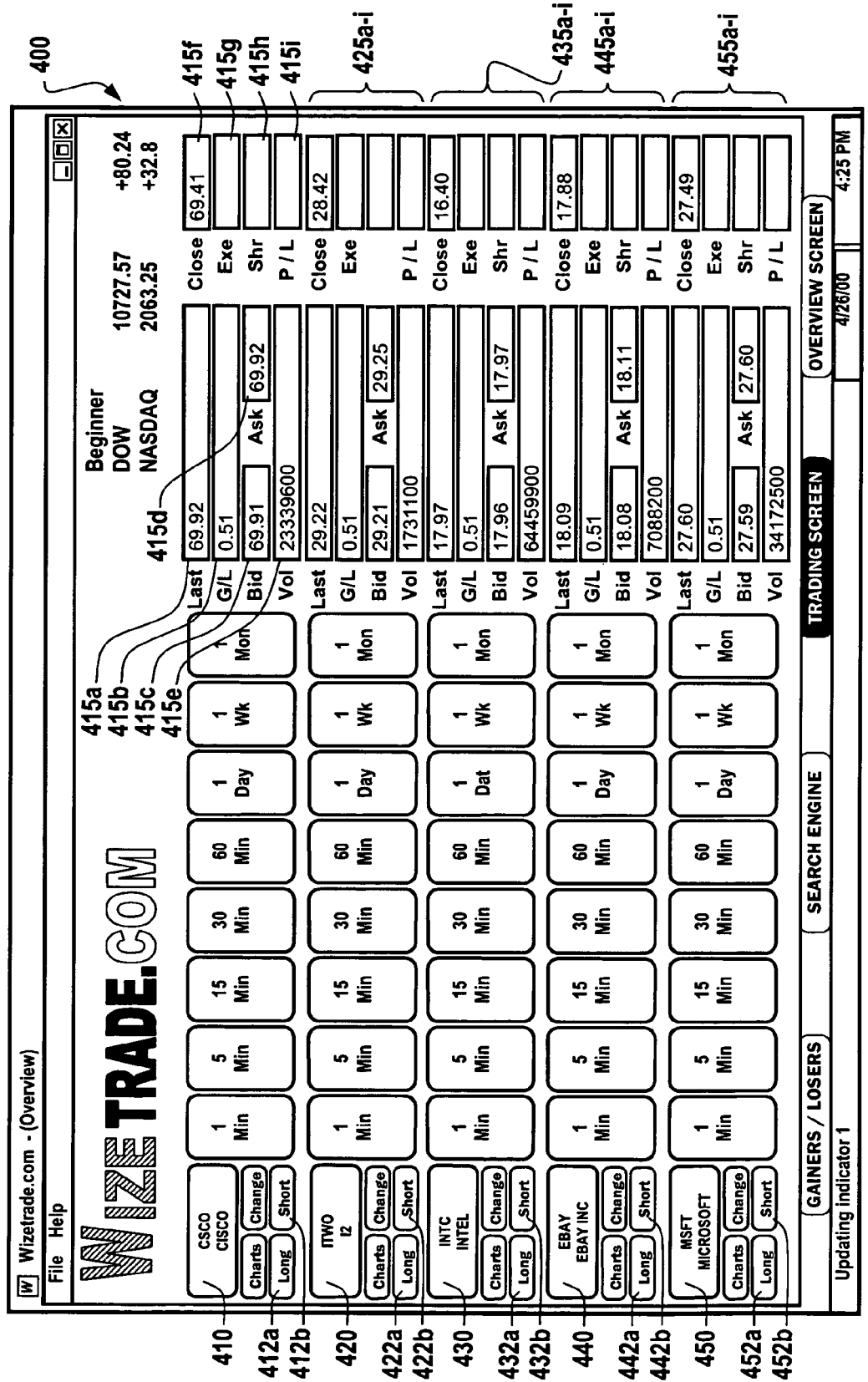
FIG. 4 is the Overview Screen in Trading Mode in accordance with one embodiment of the present invention.

The investor is able to "paper trade" (simulate trading) through Overview Screen 300 by changing to Trading Mode by selecting button 390. FIG. 4, Overview Screen 400 in Trading mode, activates in response to the investor's selection of button 390 (FIG. 3). The elements of Overview Screen 300 (FIG. 3) are decreased in size and pricing and volume information 415*a-i*, 425*a-i*, 435*a-i*, 445*a-i* and 455*a-i* for each associated investment 410, 420, 430, 440 and 450 is added. For example, pricing and volume information 415*a-i* associated with investment 310 is added. Overview Screen 400 in Trading mode displays data such as the last price 415*a*, 425*a*, 435*a*, 445*a* and 455*a*, the dollar amount up or down per investment 415*b*, 425*b*, 435*b*, 445*b* and 455*b*, the bid price 415*c*, 425*c*, 435*c*, 445*c* and 455*c*, the ask price 415*d*, 425*d*, 435*d*, 445*d* and 455*d*, the volume 415*e*, 425*e*, 435*e*, 445*e* and 455*e* and the closing price 415*f*, 425*f*, 435*f*, 445*f* and 455*f* for each investment 410, 420, 430, 440 and 450. The dollar amount up or down per investment 415*b*, 425*b*, 435*b*, 445*b* and 455*b* is displayed with color-coding: green may represent a gain, red may represent a loss, while white may represent either no change or no data. Other color combinations can be used.

To simulate trading, the investor enters execute price (Exe) 415*g*, 425*g*, 435*g*, 445*g* and 455*g* and the amount of an investment bought or shorted (Shr) 415*h*, 425*h*, 435*h*, 445*h* and 455*h* for an associated investment 410, 420, 430, 440 and 450. For example, Exe 415*g* and Shr 315*h* are associated with investment 410. The investor chooses from Long or Short on the paper trades for an associated investment 410, 420, 430, 440 and 450 by selecting a Long button 412*a*, 422*a*, 432*a*, 442*a* and 452*a* or a Short button 412*b*, 422*b*, 432*b*, 442*b* and 452*b* for that investment. For example, Long button 412*a* and Short button 412*b* are associated with investment 410. The results of the simulation are shown in P/L 415*i*, 425*i*, 435*i*, 445*i* and 455*i* for an associated investment 410, 420, 430, 440 and 450. For example, the results of a trading simulation for investment 410 are displayed in P/L 415*i*. The results are displayed with color-coding: green may represent a gain, red may represent a loss, while white may represent either no change or no data. Other color combinations can be used. "Paper Trading" information is not carried over from session to session and is lost when the investor terminates the program. By allowing the investor to practice trading in a live market environment without risking capital, the present invention enables equity tracking for year to date, month to date and specified periods of time.

Figure 5:
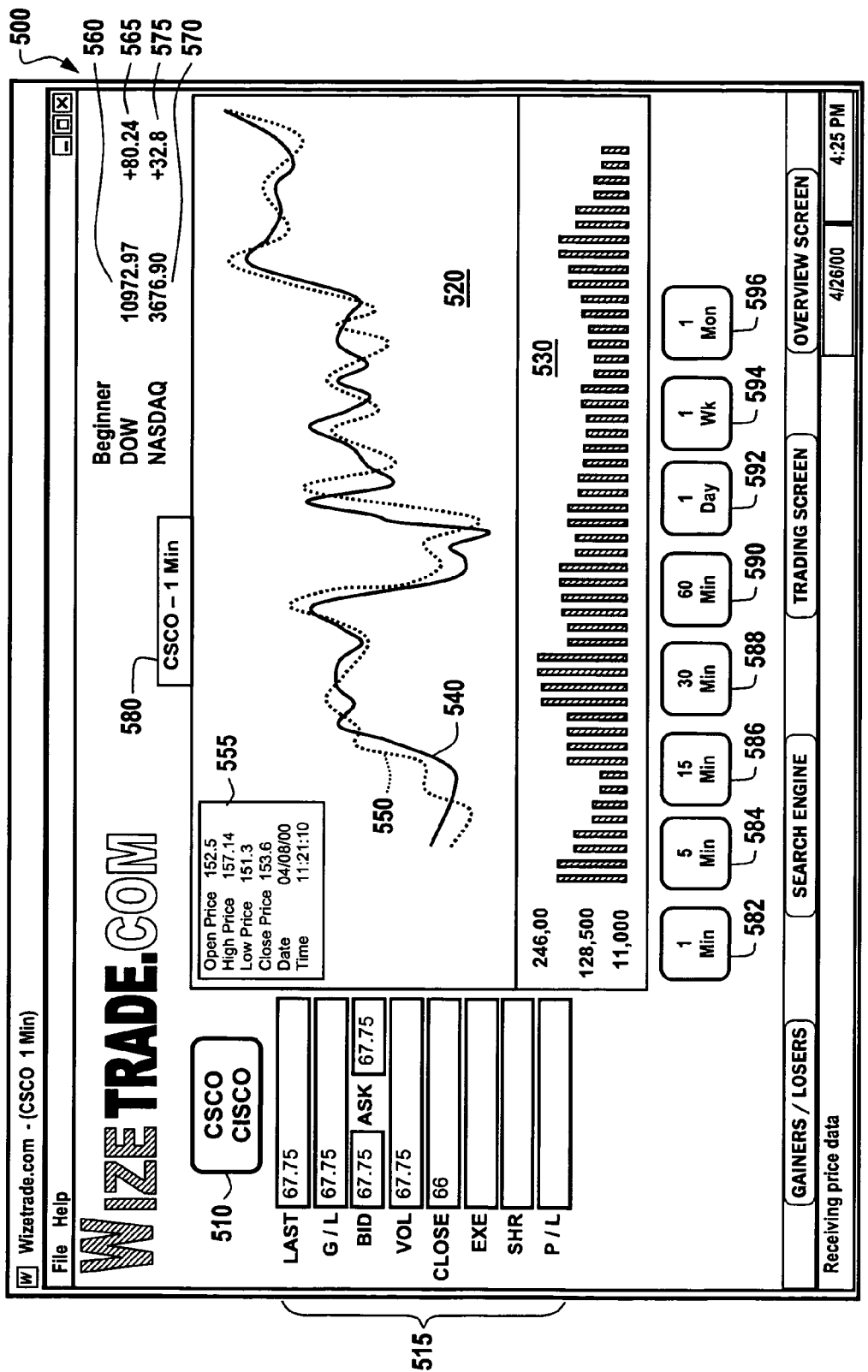
FIG. 5 is the Chart Screen in accordance with one embodiment of the present invention.

FIG. 5, Chart Screen 500, activates in response to the investor's selection of chart buttons 312*a*, 322*a*, 332*a*, 342*a* and 352*a* (FIG. 3). The selection of a specific chart button determines for which investment 310, 320, 330, 340 and 350 (FIG. 3) charts will be displayed. For example, selecting chart button 312*a* (FIG. 3) results in the display of charted data for investment 310 (FIG. 3). The selected investment appears on Chart Screen 500 as 510. A preferred embodiment of the present invention includes the display of updated pricing and volume information 515 and two charts 520 and 530 for investment 510. DOW current totals 560 and 565 and NASDAQ current totals 570 and 575 are also displayed. Chart 520 is the multiple linear regression chart (MLR). Chart 530 is the Volume chart. MLR Chart 520 displays two regression lines 540 and 550, one color coded to indicate opening prices and the other color coded to indicate closing prices. The present invention preferably uses red to indicate opening prices and green to indicate closing prices. Other colors can be used. For purposes of simplification, the following discussion assumes that regression line 540 is red and regression line 550 is green.

Chart interval 580 represents a period of time, which is established by selecting a time interval button 582, 584, 586, 588, 590, 592, 594 and 596. Any position on the green regression line 550 represents a regression of a prior number of period's closing prices. This regression analysis builds and displays a trend of the closing prices of the investment 510 over a period of time. Any position on the red regression line 540 represents a regression of a prior number of period's opening prices. This regression analysis builds and displays a trend of the opening prices of the investment over a period of time. When the green regression line 550 is above the red regression line 540 on the chart, favorable conditions for a long trade occur. When the red regression line 540 is above the green regression line 550 on the chart, favorable conditions for a short trade occur. A critical point occurs where the red regression line 540 and the green regression line 550 cross. When the red regression line 540 crosses the green regression line 550 and ascends above the green regression line 550, the associated time interval indicator 581-588 will become red. When the green regression line 550 crosses the red regression line 540 and ascends above the red regression line 540, the associated time interval indicator 581-588 will become green. These color changes will also occur on indicators 310*a*-310*h*, 320*a*-320*h*, 330*a*-330*h*, 340*a*-340*h* and 350*a*-350*h* (FIG. 3) for the associated investment. There is a separate chart associated with each time interval indicator 582, 584, 586, 588, 590, 592, 594 and 596. As the present invention updates the calculations and the indicators change, the investor can be notified via audible or visual alerts. The present invention can also sent electronic notifications to the investor.

Regression algorithms are well known to those of ordinary skill in the art. The MLR algorithms calculate the red regression line 540 and the green regression line 550 on MLR regression Chart 520. There is a separate regression routine for each time interval indicator 582, 584, 586, 588, 590, 592, 594 and 596. Each routine performs regression analysis on the pricing history for all selected investments 310, 320, 330, 340 and 350 (FIG. 3). There are two regression calculations performed. One is performed on a number of prior consecutive interval closing prices, such as four (4) prior 5-minute interval closing prices. The other regression is performed on a number of prior interval opening prices, such as three (3) prior 5-minute interval opening prices. The current interval's opening price is not included in this calculation. The regression performed on the closing prices is displayed on MLR Chart 520 as the green regression line 550. The regression performed on the opening prices is displayed on MLR Chart 520 as the red regression line 540. The present invention indicates an entry point in the market by the intersection of the green regression line 550 and the red regression line 540.

The investor may obtain more detailed information concerning a specific point along either the green regression line 550 or the red regression line 540 by clicking on the line at the desired point. The present invention will display Infolist 555 containing information about the selected point.

MLR Chart 520 and Volume Chart 530 are only representative of the market trend indicators and analyses available. The selection of multiple linear regression and volume analyses for a preferred embodiment of the present invention does not indicate that the present invention is limited to only those market trend indicators. There are many market trend indicators that the investor can consult to make better trade decisions, such as the following: stochastics, relative strength, directional movement, commodity channel, simple average, exponential average weighted average, MACD (simple), MACD (exponential), momentum/ROC, midrange, William's % R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

FIG. 6, Search Screen 600, activates in response to the investor's selection of button 385 (FIG. 3). It displays the search parameters of Price Min 642, Price Max 644, Volume 646 and Spread 648. These parameters are important to prevent the system from identifying unqualified trade opportunities. The investor can create a custom list 650 of investments, which is kept from session to session. This is done by adding an investment to custom list 650 via Add 654, deleting an investment from custom list 650 via Delete 652 or deleting all the investments on custom list 650 via Delete All 656. The present invention enables the investor to identify and restrict investment price ranges above Price Min 642 and below Price Max 644 and indicate the Volume 646 minimum within the search engine parameters. The investor can input a maximum Spread 648 and the system will not identify any trade opportunity that exceeds maximum Spread 648. The search is activated by selecting Apply 658. The investor may also set units 626, 628, 630, 632, 634, 636, 638 and 640 and time 610, 612, 614, 616, 618, 620, 622 and 624 interval settings for the button indicators illustrated on the preceding figures. These changes are completed by selecting Apply 658. DOW current totals 660 and 665 and NASDAQ current totals 670 and 675 are also displayed.

Figure 7:
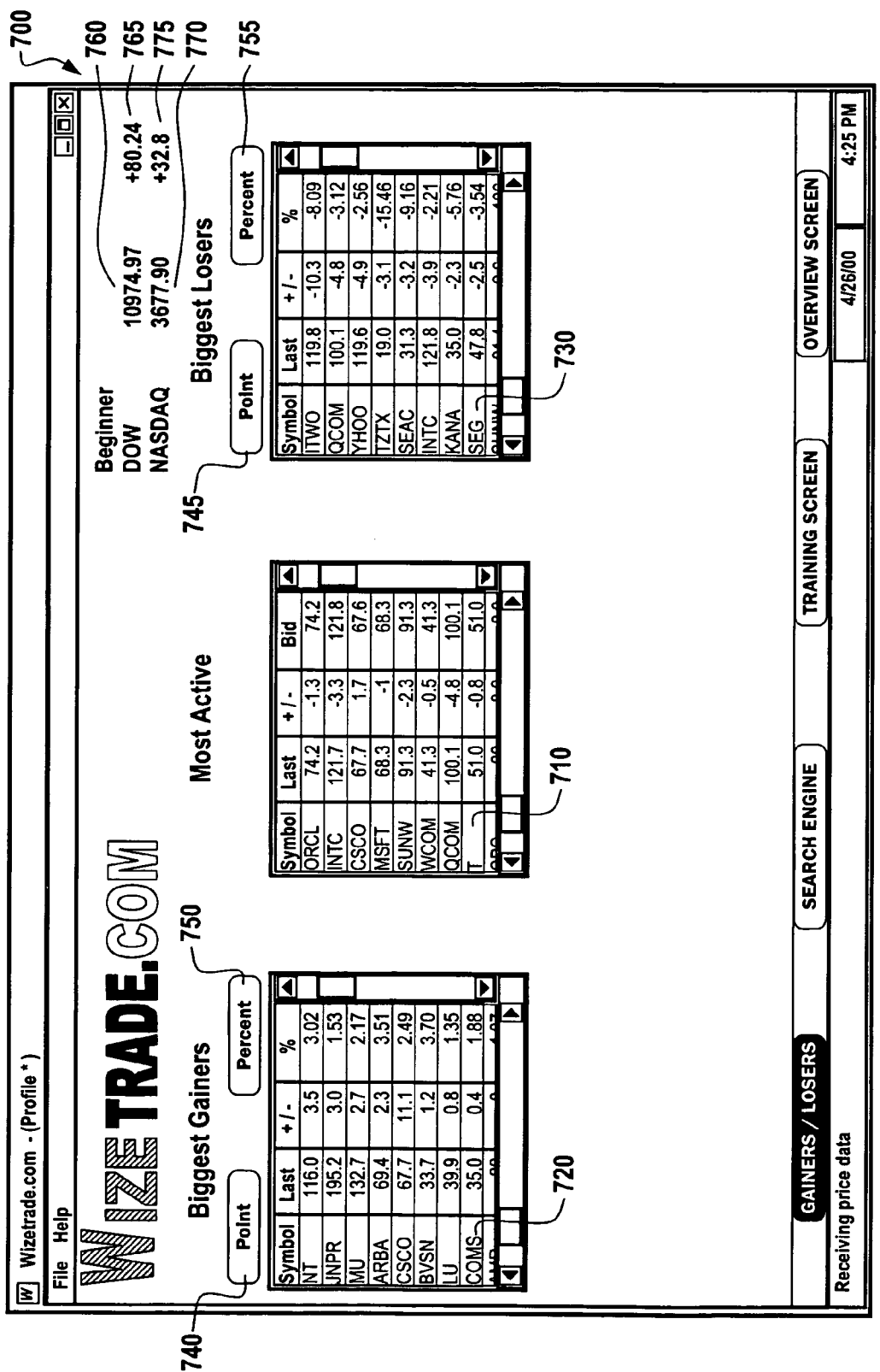
FIG. 7 is the Gainers/Losers Screen in accordance with one embodiment of the present invention.

FIG. 7, Gainers/Losers Screen 700, activates in response to the investor's selection of button 380 (FIG. 3). The Gainers/Losers Screen 700 displays the investor's most active trading investments 710, the investor's highest gaining investments 720 and the investor's highest losing investments 730. The investor can sort investments by point 740 and 745 or percentage 750 and 755. DOW current totals 760 and 765 and NASDAQ current totals 770 and 775 are also displayed.

FIGS. 8A-8E display the processing flows for the options of screens FIGS. 3-7. Application Navigation 900 is the same in each of the system screens. Selecting View Gainers/Losers Screen 910 results in the display of FIG. 7, enabling its associated processing of FIG. 8E. Selecting View Search Screen 920 results in the display of FIG. 6, enabling its associated processing of FIG. 8D. Selecting View Overview Screen in Trading Mode 930 results in the display of FIG. 4, enabling its associated processing of FIG. 8B. Selecting View Overview Screen in Overview Mode 940 results in the display of FIG. 3, enabling its associated processing of FIG. 8A.

Figure 8A:
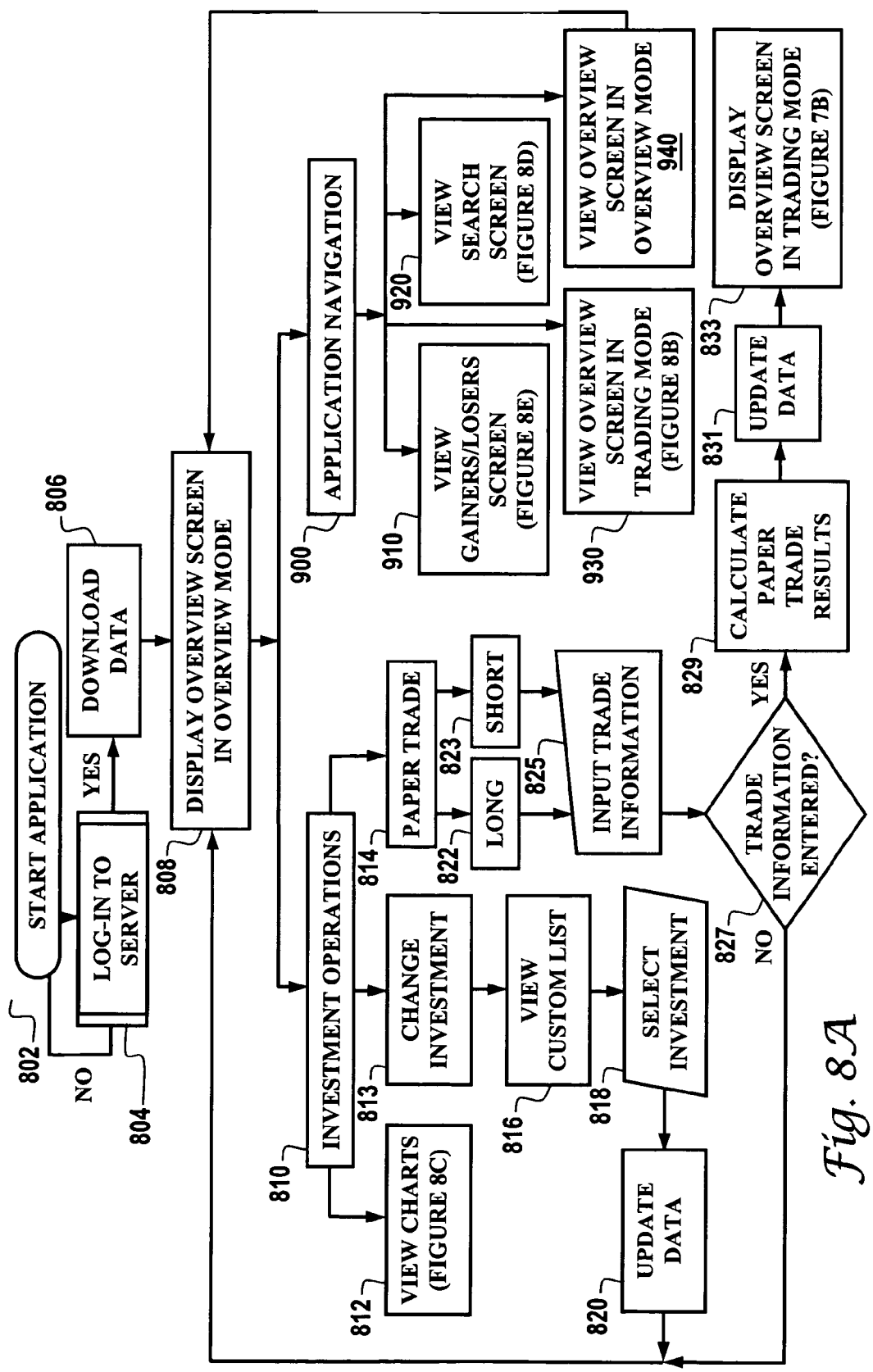
FIG. 8A is a flowchart illustrating the application start-up and processing flow for the Overview Screen in Overview Mode in accordance with one embodiment of the present invention.

FIG. 8A focuses on the application start-up and processing flow for FIG. 3. The present invention starts in block 802 where the investor 150-160 (FIG. 1) selects one or more markets 120, 125 or 130 (FIG. 1) to connect to. The specific servers that may be connected to and the details regarding the connection to be established are typically setup during the installation process of the software. The investor 150-160 (FIG. 1) can change, add or delete available connections and/or markets. Next, the present invention prompts the investor to log-on to a server which preferably supplies investment information updates in real-time or near-real-time 804. At this point, the application updates investment information in block 806. After updating, the system displays the Overview Screen in Overview Mode 808.

A preferred embodiment of the present invention enables the investor to perform three main investment operations 810: view charts 812, change investments 813 and paper trade 814. Chart viewing will be more fully explained in FIG. 8C. When the investor selects change investment 813, the system displays a list of currently stored investments 816. The creation of this list will be more fully explained in FIG. 8D. After viewing the possible investment choices 816, the investor then selects an investment 818. The system updates the screen data 820 and then redisplays the Overview Screen in Overview Mode 808 with the newly selected investment and its associated timer interval statuses.

When the investor decides to engage in "paper trading" 814, there are two possible options: Long 822 and Short 823. The process flow for each is identical, except for the data used and the calculations performed. These calculations were previously described in reference to FIG. 5. In order to perform the calculations, the system must have trade information with which to operate. Therefore, the investor has to supply trade information 825. The system then checks for the necessary input 827. If the investor has not input trade information 825 and 827, then all that happens is the system continues to display the current Overview Screen in Overview Mode 808.

If the investor has entered trade information 825 and 827, the system calculates the paper trade results 829, update the screen data 831 and then displays the Overview Screen in Trading Mode 833.

Figure 8B:
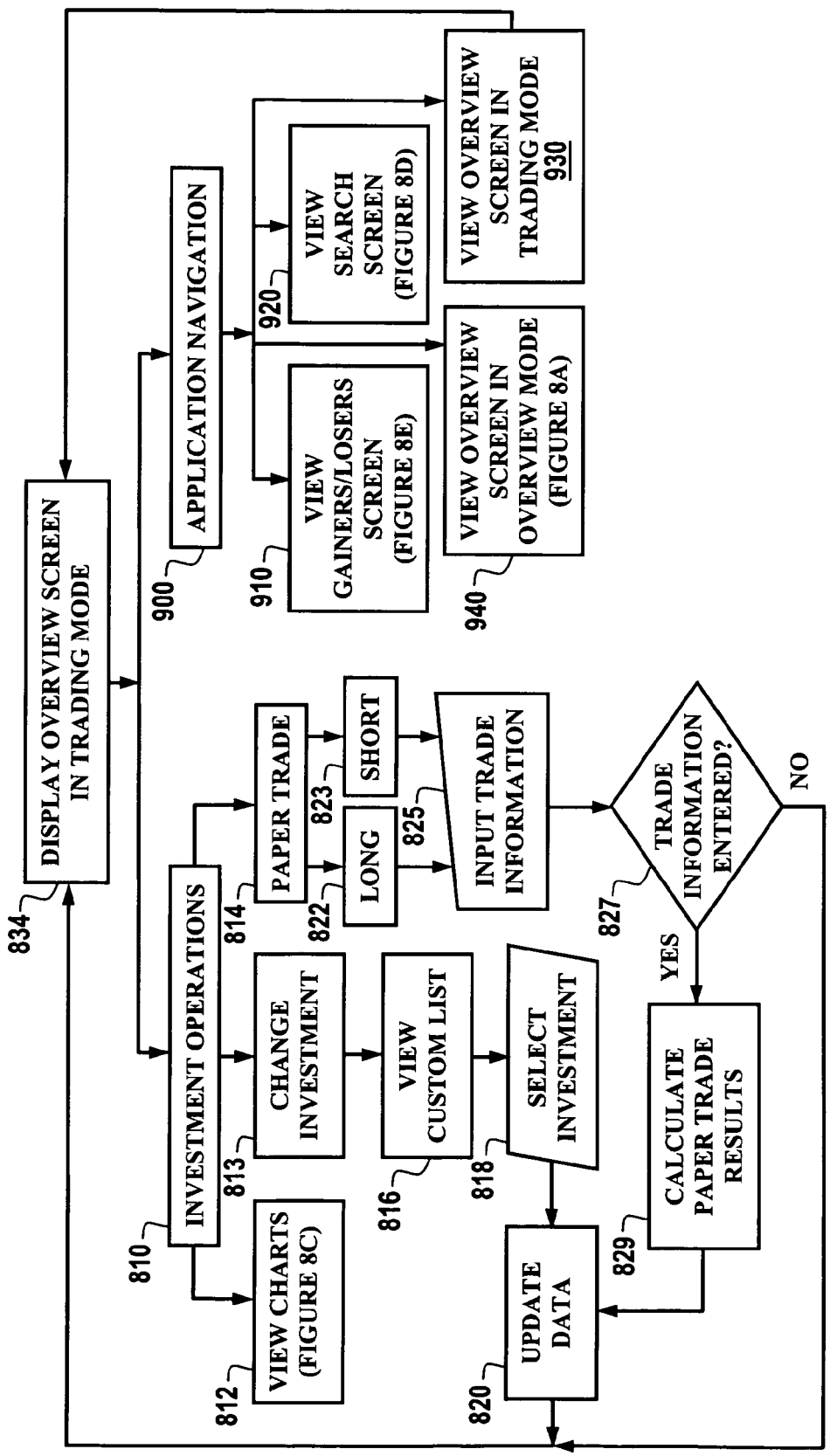
FIG. 8B is a flowchart illustrating the processing flow for the Overview Screen in Trading Mode in accordance with one embodiment of the present invention.

The processing of the Overview Screen in Trading Mode 834 shown in FIG. 8B is very similar to that shown in FIG. 8A. The difference is that regardless of whether the investor selects change investment 813 or paper trade 814, the present invention displays the results on the Overview Screen in Trading Mode 834. If changes have been made in the investment selection 813 or if trade information has been entered 825 and 829, the underlying data will be updated 820 and then displayed 834. If data changes have not been made, the system continues to display the Overview Screen in Trading Mode 834.

Figure 8C:
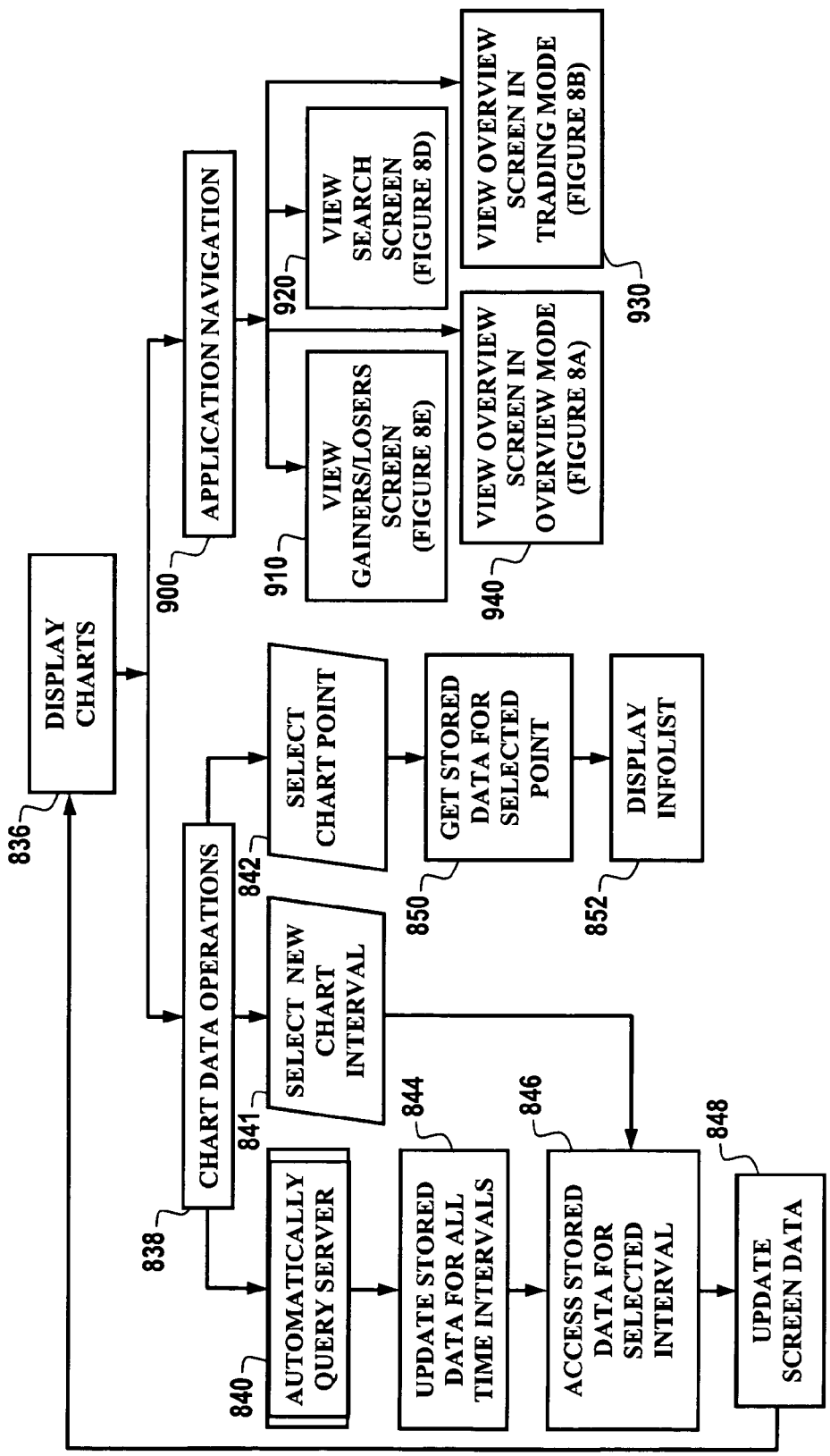
FIG. 8C is a flowchart illustrating the processing flow for the Chart Screen in accordance with one embodiment of the present invention.

The processing which occurs when FIG. 5 is displayed is shown in FIG. 8C. When a chart is displayed 836, there are three possible chart data operations 838 that may occur: automatic data updating, changing chart intervals or viewing specific data for a selected data point. The chart is automatically updated from the investment data system 840. Stored data is updated 844 for all the time intervals set in the system for each of the investments selected by the investor in either FIG. 3 or FIG. 4. After the stored data is updated, the system re-accesses the data 846, updates the screen 848 and displays the charts 836. The displayed chart may be for any one of the time intervals set in the system and the investor may navigate between each of the time intervals for the chart by selecting a new chart interval 841. After a new interval has been selected 841, the system accesses the data for the selected interval 846, updates the screen 848 and displays the charts 836. The investor can view more detailed data for a specific chart point by selecting the point 842. The system then gets the stored data for the selected point 850 and displays it on the screen 852. The stored data for the selected point is displayed in the Infolist 555 (FIG. 5).

Figure 8D:
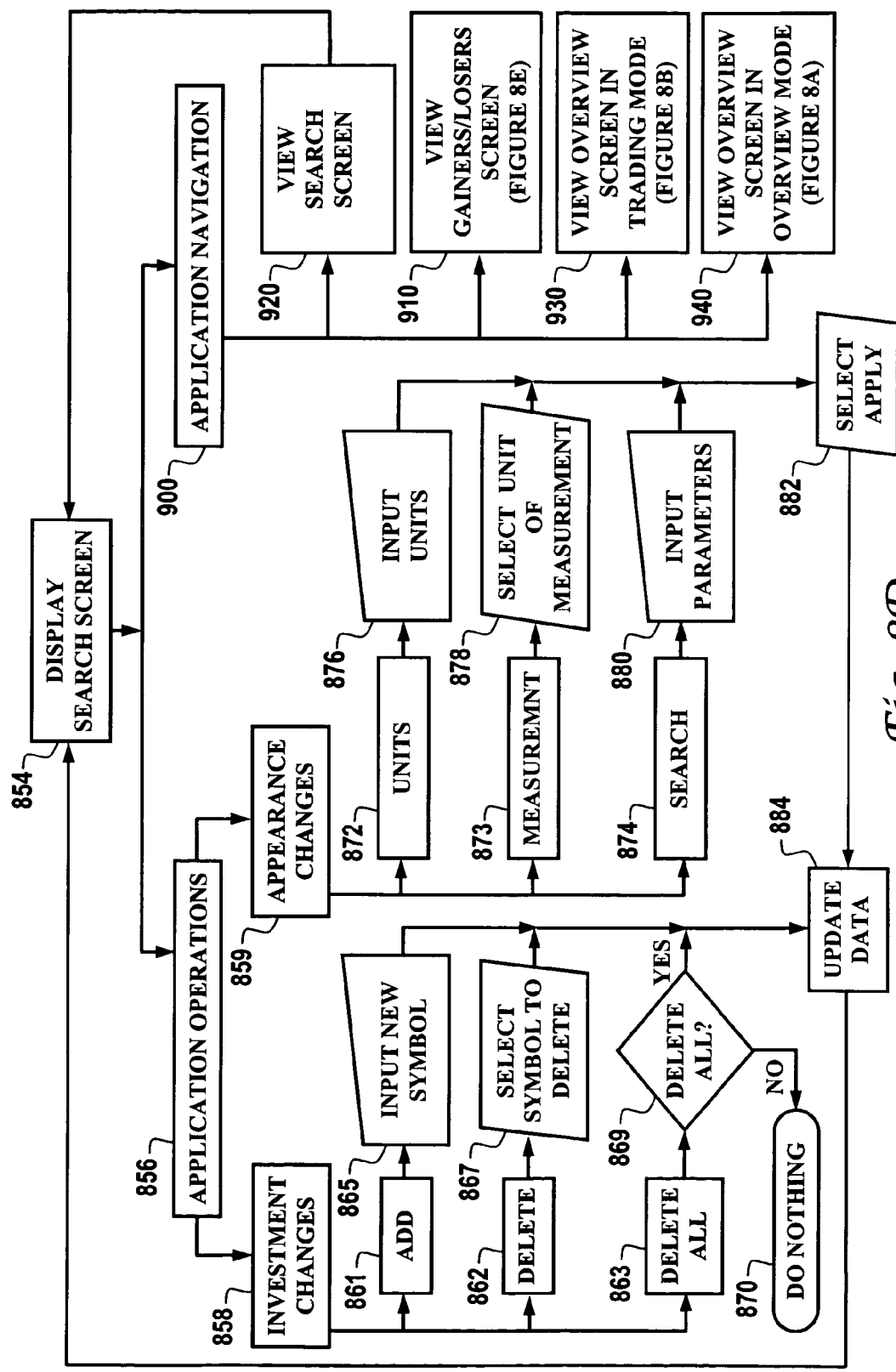
FIG. 8D is a flowchart illustrating the processing flow for the Search Screen in accordance with one embodiment of the present invention.

Not only can the investor search through the available investments to select those that meet a certain criteria, but the investor can also make changes to some of the system parameters through the Search Screen 854 processing of FIG. 8D. There are two main types of changes that result through the use of the Search Screen 600 (FIG. 6). The application operations 856 that can be performed are investment changes 858 and appearance changes 859. The investment symbols appear in the custom list 650 (FIG. 6) can be changed by making investment changes 858. The investor can add 861 new investments, delete 862 an existing investment or delete all 863 of the investments displayed in the custom list 650 (FIG. 6). When the investor adds 861 new investments, the system will prompt the investor to input the new investment symbol 865, then the system will update the data 884 and display the Search Screen 854. If the investor chooses to delete 862 a symbol, the system will prompt the investor to select an investment symbol 867 from custom list 650 (FIG. 6) for deletion. Then, the system will update the data 884 and display the Search Screen 854. Alternatively, if the investor chooses to delete all 863 the investments in custom list 650 (FIG. 6), the system will ask for confirmation 869 that the investor wants to delete the entire list. If the investor affirms the requested deletion of the entire list, then the system updates the data 884 to reflect no entries and displays the Search Screen 854.

The other changes are made to the appearance 859 of the data relative to which investments are displayed for the screens of FIGS. 3-7 and which time intervals the system uses for calculations. When the investor conducts a search 874, the system prompts the investor for the search parameters 880. Once those parameters have been entered, the investor selects Apply 882. The screen data is updated 884 to reflect only those investments that met the search parameters. The Search Screen is displayed 854, showing the matching investments in custom list 650 (FIG. 6). The investor can also change the units 872 for the time intervals used throughout the system. The investor may input the desired units 876 in whole numbers and then select Apply 882. The data will be updated 884 to display the Search Screen 854 with the newly entered units. Measurement 873 changes are similarly made. However, instead of inputting a new unit of measurement, the investor selects a unit of measurement 878 from a list. Then, the investor selects Apply 882, the system updates the data 884 and displays the Search Screen 854 with the newly entered units of measurement.

Figure 8E:
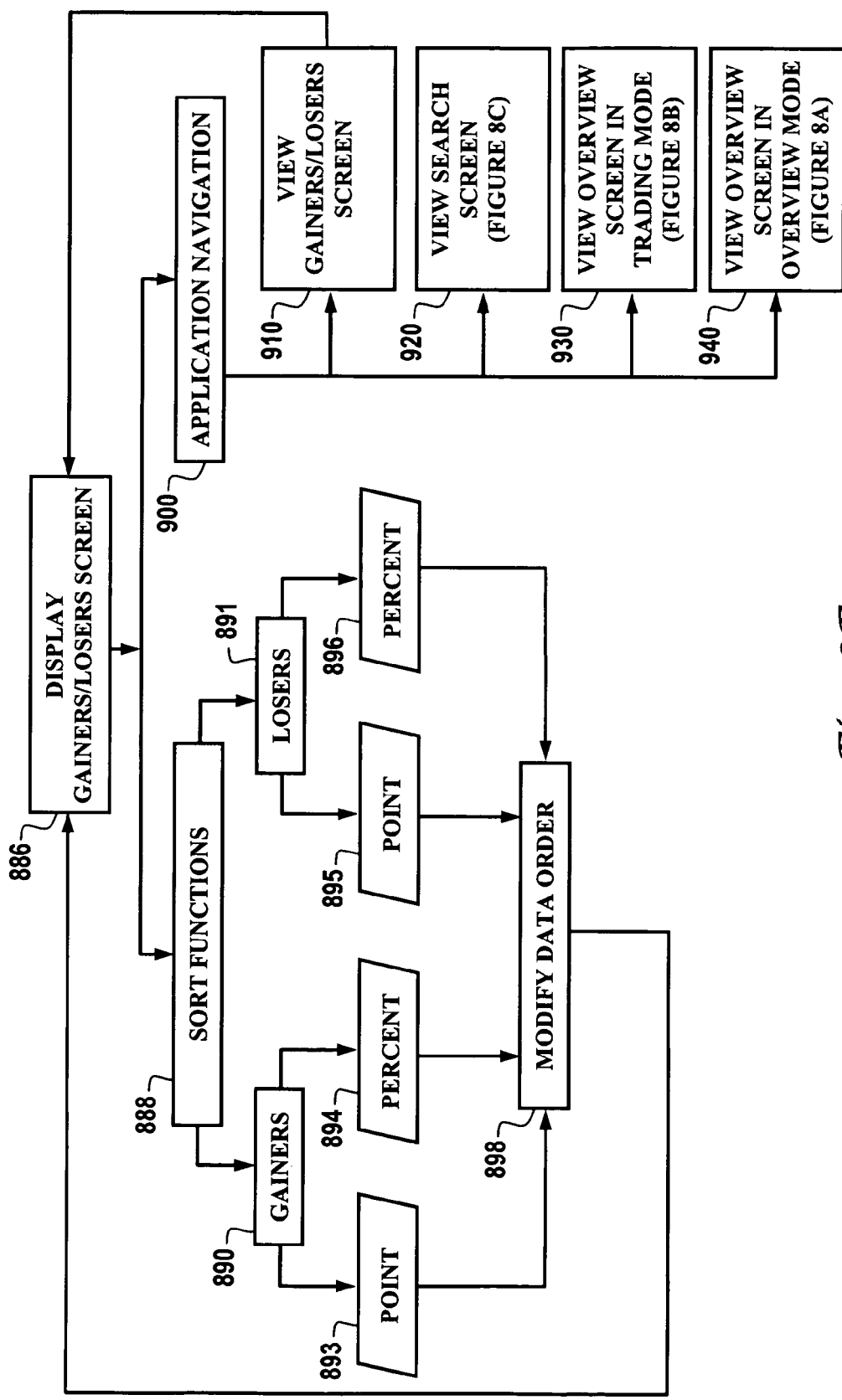
FIG. 8E is a flowchart illustrating the processing flow for the Gainers/Losers Screen in accordance with one embodiment of the present invention.

FIG. 8E displays the processing flow for FIG. 7. When the Gainers/Losers Screen is displayed 886, the investor has the ability to sort 888 the data displayed on that screen. The investor may sort the Gainers 890 by point 893 or percent 894. A point 895 and percent 896 sort is also available for Losers 898.

Figure 9:
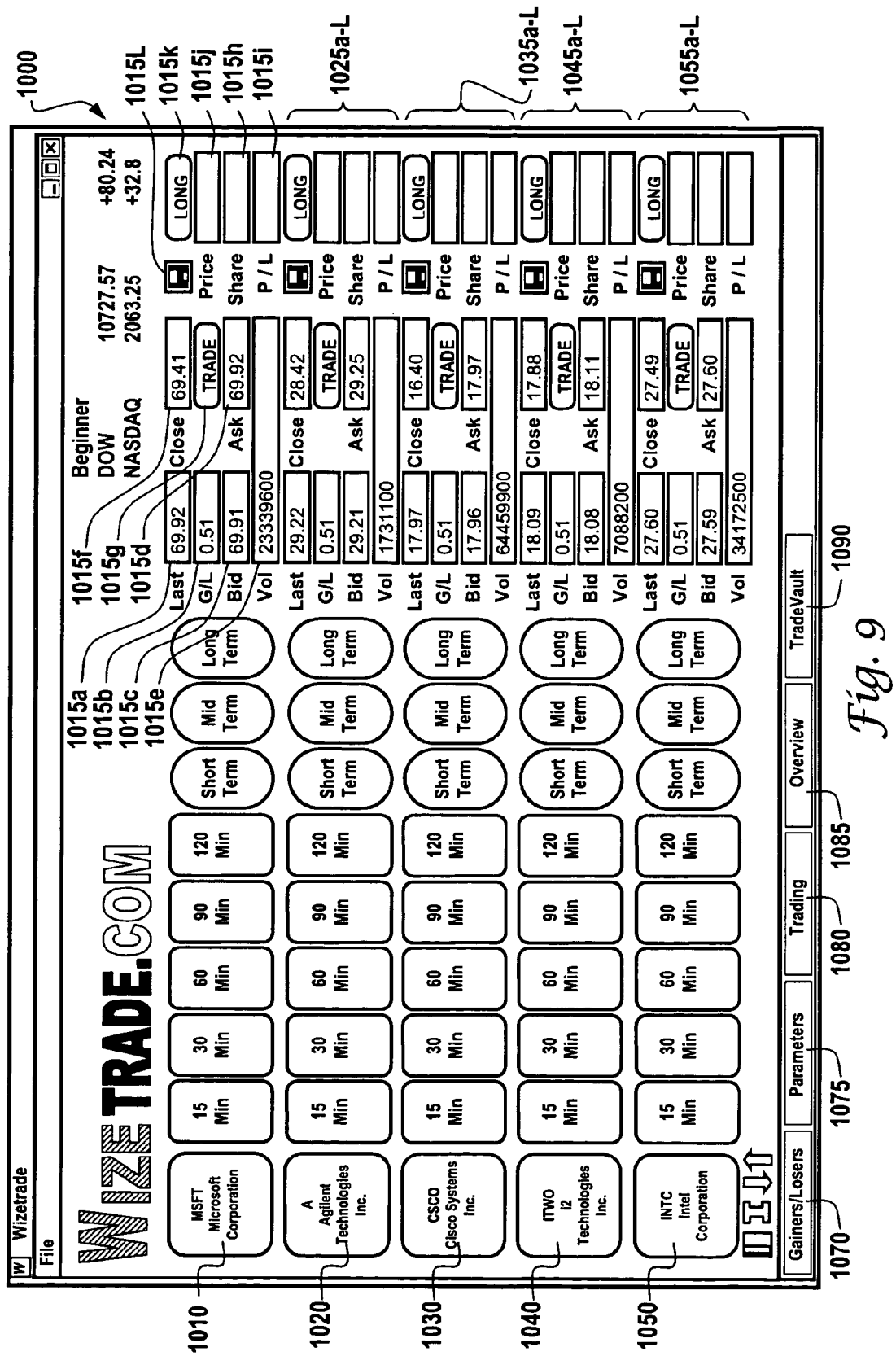
FIG. 9 is the Trading Screen in accordance with another embodiment of the present invention.

Now referring to FIG. 9, the Trading Screen 1000 in accordance with another embodiment of the present invention is shown. Pricing and volume information 1015*a-i*, 1025*a-i*, 1035*a-i*, 1045*a-i* and 1055*a-i* for each associated investment 1010, 1020, 1030, 1040 and 1050 is shown. The pricing and volume information includes data such as the last price 1015*a*, 1025*a*, 1035*a*, 1045*a* and 1055*a*, the dollar amount up or down per investment 1015*b*, 1025*b*, 1035*b*, 1045*b* and 1055*b*, the bid price 1015*c*, 1025*c*, 1035*c*, 1045*c* and 1055*c*, the ask price 1015*d*, 1025*d*, 1035*d*, 1045*d* and 1055*d*, the volume 1015*e*, 1025*e*, 1035*e*, 1045*e* and 1055*e*, the closing price 1015*f*, 1025*f*, 1035*f*, 1045*f* and 1055*f*, a trade button 1015*g*, 1025*g*, 1035*g*, 1045*g* and 1055*g*, the number of shares 1015*h*, 1025*h*, 1035*h*, 1045*h* and 1055*h*, the profit/loss 1015*i*, 1025*i*, 1035*i*, 1045*i* and 1055*i*, the execute price 1015*j*, 1025*j*, 1035*j*, 1045*j* and 1055*j*, a long/short trade button 1015*k*, 1025*k*, 1035*k*, 1045*k* and 1055*k*, and a save button 10151, 10251, 10351, 10451 and 10551 for each investment 1010, 1020, 1030, 1040 and 1050. The dollar amount up or down per investment 1015*b*, 1025*b*, 1035*b*, 1045*b* and 1055*b* is displayed with color-coding: green may represent a gain, red may represent a loss, while white may represent either no change or no data. Other color combinations can be used.

To execute a trade, the investor enters the execute price (Price) 1015*j*, 1025*j*, 1035*j*, 1045*j* and 1055*j* and the amount of an investment bought or shorted (Share) 1015*h*, 1025*h*, 1035*h*, 1045*h* and 1055*h* for an associated investment 1010, 1020, 1030, 1040 and 1050. The investor chooses from Long or Short for an associated investment 1010, 1020, 1030, 1040 and 1050 by clicking on the long/short button 1015*k*, 1025*k*, 1035*k*, 1045*k* and 1055*k* for that investment. The results of the trade are shown in P/L 1015*i*, 1025*i*, 1035*i*, 1045*i* and 1055*i* for an associated investment 1010, 1020, 1030, 1040 and 1050. The results are displayed with color-coding: green may represent a gain, red may represent a loss, while white may represent either no change or no data. Other color combinations can be used. The trade button 1015*g*, 1025*g*, 1035*g*, 1045*g* and 1055*g* either execute the trade (real or simulated) or connects the investor to the electronic or online brokerage service. The save button 10151, 10251, 10351, 10451 and 10551 saves the transaction so that the investor can keep track of his or her historical trading activity.

Buttons 1070, 1075, 1080, 1085 and 1090 enable the investor to navigate through the application screens. This strip of buttons is repeated on each screen and has identical functionality on each screen. Button 1070 corresponds to the Gainer/

Figure 11:
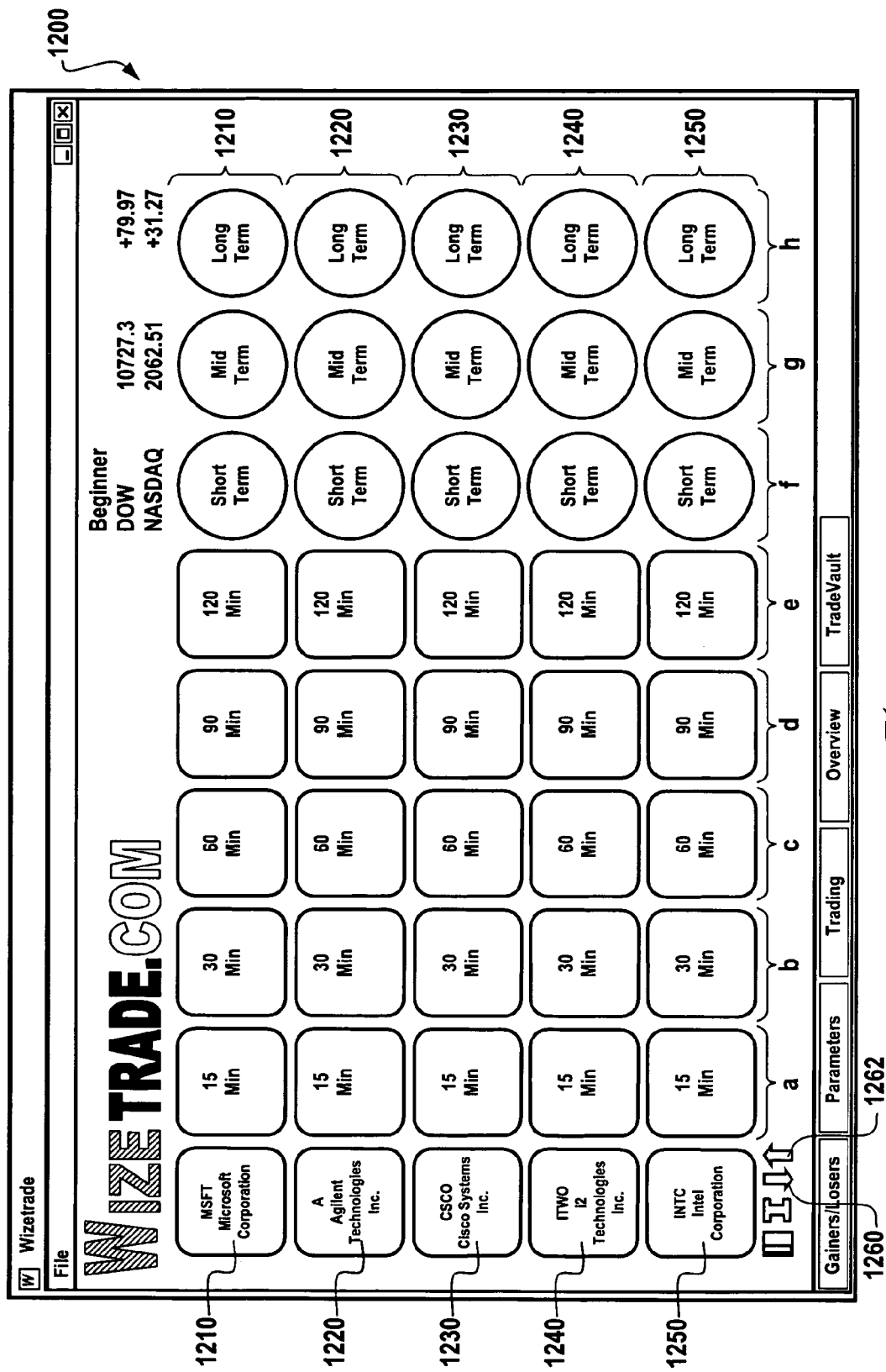
FIG. 11 is the Overview Screen in accordance with another embodiment of the present invention.
Figure 12:
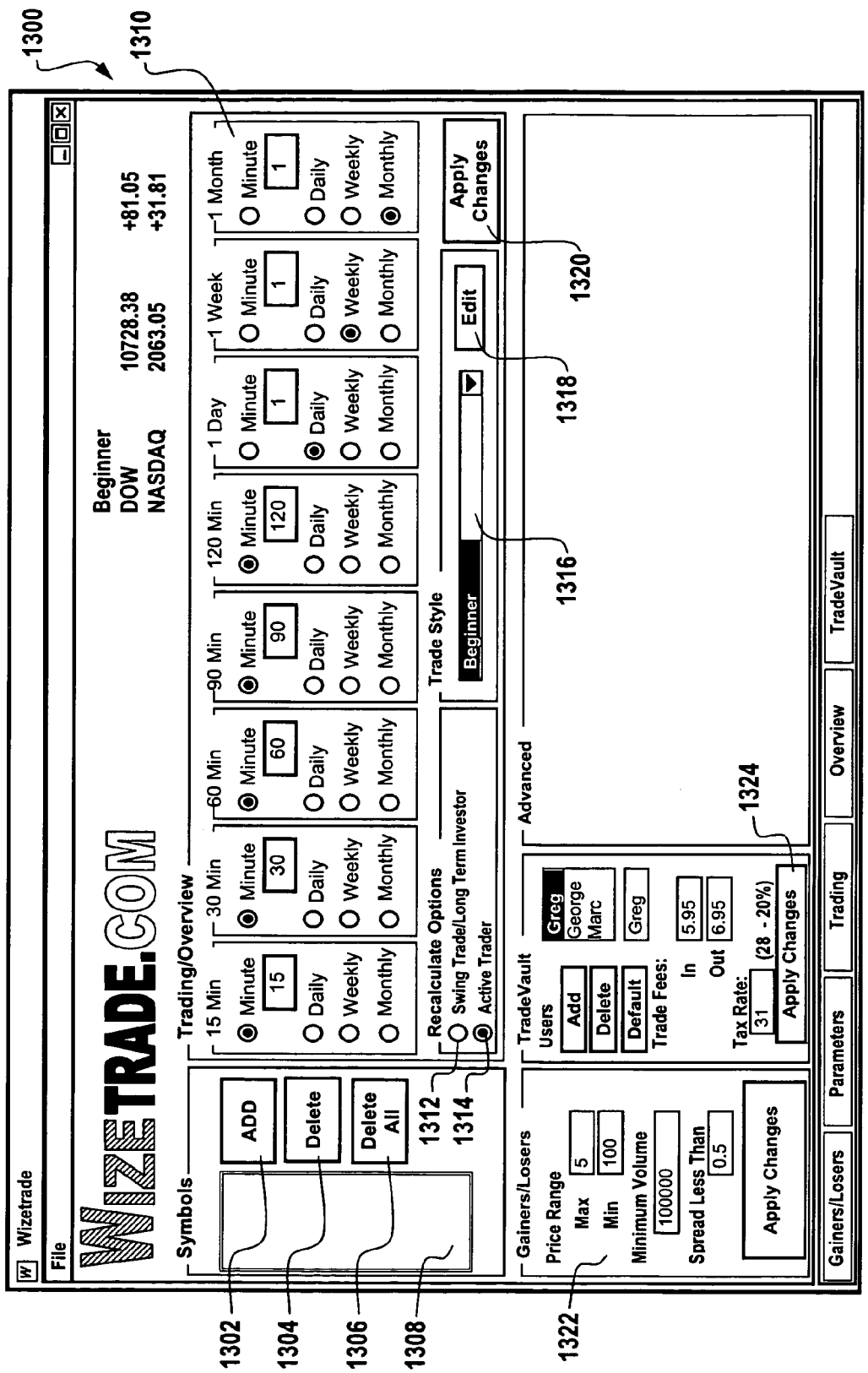
FIG. 12 is the Parameters Screen in accordance with another embodiment of the present invention.
Figure 13:
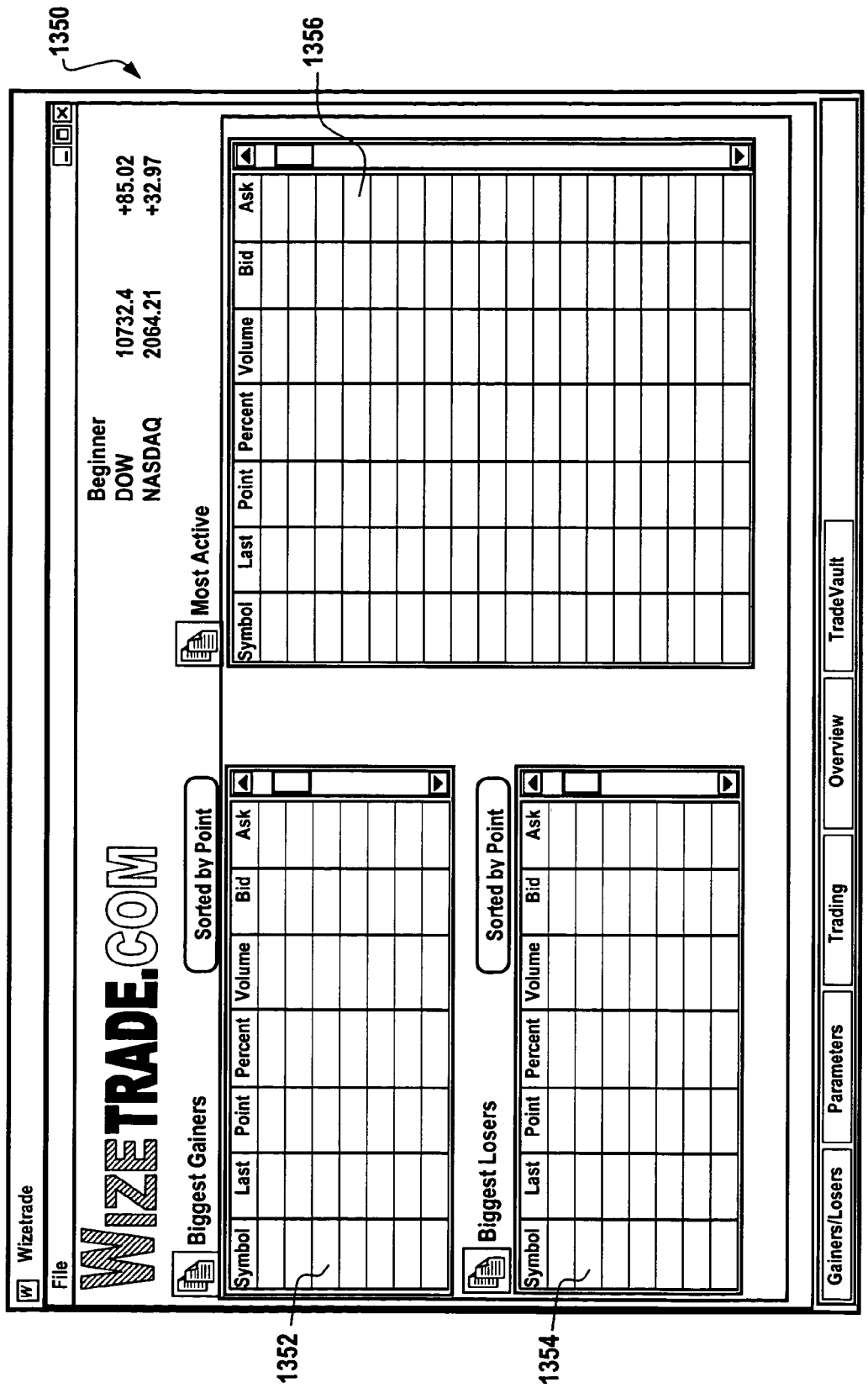
FIG. 13 is the Gainers/Losers Screen in accordance with another embodiment of the present invention.

Losers Screen 1350 (FIG. 13). Button 1075 corresponds to the Parameters Screen 1300 (FIG. 12). Button 1080 corresponds to the Traders Screen 1000 (FIG. 9). Button 1085 corresponds to the Overview Screen 1200 (FIG. 11). Button 1090 corresponds to the Trade Vault Screen 1100 (FIG. 10).

Figure 10:
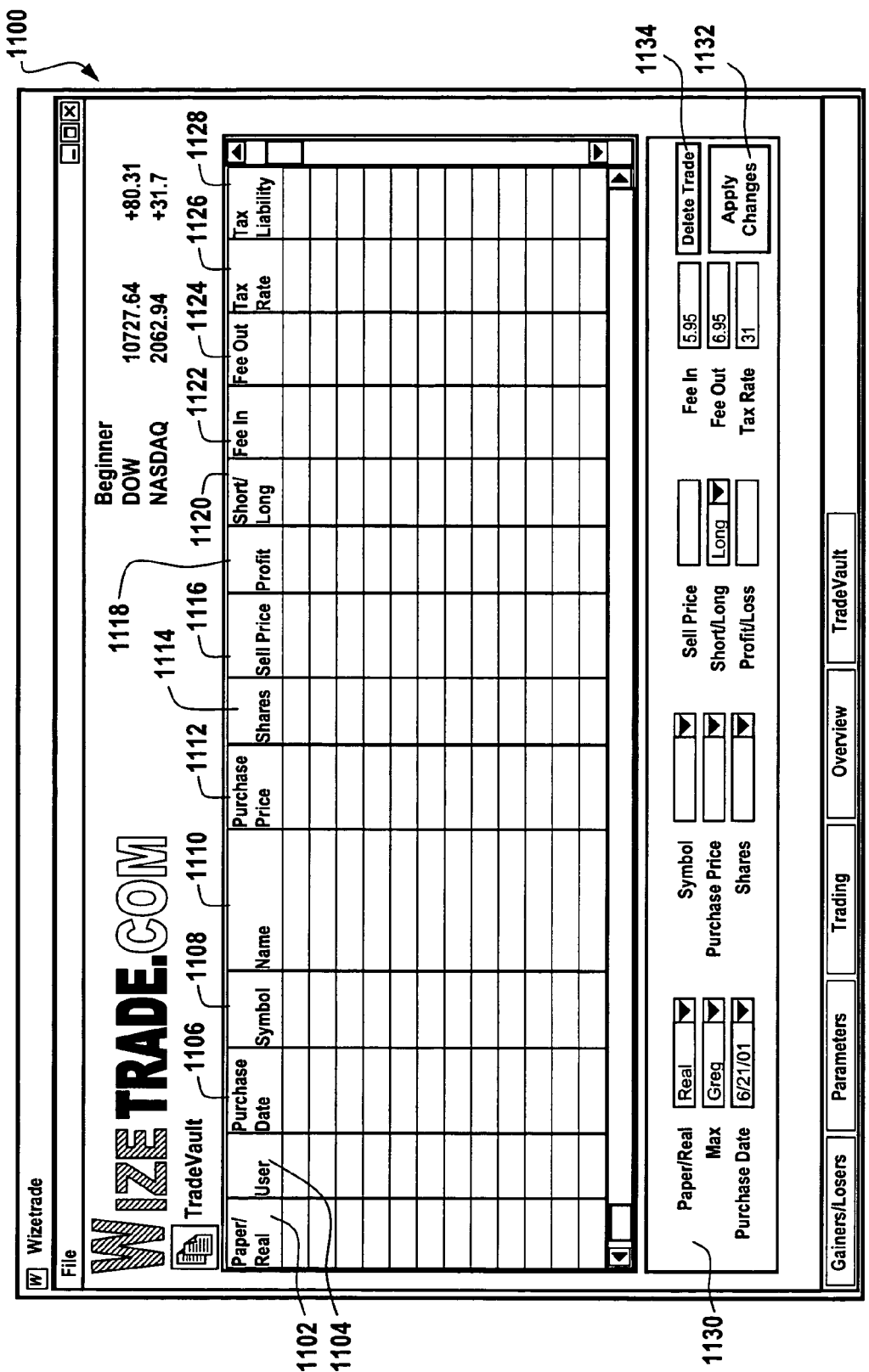
FIG. 10 is the Trade Vault Screen in accordance with another embodiment of the present invention.

FIG. 10 is the Trade Vault Screen 1100 in accordance with another embodiment of the present invention. The Trade Vault shows the paper and real trades that were saved by the investor by using the save button 10151, 10251, 10351, 10451 and 10551 in FIG. 9. The Trade Vault Screen shows whether the trade was simulated (paper) or real 1102, the user 1104, the purchase date 1106, the trading symbol 1108, the investment name 1110, the purchase price 1112, the number of shares 1114, the selling price 1116, the profit 1118, whether the trade was long or short 1120, the fee in 1122, the fee out 1124, the tax rate 1126 and the tax liability 1128. Data can be changed or added using the input section 1130. The changes can be applied using the apply changes button 1132. Trades can be deleted using the delete trade button 1134.

FIG. 11 is the Overview Screen 1200 in accordance with another embodiment of the present invention. The Overview Screen 1200 enables the investor to recognize trends and directional movements. Overview Screen 1200 contains information about several selected investments 1210, 1220, 1230, 1240 and 1250. Color coded indicators 1210*a*-2110*h*, 1220*a*-1220*h*, 1230*a*-1230*h*, 1240*a*-1240*h* and 1250*a*-1250*h* are displayed for each of the selected investments 1210, 1220, 1230, 1240 and 1250. These indicators are preferably laid out in a grid fashion, but can be otherwise configured. Each indicator 1210*a*-1210*h*, 1220*a*-1220*h*, 1230*a*-1230*h*, 1240*a*-1240*h* and 1250*a*-1250*h* represents information for an associated single investment. Each indicator 1210*a*-1210*h*, 1220*a*-1220*h*, 1230*a*-1230*h*, 1240*a*-1240*h* and 1250*a*-1250*h* displays the chosen time interval for that indicator. Time intervals may be in minutes, hours, days, weeks or months. In the example shown, the time interval for indicators 1210*a*, 1220*a*, 1230*a*, 1240*a* and 1250*a* is fifteen minutes; the time interval for indicators 1210*b*, 1220*b*, 1230*b*, 1240*b* and 1250*b* is thirty minutes; the time interval for indicators 1210*c*, 1220*c*, 1230*c*, 1240*c* and 1250*c* is sixty minutes; the time interval for indicators 1210*d*, 1220*d*, 1230*d*, 1240*d* and 1250*d* is ninety minutes; the time interval for indicators 1210*e*, 1220*e*, 1230*e*, 1240*e* and 1250*e* is one hundred and twenty minutes; the time interval for indicators 1210*f*, 1220*f*, 1230*f*, 1240*f* and 1250*f* is short term (days; the time interval for indicators 1210*g*, 1220*g*, 1230*g*, 1240*g* and 1250*g* is mid-term (weeks); and the time interval for indicators 1210*h*, 1220*h*, 1230*h*, 1240*h* and 1250*h* is long term (months). The investor can use the page down button 1260 and page up button 1265 to scroll through various investments being tracked.

FIG. 12 is the Parameters Screen 1300 in accordance with another embodiment of the present invention. The investor can use the Parameters Screen 1300 to add 1302, delete 1304, or delete all 1306 investments (symbols) 1308 being tracked, change the time intervals displayed in the Trading Screen 1000 (FIG. 9) and the Overview Screen 1200 (FIG. 11) using the entry fields and toggle fields in the Trading/Overview section 1310. The investor can set the recalculation options to swing trade/long term investor 1312 or active trade mode 1314. The investor can also use various preset or stored sets of time intervals by selecting a trade style 1316, such as beginner, expert, long term investor or day trader. These preset or stored time intervals can be edited using the edit button 1318. Changes are applied using the apply changes button 1320. The settings for the Gainers/Losers Screen 1350 (FIG. 13) and the Trade Vault Screen 1100 (FIG. 10) can be set using sections 1322 and 1324 respectively.

FIG. 13 is the Gainers/Losers Screen 1350 in accordance with another embodiment of the present invention. This screen 1350 shows the biggest gainers in section 1352, the biggest losers in section 1354 and the most active in section 1356.

Figure 14:
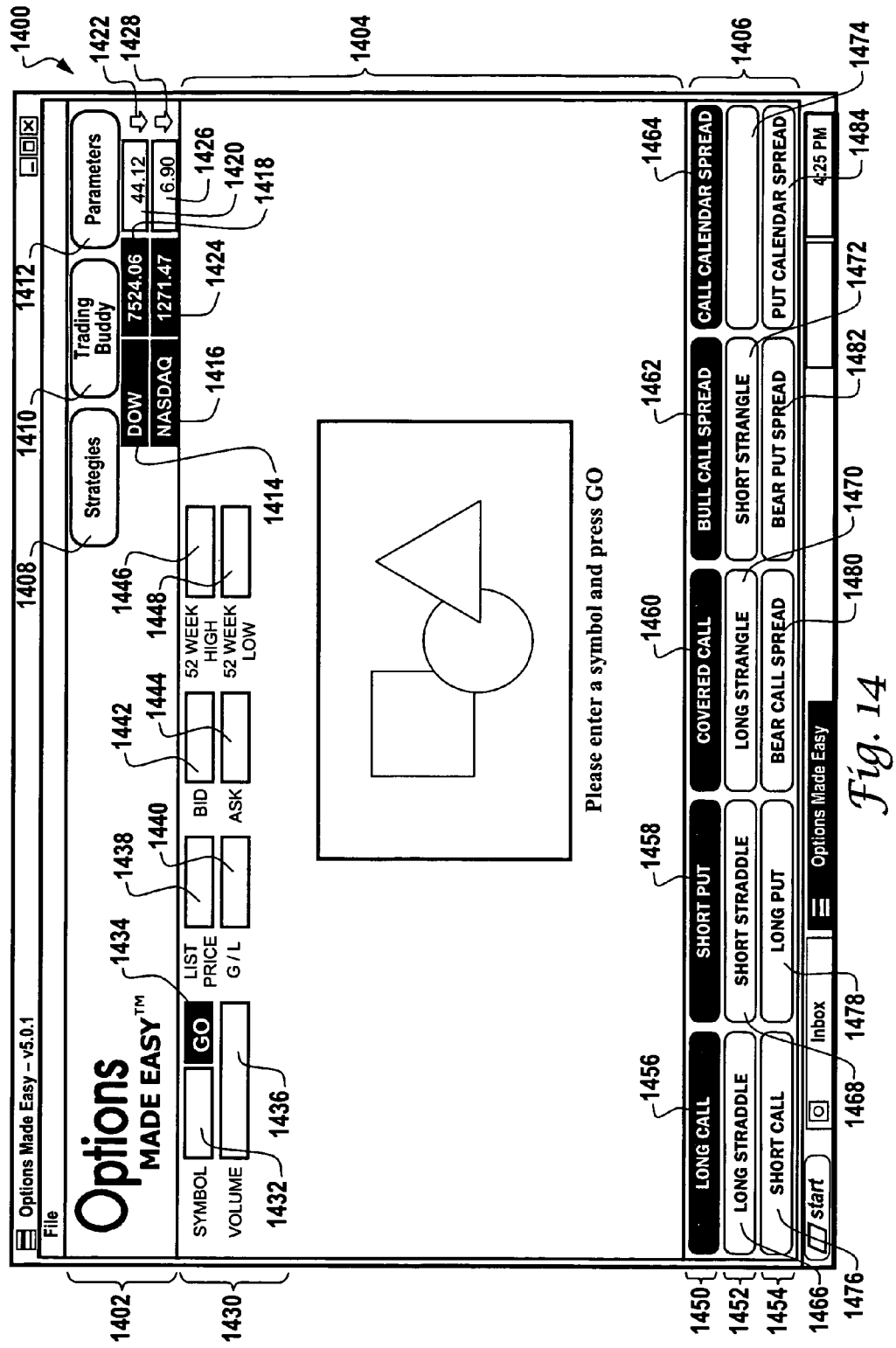
FIG. 14 is an Initial Screen in accordance with an options embodiment of the present invention.

An implementation of the present invention will now be described with respect to options in reference to FIGS. 14-36. Now referring to FIG. 14, the Initial Screen 1400 is shown and will now be described. The Initial Screen 1400 and most of the other screens contain a header area 1402, a data area 1404 and a footer area 1406. The header area 1402 contains a strategies button 1408, which will display the Strategies Screen 1500 (FIG. 15) when clicked, a trading buddy button, which will display the Trading Buddy Screen 1600 (FIG. 16) when clicked and a parameters button 1412, which will display the Parameters Screen 1700 (FIG. 17) when clicked. Other buttons can be used. The header area 1402 also contains exchange or market information, such as DOW 1414 and NASDAQ 1416. For each exchange or market index, the current value (DOW 1418, NASDAQ 1424), change (DOW 1420, NASDAQ 1426) and up/down indicator (DOW 1422, NASDAQ 1428) are provided. The up/down indicators 1422 and 1428 can be colored (green/red) up/down arrows to visually indicate the change in the exchange or market index. Other market information can be displayed.

The data area 1404 will display information that is specific to the analysis being performed. As shown, the data area 1404 includes stock information 1430 for a selected stock. The stock information 1430 includes the ticker symbol 1432 for a stock, which is entered by the user, a GO button 1434, which is used to retrieve or update the stock information 1430 corresponding to the stock symbol 1432 entered by the user, and the retrieved information (volume 1436, last price 1438, gain/loss 1440, bid price 1442, asking price 1444, 52 week high 1446 and 52 week low 1448). Other information can be displayed.

The footer area 1406 contains a set of buttons corresponding to option trading strategies, which are configurable using the Strategies Screen 1500 (FIG. 15) via the strategies button 1408. As shown, the option trading strategy buttons are arranged in three groups: Bull Strategy 1450 (green colored buttons), Neutral Strategy 1452 (yellow colored buttons) and Bear Strategy 1454 (red colored buttons). The Bull Strategy 1450 buttons are Long Call 1456, Short Put 1458, Covered Call 1460, Bull Call Spread 1462 and Call Calendar Spread 1464. The Neutral Strategy 1452 buttons are Long Straddle 1466, Short Straddle 1468, Long Strangle 1470, Short Strangle 1472 and an unassigned button 1474. The Bear Strategy 1454 buttons are Short Call 1476, Long Put 1478, Bear Call Spread 1480, Bear Put Spread 1482 and Put Calendar Spread 1484. With the exception of the unassigned button 1474, each of these buttons will take the user to the selected strategy overview screen: Long Call 1456 (screen 2100 FIG. 21), Short Put 1458 (screen 2200 FIG. 22), Covered Call 1460 (screen 2300 FIG. 23), Bull Call Spread 1462 (screen 2400, FIG. 24), Call Calendar Spread 1464 (screen 2500 FIG. 25), Long Straddle 1466 (screen 2600 FIG. 26), Short Straddle 1468 (screen 2700 FIG. 27), Long Strangle 1470 (no separate figure shown), Short Strangle 1472 (screen 2800 FIG. 28), Short Call 1476 (screen 2900 FIG. 29), Long Put 1478 (screen 3000 FIG. 30), Bear Call Spread 1480 (screen 3100 FIG. 31), Bear Put Spread 1482 (screen 3200 FIG. 32) and Put Calendar Spread 1484 (screen 3300 FIG. 33).

Figure 15:
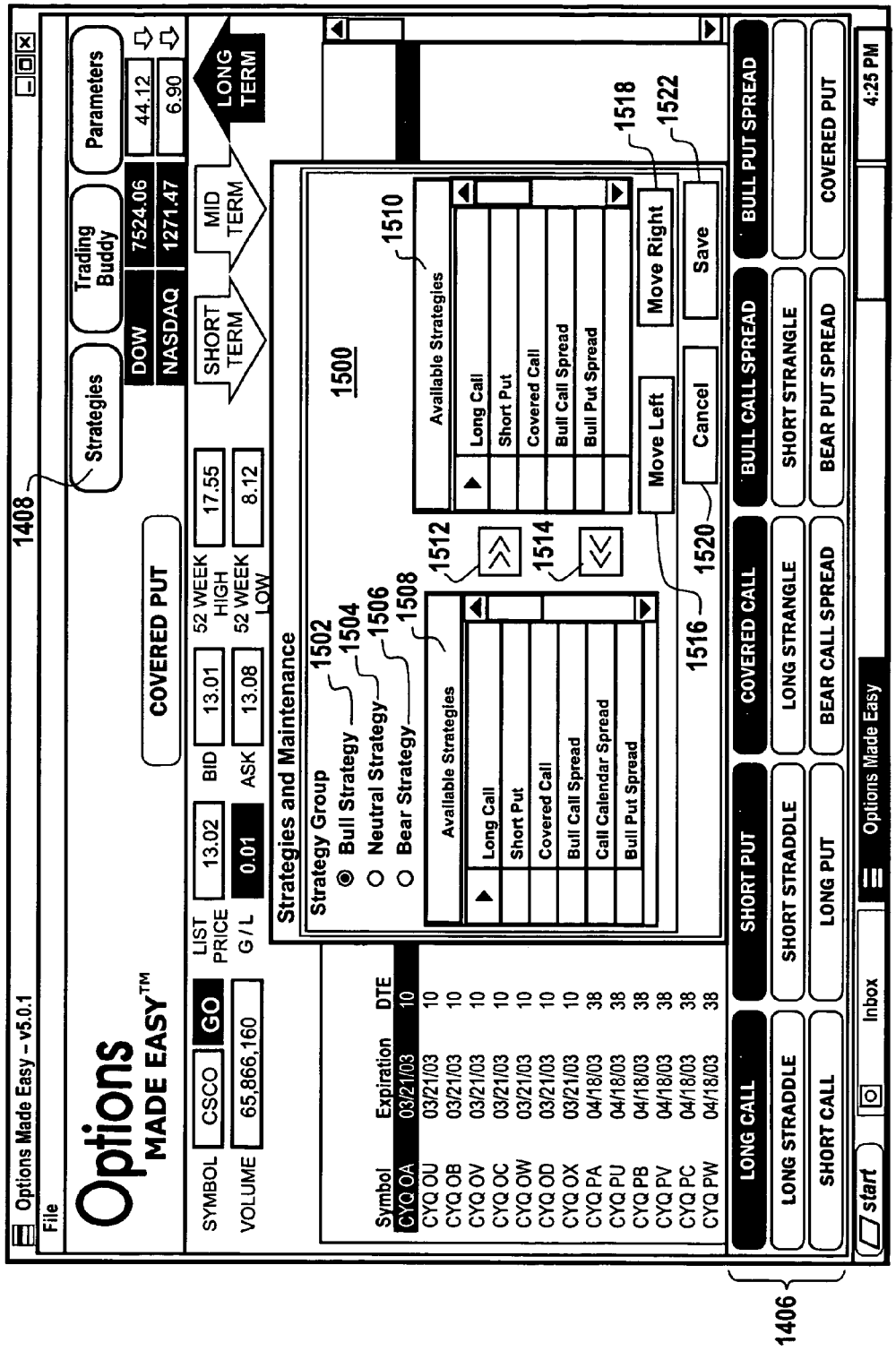
FIG. 15 is the Strategies Screen in accordance with an options embodiment of the present invention.

Referring now to FIG. 15, Strategies Screen 1500 is shown and will be described. As previously stated, the Strategies Screen 1500 is accessed by clicking the strategies button 1408. The Strategies Screen 1500 is a pop up screen that allows the user to configure the option trading strategy buttons displayed in the footer area 1406. The user selects the strategy group that he or she desires to change by clicking on Bull Strategy radio button 1502, Neutral Strategy radio button 1504 or Bear Strategy radio button 1506. The available strategies and selected strategies for the selected strategy group are displayed in boxes 1508 and 1510, respectively. Strategies are added to the selected strategies 1510 by clicking on the desired strategy in the available strategies box 1508 and clicking on the button with two right arrows 1512. Likewise, strategies are removed from the selected strategies 1510 by clicking on the desire strategy in the selected strategies box 1510 and clicking on the button with two left arrows 1514. The user can rearrange the order of the strategy buttons by selecting the strategy to be moved in the selected strategies box 1510 and clicking the "Move Left" 1516 or "Move Right" 1518 buttons. The configuration is cancelled by clicking the Cancel button 1520 or saved by clicking the Save button 1522. The various strategies may include:

Long Call (button 1456 FIG. 14, screen 2100 FIG. 21)—the purchasing of a call option, which represents the option to buy stock at a specific price in the future;

Short Put (button 1458 FIG. 14, screen 2200 FIG. 22)—the writing of a put option, which represents an obligation to sell stock at a specific price in the future;

Covered Call (button 1460 FIG. 14, screen 2300 FIG. 23)—the writing of a call option against an equivalent amount of long stock (e.g., writing two XYZ May 60 calls while owning 200 shares or more of XYZ stock);

Bull Call Spread (button 1462 FIG. 14, screen 2400 FIG. 24)—the simultaneous purchase of one call option with a lower strike and the writing of another call option with a higher strike price (e.g., buying one XYZ May 60 call and writing one XYZ May 65 call);

Bull Put Spread (button 3502 and screen 3500 FIG. 35)—the simultaneous writing of one put option with a higher strike and the purchase of another put option with a lower strike price (e.g., writing one XYZ May 60 put and buying one XYZ May 55 put);

Call Calendar Spread (button 1464 FIG. 14, screen 2500 FIG. 25)—the purchase of a farther-term call and the writing of a nearer-term call at the same strike price (e.g., buying one XYZ May 60 call (far term) and writing one XYZ March 60 call (near term));

Long Straddle (button 1466 FIG. 14, screen 2600 FIG. 26)—purchasing one call and one put with the same strike price and expiration (e.g., purchasing one XYZ May 60 call and one XYZ May 60 put);

Short Straddle (button 1468 FIG. 14, screen 2700 FIG. 27)—writing one call and one put with the same strike price and expiration (e.g., writing one XYZ May 60 call and one XYZ May 60 put);

Covered Straddle—writing one call and one put with the same strike price and expiration each against 100 shares of the underlying stock (e.g., writing one XYZ May 60 call and one XYZ May 60 put and buying 200 shares of XYZ stock);

Covered Combination—writing one call and one put with different strike prices and the same expiration each against 100 shares of the underlying stock (e.g., writing one XYZ May 60 call and one XYZ May 65 put and buying 200 shares of XYZ stock);

Long Strangle (button 1470 FIG. 14)—purchasing a put option and a call option with the same expiration dates and strike prices which are out of the money (the stock price is above the strike price for the put option and below the strike price for the call option);

Short Strangle (button 1472 FIG. 14, screen 2800 FIG. 28)—writing a put option and a call option with the same expiration dates and strike prices which are out of the money (the stock price is above the strike price for the put option and below the strike price for the call option);

Short Call (button 1476 FIG. 14, screen 2900 FIG. 29)—the writing of a call option, which represents an obligation to buy stock at a specific price in the future;

Long Put (button 1478 FIG. 14, screen 3000 FIG. 30)—the purchase of a put option, which represents an option to sell stock at a specific price in the future;

Covered Put (button 3402 and screen 3400 FIG. 34)—writing a put option against a sufficient amount of cash or T-bills to pay for the stock purchase if the short option is assigned;

Bear Call Spread (button 1480 FIG. 14, screen 3100 FIG. 31)—the simultaneous writing of one call option with a lower strike and the purchase of another call option with a higher strike price (e.g., writing one XYZ May 60 call and buying one XYZ May 65 call);

Bear Put Spread (button 1482 FIG. 14, screen 3200 FIG. 32)—the simultaneous purchase of one put option with a higher strike price and the writing of another put option with a lower strike price (e.g., buying one XYZ May 60 put and writing one XYZ May 55 put); and Put Calendar Spread (button 1484 FIG. 14, screen 3300 FIG. 33)—the purchase of a farther-term put and the writing of a nearer-term put at the same strike price (e.g., buying one XYZ May 60 put (far term) and writing one XYZ March 60 put (near term)).

The present invention can be configured to incorporate strategies that are not listed above or that are newly developed from time to time.

Figure 16:
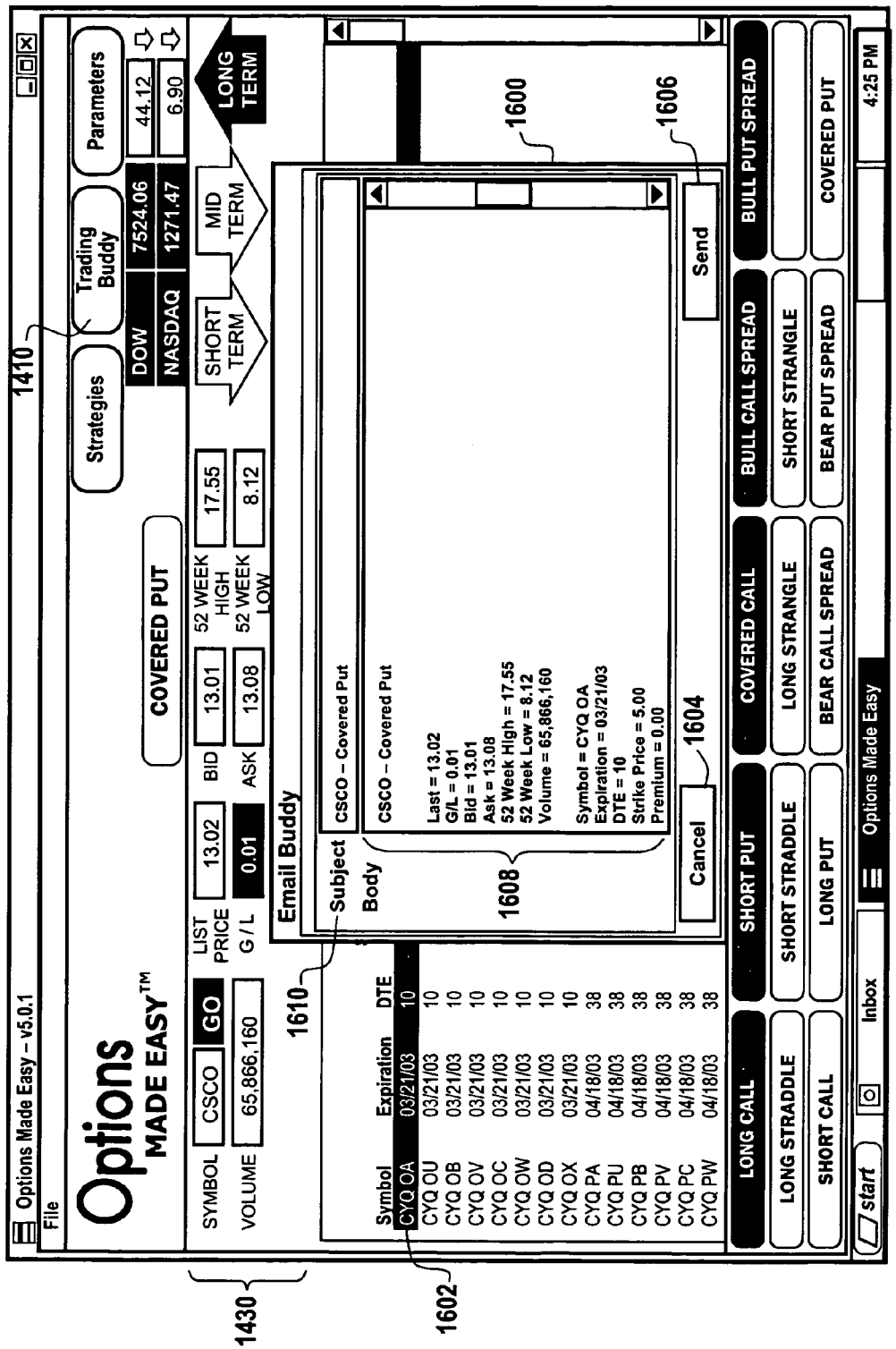
FIG. 16 is a Trading Buddy Screen in accordance with an options embodiment of the present invention.
Figure 17:
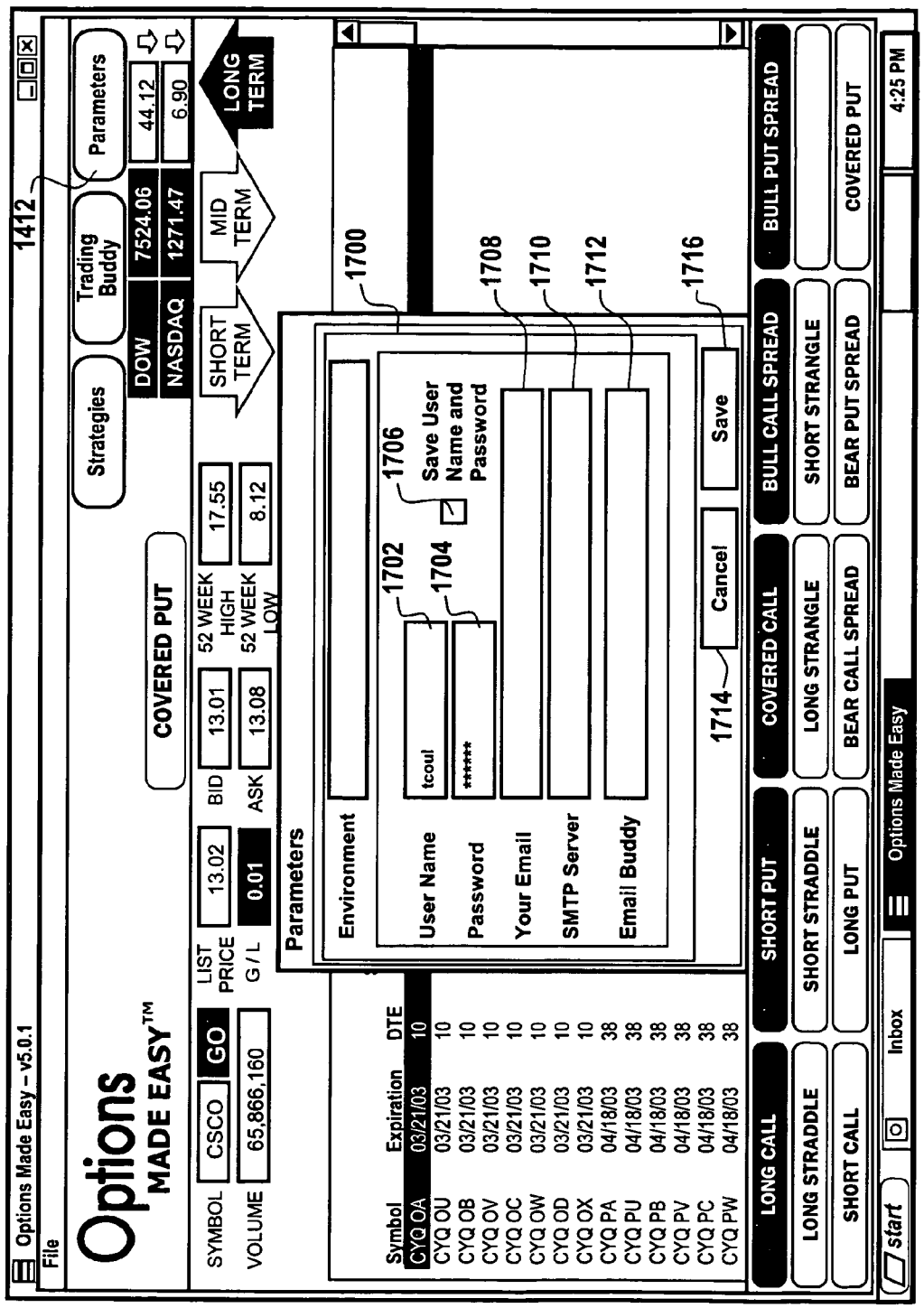
FIG. 17 is a Parameters Screen in accordance with an options embodiment of the present invention.

Now referring to FIG. 16, the Trading Buddy Screen 1600 is shown and will be described. As previously stated, the Trading Buddy Screen 1600 is accessed by clicking the trading buddy button 1410. The Trading Buddy Screen 1600 is a pop up screen that allows the user to confirm a trade and send information to a trading buddy, which is set up using the Parameters Screen 1700 (FIG. 17). More specifically, the user selects an option 1602 by clicking anywhere on the line with option data, clicks on the trading buddy button 1410 and either cancels the e-mail using the Cancel button 1604 or sends the e-mail using the Send button 1606. The body 1608 of the e-mail contains all of the information about the selected stock 1430 and option 1602. The user can type in additional notes within the e-mail body 1608 or change the subject line 1610 prior to sending the e-mail. Note that the user's e-mail program does not have to be open to send the e-mail to the user's trading buddy. Moreover, a copy of the e-mail is also sent to the user.

Referring now to FIG. 17, the Parameters Screen 1700 is shown and will be described. As previously stated, the Parameters Screen 1700 is accessed by clicking the parameters button 1412. The Parameters Screen 1700 is a pop up screen that allows the user to set his or her User Name 1702, Password 1704, Save User Name and Password 1706, Your Email 1708, SMTP Server 1710 and Email Buddy 1712. As described in reference to FIG. 16, Your Email 1708, SMTP Server 1710 and Email Buddy 1712 are used to send e-mails from the Trading Buddy Screen 1600 (FIG. 16) to the user and his or her trading buddy. The changes are either cancelled using the Cancel button 1714 or saved using the Save button 1716.

Figure 18:
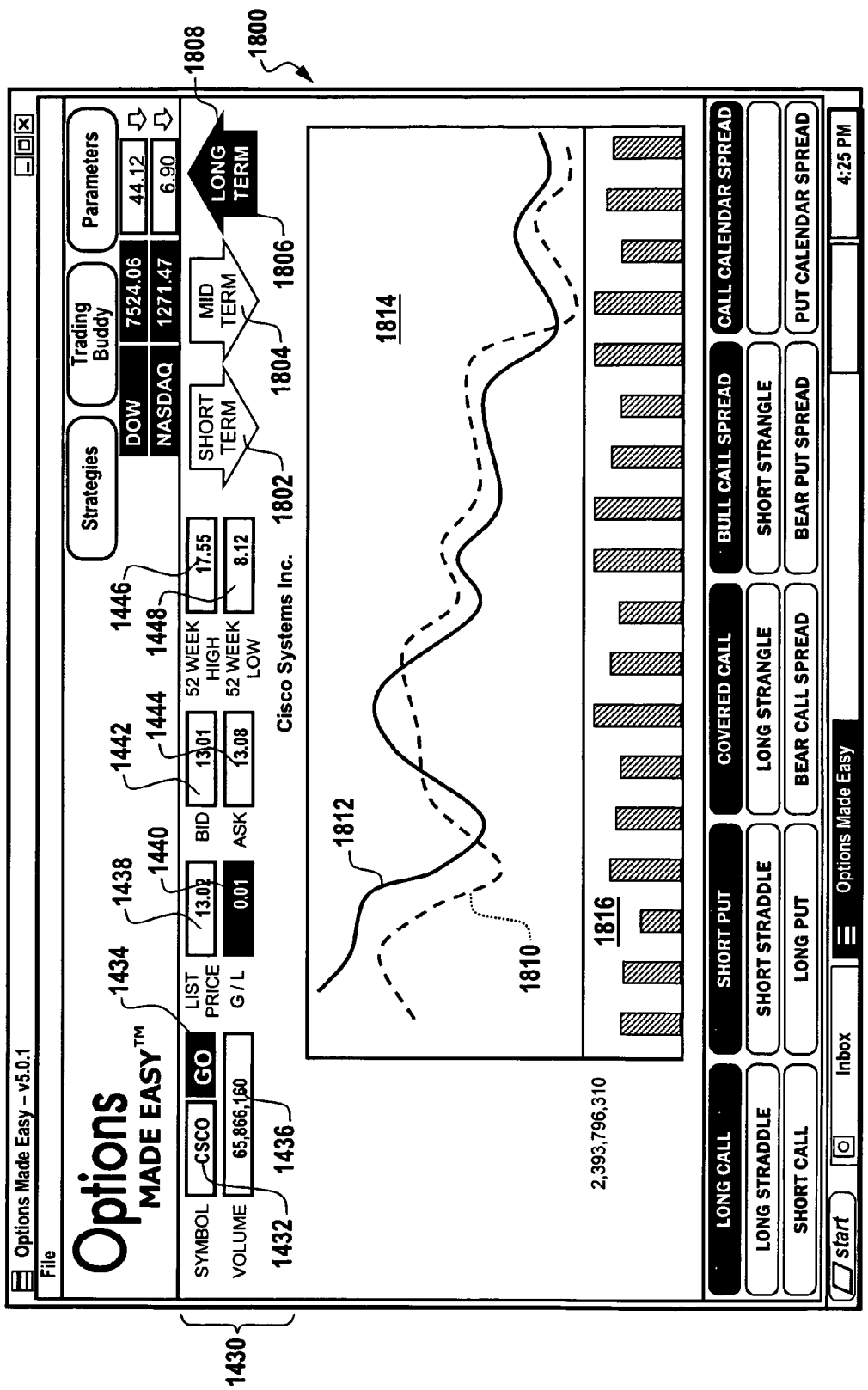
FIGS. 18, 19 and 20 are various Buy/Sell Pressure Indicator Screens in accordance with an options embodiment of the present invention.

Now referring to FIG. 18, a Buy/Sell Pressure Indicator Screen 1800 is shown and will be described. The Buy/Sell Pressure Indicator Screen 1800 is accessed by entering a ticker symbol 1432 for a stock and clicking on the GO button 1434. The present invention obtains the market information for the stock, displays the market information (volume 1436, last price 1438, gain/loss 1440 (field color is green if up and red if down), bid price 1442, asking price 1444, 52 week high 1446 and 52 week low 1448), and calculates the Buy/Sell Pressure Indicators for three time intervals (short term, mid term and long term). The short term (daily), mid term (weekly) and long term (monthly) data is displayed by clicking on the Short Term button 1802, Mid Term button 1804 or the Long Term button 1806. As shown, each term button 1802-1806 will be either a green colored up arrow, which indicates an upward trend (e.g., Long Term button 1806), or a red colored down arrow, which indicates a downward trend (e.g., Short Term button 1802 and Mid Term button 1804). Moreover, the type of data being displayed is indicated by a yellow colored highlight around the particular term button 1802-1806, which in this case is a yellow highlight 1808 around Long Term button 1806. Once selected, the Buy/Sell Pressure Indicators 1810 (closing value trend) and 1812 (opening value trend) for time intervals are displayed in upper chart 1814, and the volume for the intervals is displayed in lower chart 1816. The upper and lower charts 1814 and 1816 are changed by entering a new ticker symbol 1432, clicking on the GO button 1434, or clicking on one of the term buttons 1802-1806.

The present invention uses a regression analysis to calculate an opening value trend and a closing value trend for each of the time intervals (daily, weekly, monthly) for the selected stock. The color of the indicators 1802-1806 is based on a comparison of the opening value trend to the closing value trend for each time interval for the selected stock. The indicators 1802-1806 will be a first color when the closing value trend is greater than the opening value trend for each time interval and a second color when the closing value trend is less than the opening value trend for each time interval. The upper graph 1814, which is a multiple linear regression chart (MLR), displays two color coded regression lines, a red line 1812 and a green line 1810, generated using the present invention's algorithm against the selected time interval. The present invention preferably uses red to indicate opening prices and green to indicate closing prices. Other colors can be used. In general, the red line 1812 incorporates the algorithms and factors that tend to drive a price downward. Conversely, the green line 1810 integrates the algorithms and factors tend to drive the price upward. A user can quickly determine his or her your entry and exit points based on the crossover lines, which are displayed with red and green lights.

Any position on the green regression line 1810 represents a regression of a prior number of period's closing prices, such as four (4) prior monthly interval closing prices. This regression analysis builds and displays a trend of the closing prices over a period of time. Any position on the red regression line 1812 represents a regression of a prior number of period's opening prices, such as three (3) prior monthly interval opening prices. The current interval's opening price is not included in this calculation. This regression analysis builds and displays a trend of the opening prices of the investment over a period of time. When the green regression line 1810 is above the red regression line 1812 on the chart, favorable conditions for a long trade occur. When the red regression line 1812 is above the green regression line 1810 on the chart, favorable conditions for a short trade occur. A critical point occurs when the red regression line 1812 and the green regression line 1810 cross. When the green regression line 1810 crosses the red regression line 1906 and ascends above the red regression line 1812, the associated time interval indicator will become green. When the red regression line 1812 crosses the green regression line 11810 and ascends above the green regression line 1810, the associated time interval indicator will become red. The longer term trend indicators start to turn red as the movement continues. As the present invention updates the calculations and the indicators change, the investor can be notified via audible or visual alerts. The present invention can also sent electronic notifications to the investor.

More specifically, the algorithm uses seven critical data factors to perform "real-time" calculations at the rate of 800-1500 calculations per second to determine point of entry, point of exit, and trend analysis. The first four indicators are the Open, High, Low, and Close of each of the four time intervals. The next two are each Up tick and Down tick for every one of the four time intervals. The last, and most important, of the seven critical data factors is the Historic Data, exponentially weighted to volume because of the intrinsic price properties as it relates to the investment's price performance. The present invention then takes these seven critical data factors and integrates them into two summation formulas, the X+Y (represented by the green line) and the X−Y (represented by the red line). Both summation formulas are then calculated by an algorithm, which is then displayed by a red/green light indicator.

Figure 19:
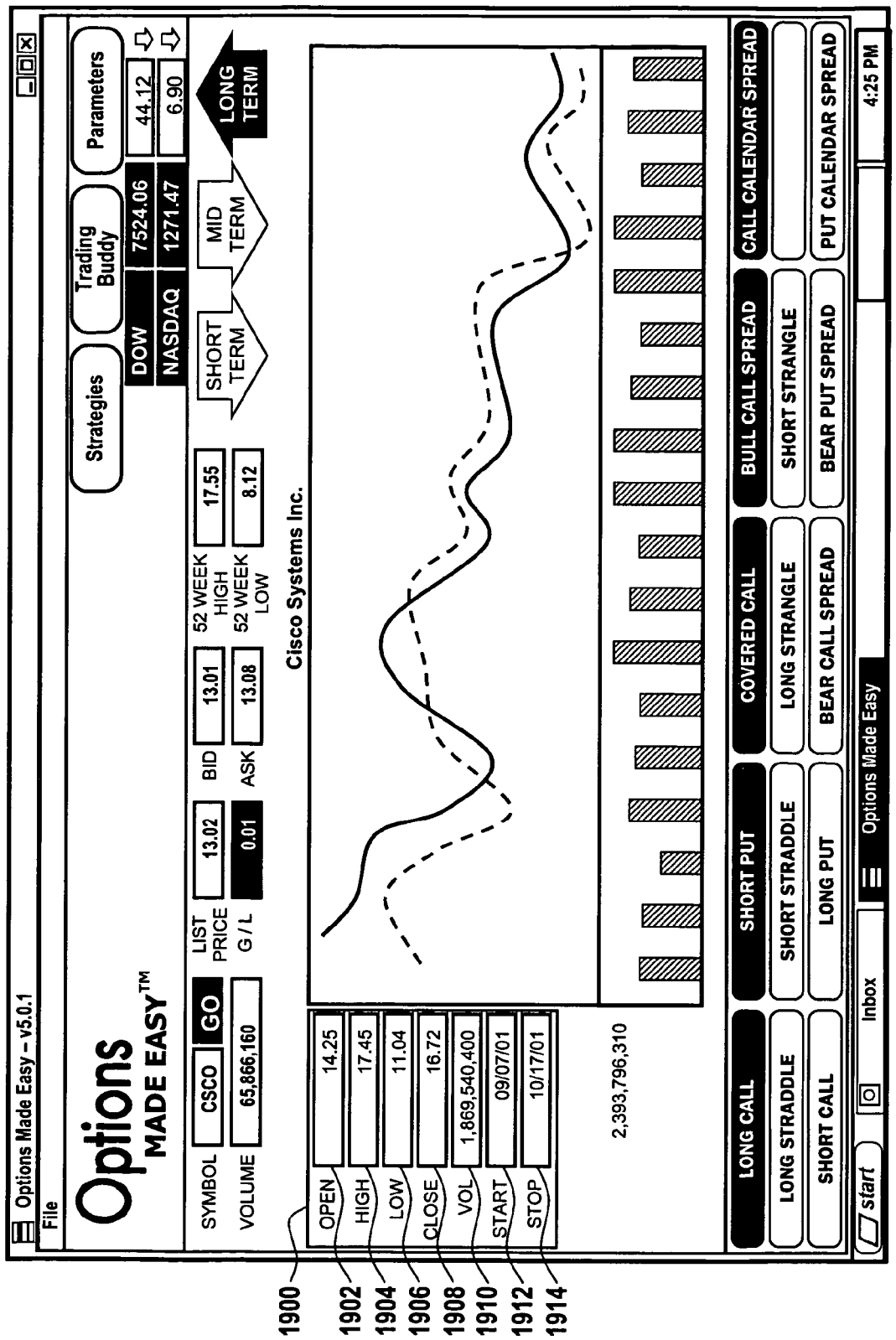
Figure 20:
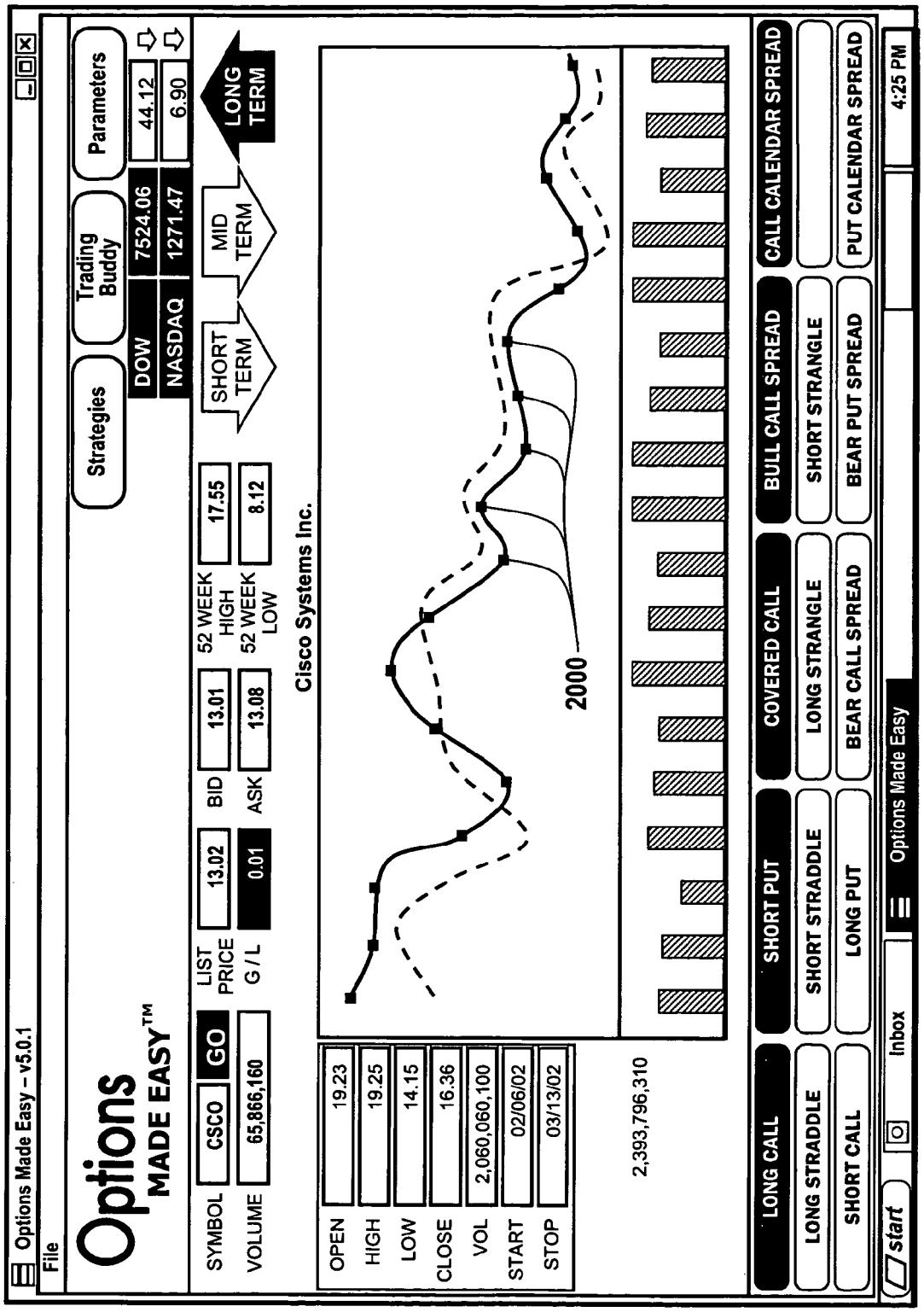

The investor may obtain more detailed information concerning a specific point along either the green regression line 1810 or the red regression line 1812 by clicking on the line at the desired point. As shown in FIG. 19, clicking on the green or red regression line 1810, 1812 causes popup window 1900 to be displayed. Popup window 1900 displays the open 1902, high 1904, low 1906, close 1908, volume 1910, start time 1912 and stop time 1914 for the selected point. As shown in FIG. 20, the specific data points on the green and red regression lines 1810 and 1812 can be indicated and displayed by block boxes 2000 on the respective lines. Note that graphs 1814 and 1816 are only representative of the market trend indicators and analyses available. The selection of multiple linear regression and volume analyses for a preferred embodiment of the present invention does not indicate that the present invention is limited to only those market trend indicators. There are many market trend indicators that the investor can consult to make better trade decisions, such as the following: stochastics, relative strength, directional movement, commodity channel, simple average, exponential average weighted average, MACD (simple), MACD (exponential), momentum/ROC, midrange, William's % R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

Figure 21:
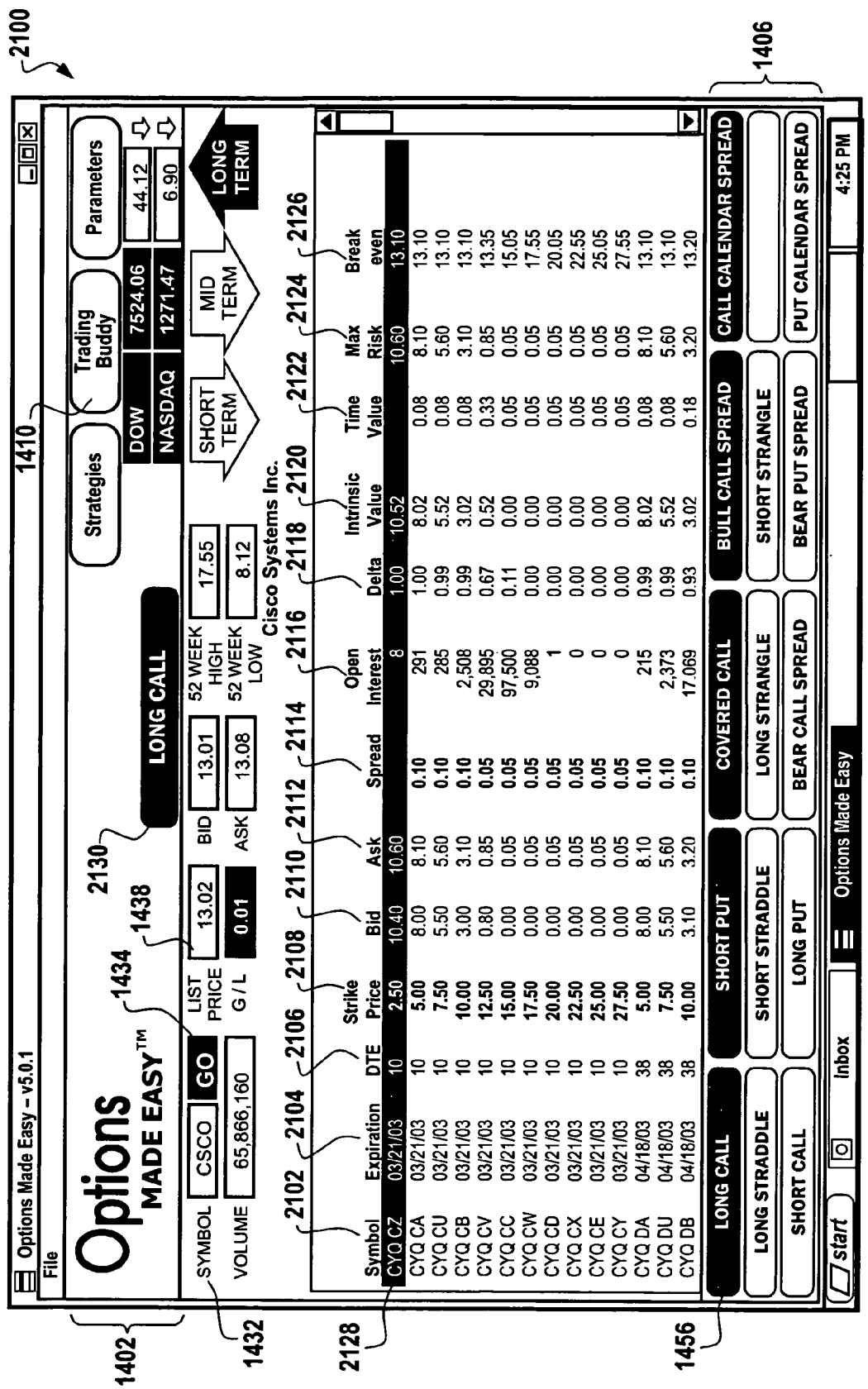
FIGS. 21-35 are some of the specific strategy data screens in accordance with an options embodiment of the present invention.

Referring now to FIGS. 21-35, some of the specific strategy data screens are shown and will be described. FIG. 21 is a strategy data screen 2100 for the Long Call strategy, which is accessible via button 1456. A Long Call is the purchasing of a call option, which represents the option to buy stock at a specific price (strike price 2108) in the future (on or before the expiration date 2104). Screen 2100 displays the option symbol 2102, expiration date 2104, number of days until expiration ("DTE") 2106, strike price 2108, bid price 2110, asking price 2112, spread 2114, open interest 2116, delta 2118, intrinsic value 2120, time value 2122, maximum risk 2124 and break even price 2126. The expiration date 2104 is the date on which the option and the right to exercise it cease to exist. The strike price 2108 (also referred to as the striking price, strike or exercise price) is the price at which the owner of an option can purchase the underlying stock. The spread 2114 is the difference between the bid price 2110 and the asking price 2112. Open interest 2116 is the total number of outstanding option contracts on a given series. Delta 2118 is the measure of the rate of change in an option's theoretical value for a one-unit change in the price of the underlying stock. Intrinsic value 2120 is the in-the-money portion of an option's price. A call option is in-the-money if the stock price 1438 is above the strike price 2108. The time value 2122 is the part of an option's total price that exceeds its intrinsic value 2120. The price of an out-of-the-money option consists entirely of time value. Maximum risk 2124 is the maximum amount of money that can be lost using this option strategy. Break even 2126 is the stock price at which the option strategy results in neither a profit nor a loss. The user can select an option 2128 by clicking anywhere on the line with option data. The option data can then be sent to a trading buddy using the trading buddy button 1410. The type of strategy (e.g., Long Call 2130) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 22:
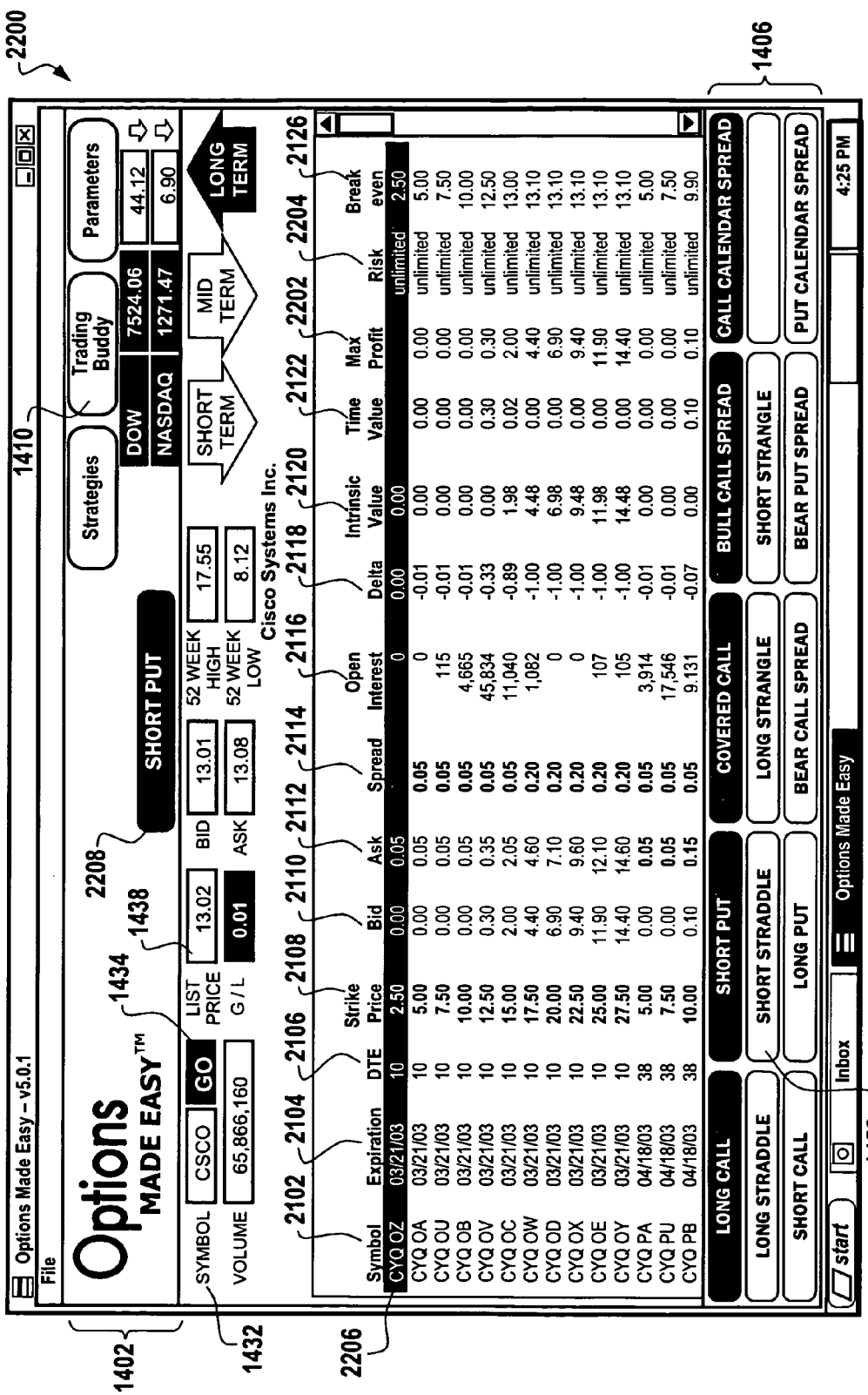

FIG. 22 is a strategy data screen 2200 for the Short Put strategy, which is accessible via button 1458. A Short Put is the writing of a put option, which represents an obligation to sell stock at a specific price (strike price 2108) in the future (on or before the expiration date 2104). Screen 2200 displays the option symbol 2102, expiration date 2104, number of days until expiration ("DTE") 2106, strike price 2108, bid price 2110, asking price 2112, spread 2114, open interest 2116, delta 2118, intrinsic value 2120, time value 2122, maximum profit 2202, risk 2204 and break even price 2126. The expiration date 2104 is the date on which the option and the right to exercise it cease to exist. The strike price 2108 (also referred to as the striking price, strike or exercise price) is the price at which the owner of an option can sell the underlying stock. The spread 2114 is the difference between the bid price 2110 and the asking price 2112. Open interest 2116 is the total number of outstanding option contracts on a given series. Delta 2118 is the measure of the rate of change in an option's theoretical value for a one-unit change in the price of the underlying stock. Intrinsic value 2120 is the in-the-money portion of an option's price. A put is in-the-money if the stock price 1438 is below the strike price 2108. The time value 2122 is the part of an option's total price that exceeds its intrinsic value 2120. The price of an out-of-the-money option consists entirely of time value. The maximum profit 2202 is the maximum amount of money that can be made using this option strategy. Risk 2204 is the amount of money that can be lost using this option strategy. Break even 2126 is the stock price at which the option strategy results in neither a profit nor a loss. The user can select an option 2206 by clicking anywhere on the line with option data. The option data can then be sent to a trading buddy using the trading buddy button 1410. The type of strategy (e.g., Short Put 2208) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 23:
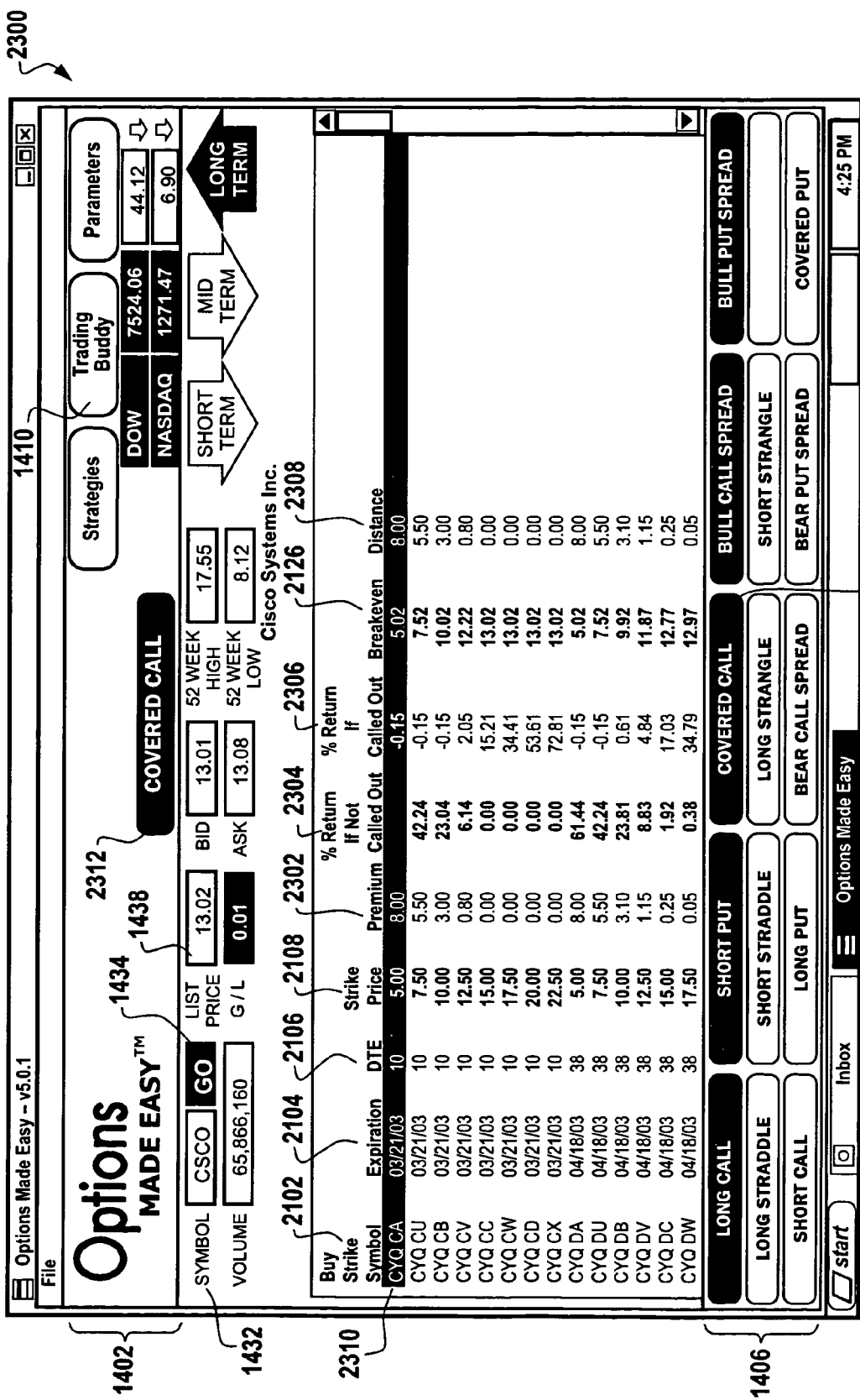

FIG. 23 is a strategy data screen 2300 for the Covered Call strategy, which is accessible via button 1460. A Covered Call is the writing of a call option against an equivalent amount of long stock (e.g., writing two XYZ May 60 calls while owning 200 shares or more of XYZ stock). Screen 2300 displays the option symbol 2102, expiration date 2104, number of days until expiration ("DTE") 2106, strike price 2108, premium 2302, percent if not called out 2304, percent if called out 2306, break even price 2126 and distance 2308. The expiration date 2104 is the date on which the option and the right to exercise it cease to exist. The strike price 2108 (also referred to as the striking price, strike or exercise price) is the price at which the owner of an option can purchase the underlying stock. The premium 2302 is the total price of the option (intrinsic value plus time value). The percent return if not called out 2304 (typically displayed in green if a gain and red if a loss) is the percent gain/loss made if the call is exercised ((Last Price 1438−(Strike Price 2108 +Premium 2302))/Last Price 1438). The percent return if called out 2306 (typically displayed in green if a gain and red if a loss) is the percent gain/loss made if the call is not exercised (Premium 2302/Last Price 1438). Break even 2126 is the stock price at which the option strategy results in neither a profit nor a loss. Distance 2308 is the difference between the last price 1438 and the break even price 2126). The user can select an option 2310 by clicking anywhere on the line with option data. The option data can then be sent to a trading buddy using the trading buddy button 1410. The type of strategy (e.g., Covered Call 2312) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 24:
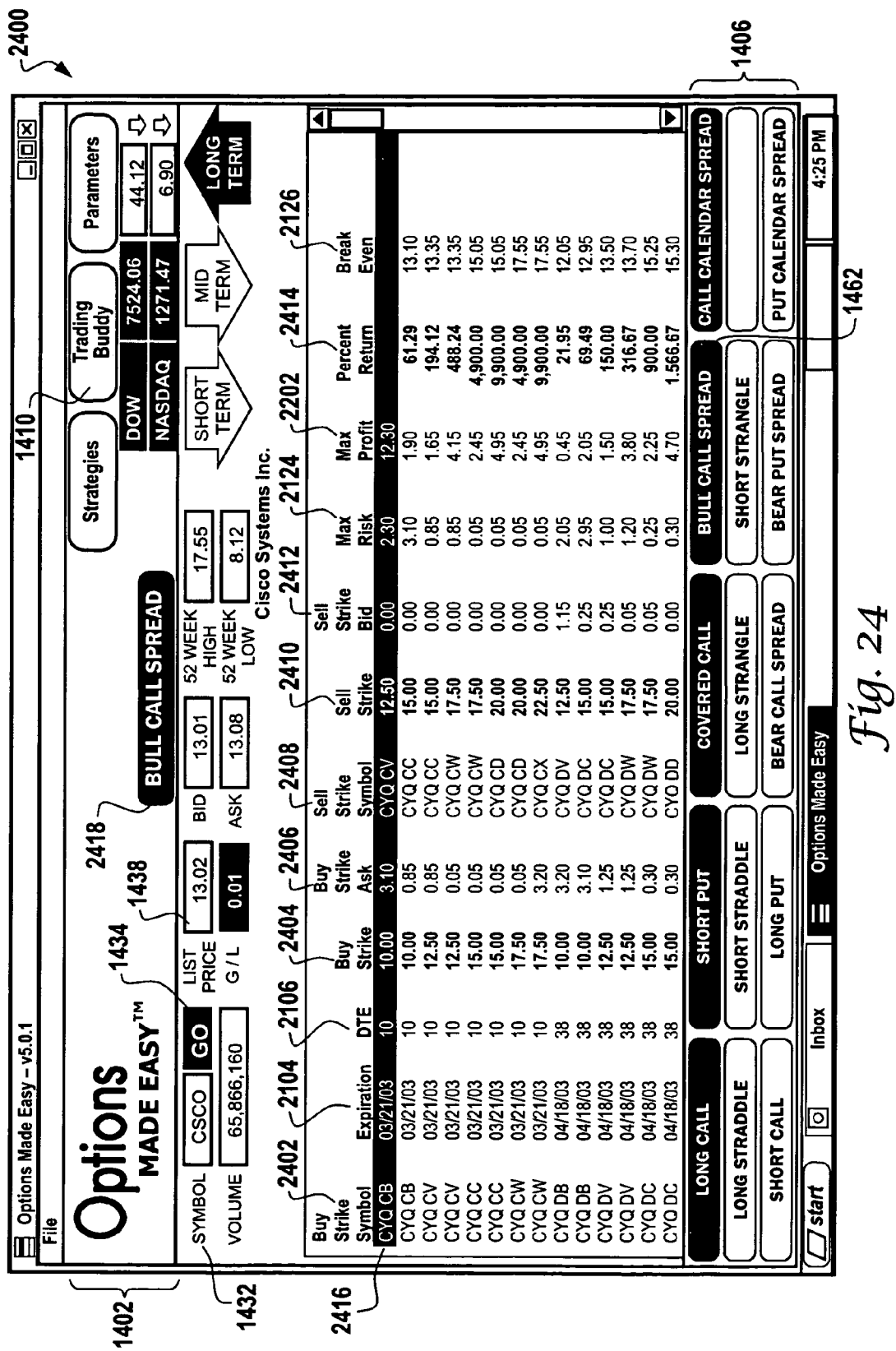

FIG. 24 is a strategy data screen 2400 for the Bull Call Spread strategy, which is accessible via button 1462. A Bull Call Spread is the simultaneous purchase of one call option with a lower strike (buy strike price 2404) and the writing of another call option with a higher strike price (sell strike price 2410) (e.g., buying one XYZ May 60 call and writing one XYZ May 65 call). Screen 2400 displays the buy strike symbol 2402 for the call to be purchased, expiration date 2104, number of days until expiration ("DTE") 2106, strike price 2404 for the call to be purchased, asking price 2406 for the call to be purchased, option symbol 2408 for the call to be written, strike price 2410 for the call to be written, bidding price 2412 for the call to be written, maximum risk 2124, maximum profit 2202, percent return 2414 and break even price 2126. The expiration date 2104 is the date on which both options and the right to exercise them cease to exist. The strike prices 2404 and 2410 (also referred to as the striking price, strike or exercise price) are the prices at which the owner of an option can purchase the underlying stock. Maximum risk 2124 is the maximum amount of money that can be lost using this option strategy. Maximum profit 2202 (typically displayed in green if a gain and red if a loss) is the maximum amount of money that can be made using this option strategy.

Percent return 2414 (typically displayed in green if a gain and red if a loss) is based on the maximum profit 2202 and the maximum risk 2124. Break even 2126 is the stock price at which the option strategy results in neither a profit nor a loss. The user can select an option 2416 by clicking anywhere on the line with option data. The option data can then be sent to a trading buddy using the trading buddy button 1410. The type of strategy (e.g., Bull Call Spread 2418) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 25:
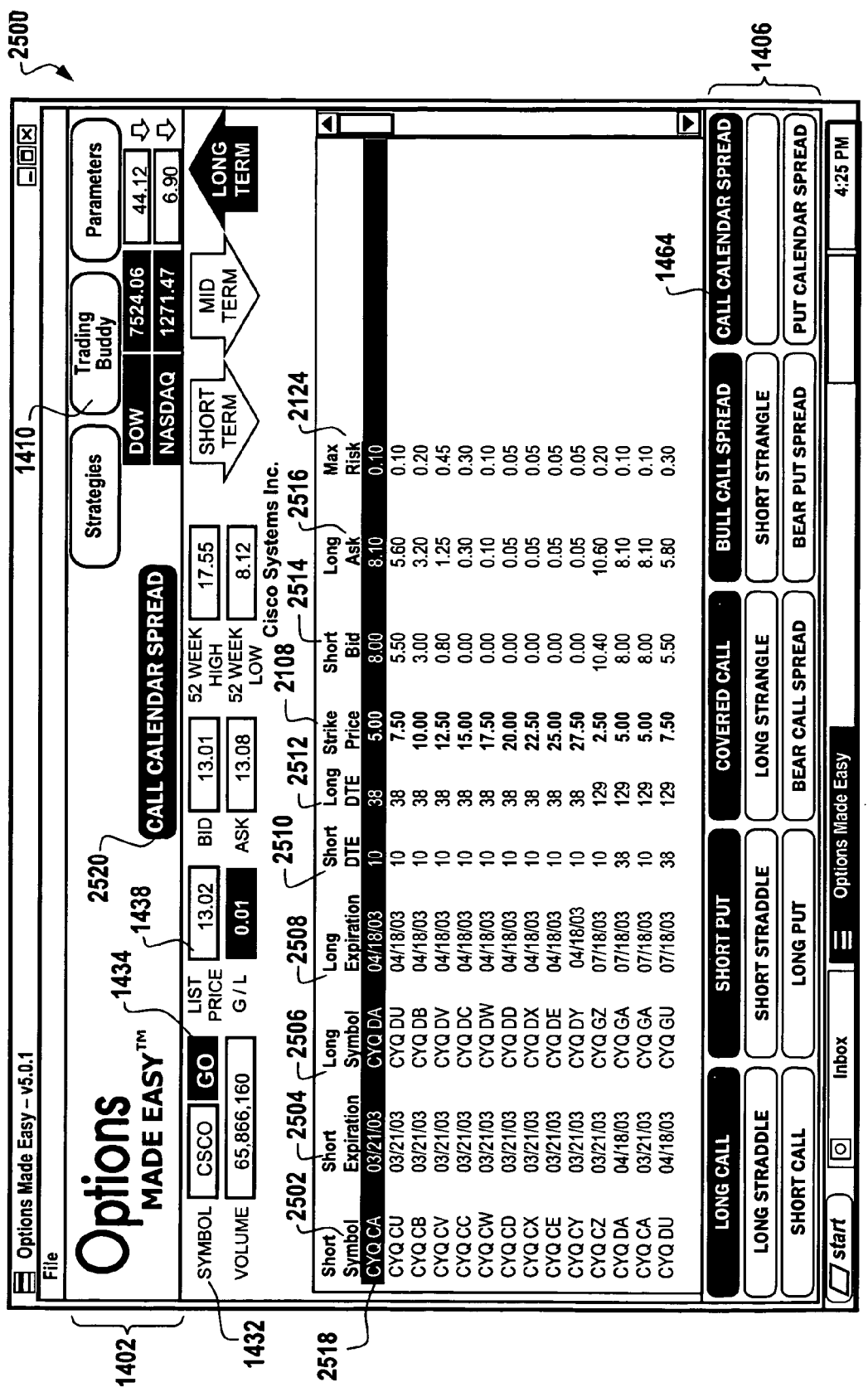

FIG. 25 is a strategy data screen 2500 for the Call Calendar Spread strategy, which is accessible via button 1464. A Call Calendar Spread is the purchase of a farther-term call (long symbol 2506 with long expiration 2508) and the writing of a nearer-term call (short symbol 2502 with short expiration 2504) at the same strike price 2508 (e.g., buying one XYZ May 60 call (far term) and writing one XYZ March 60 call (near term)). Screen 2500 displays the short symbol 2502 for the near term call to be purchased, short expiration 2504 for the near term call to be purchased, long symbol 2506 for the far term call to be written, long expiration 2508 for the far term call to be written, number of days until expiration of the near term call to be purchased ("Short DTE") 2510, number of days until expiration of the far term call to be written ("Long DTE") 2512, strike price 2108 for both the calls, bidding price 2514 for the near term call to be purchased, asking price 2516 for the far term call to be written and maximum risk 2124. The expiration dates 2504 and 2508 are the dates on which the respective options and the right to exercise them cease to exist. The strike price 2108 (also referred to as the striking price, strike or exercise price) is the price at which the owner of an option can purchase the underlying stock. Maximum risk 2124 is the maximum amount of money that can be lost using this option strategy. The user can select an option 2518 by clicking anywhere on the line with option data. The option data can then be sent to a trading buddy using the trading buddy button 1410. The type of strategy (e.g., Call Calendar Spread 2520) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 26:
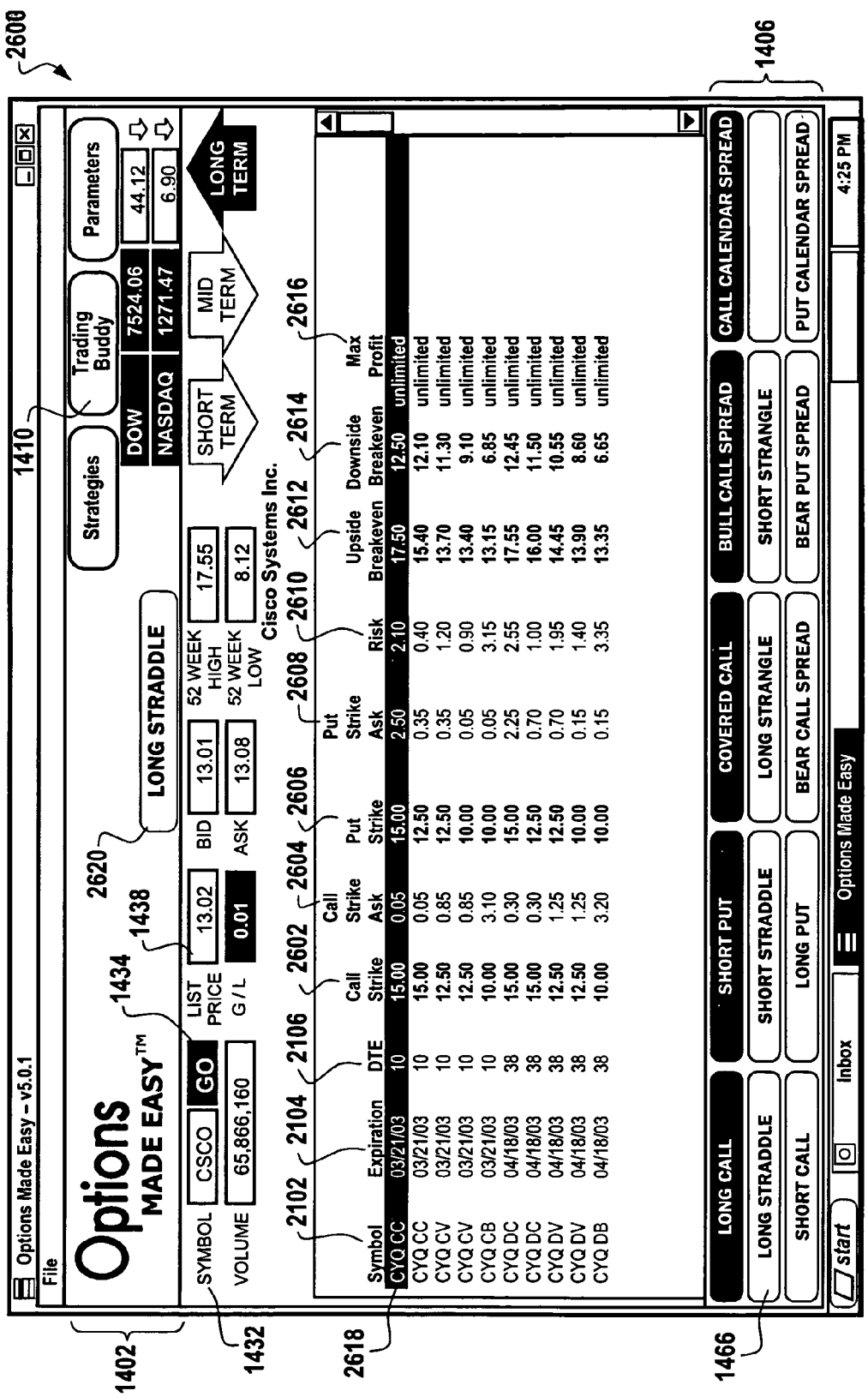

FIG. 26 is a strategy data screen 2600 for the Long Straddle strategy, which is accessible via button 1466. A Long Straddle is purchasing one call and one put with the same or different strike prices and same expiration (e.g., purchasing one XYZ May 60 call and one XYZ May 60 put). Screen 2600 displays the option symbol 2102, expiration date 2104, number of days until expiration ("DTE") 2106, call strike price 2602, call asking price 2604, put strike price 2606, put asking price 2608, risk 2610, upside break even price 2612, downside breakeven price 2614 and maximum profit 1616. The expiration date 2104 is the date on which the options and the right to exercise them cease to exist. The strike prices 2602 and 2608 (also referred to as the striking price, strike or exercise price) are the prices at which the owner of an option can purchase the underlying stock (call strike 2602) and sell the underlying stock (put strike 2608). The asking prices 2604 and 2608 are the asking prices for the options (call strike asking price 2604 and put strike asking price 2608). The risk 2610 is the amount of money that can be lost using this option strategy. The upside break even price 1612 is the stock price at which the option strategy results in a profit if the stock price rises. The downside break even price 1614 is the stock price at which the option strategy results in a profit if the stock price goes down. The maximum profit 2616 is the maximum amount of money that can be gained using this option strategy. The user can select an option 2618 by clicking anywhere on the line with option data. The option data can then be sent to a trading buddy using the trading buddy button 1410. The type of strategy (e.g., Long Straddle 2620) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 27:
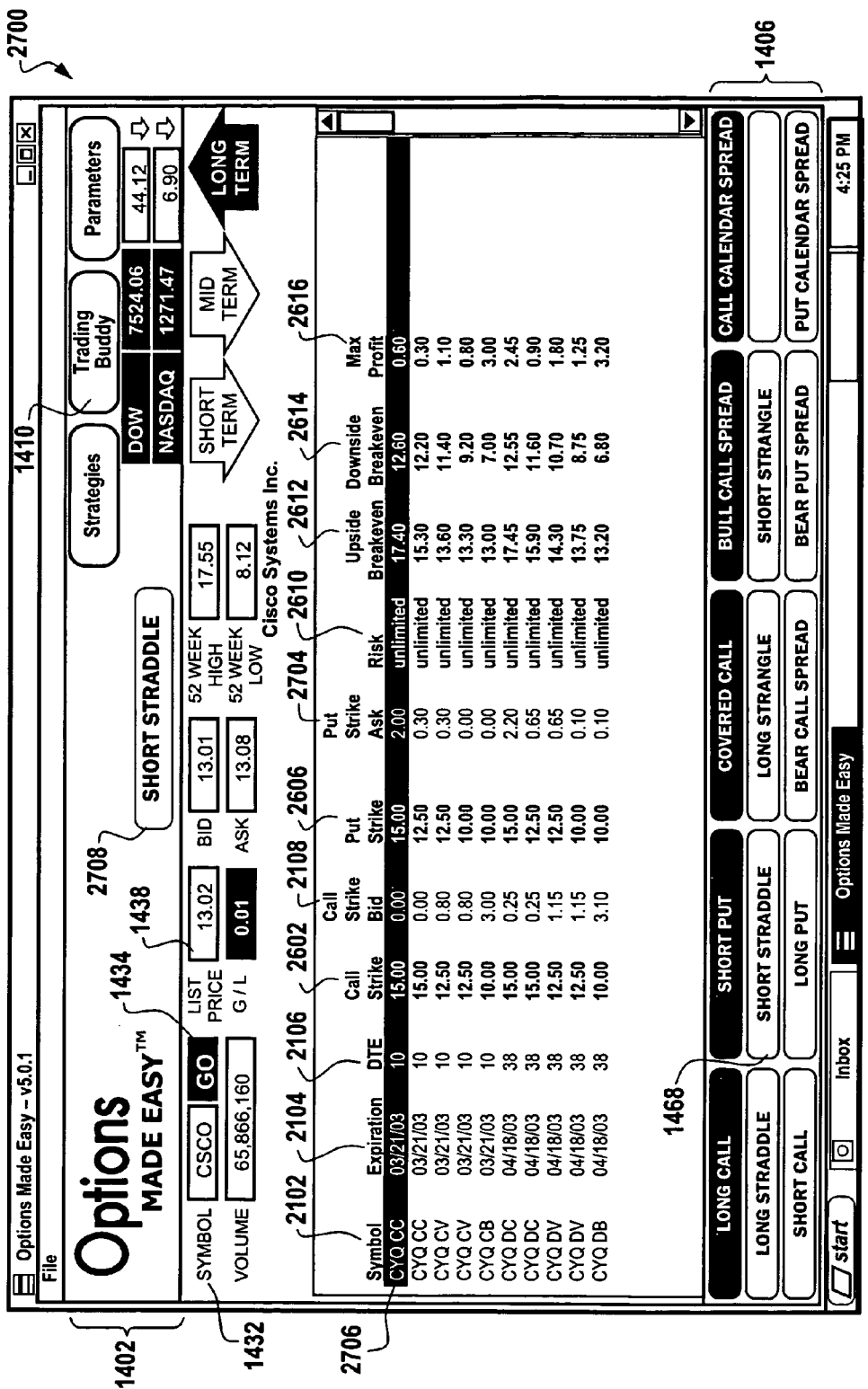

FIG. 27 is a strategy data screen 2700 for the Short Straddle strategy, which is accessible via button 1468. A Short Straddle is writing one call and one put with the same or different strike price and the same expiration (e.g., writing one XYZ May 60 call and one XYZ May 60 put). Screen 2700 displays the option symbol 2102, expiration date 2104, number of days until expiration ("DTE") 2106, call strike price 2602, call bidding price 2702, put strike price 2606, put bidding price 2704, risk 2610, upside break even price 2612, downside breakeven price 2614 and maximum profit 1616. The expiration date 2104 is the date on which the options and the right to exercise them cease to exist. The strike prices 2602 and 2608 (also referred to as the striking price, strike or exercise price) are the prices at which the owner of an option can purchase the underlying stock (call strike 2602) and sell the underlying stock (put strike 2608). The bidding prices 2702 and 2704 are the bidding prices for the options (call strike bidding price 2702 and put strike bidding price 2704). The risk 2610 is the amount of money that can be lost using this option strategy. The upside break even price 2612 is the stock price at which the option strategy results in a profit if the stock price rises. The downside break even price 2614 is the stock price at which the option strategy results in a profit if the stock price goes down. The maximum profit 2616 is the maximum amount of money that can be gained using this option strategy. The user can select an option 2706 by clicking anywhere on the line with option data. The option data can then be sent to a trading buddy using the trading buddy button 1410. The type of strategy (e.g., Short Straddle 2708) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 28:
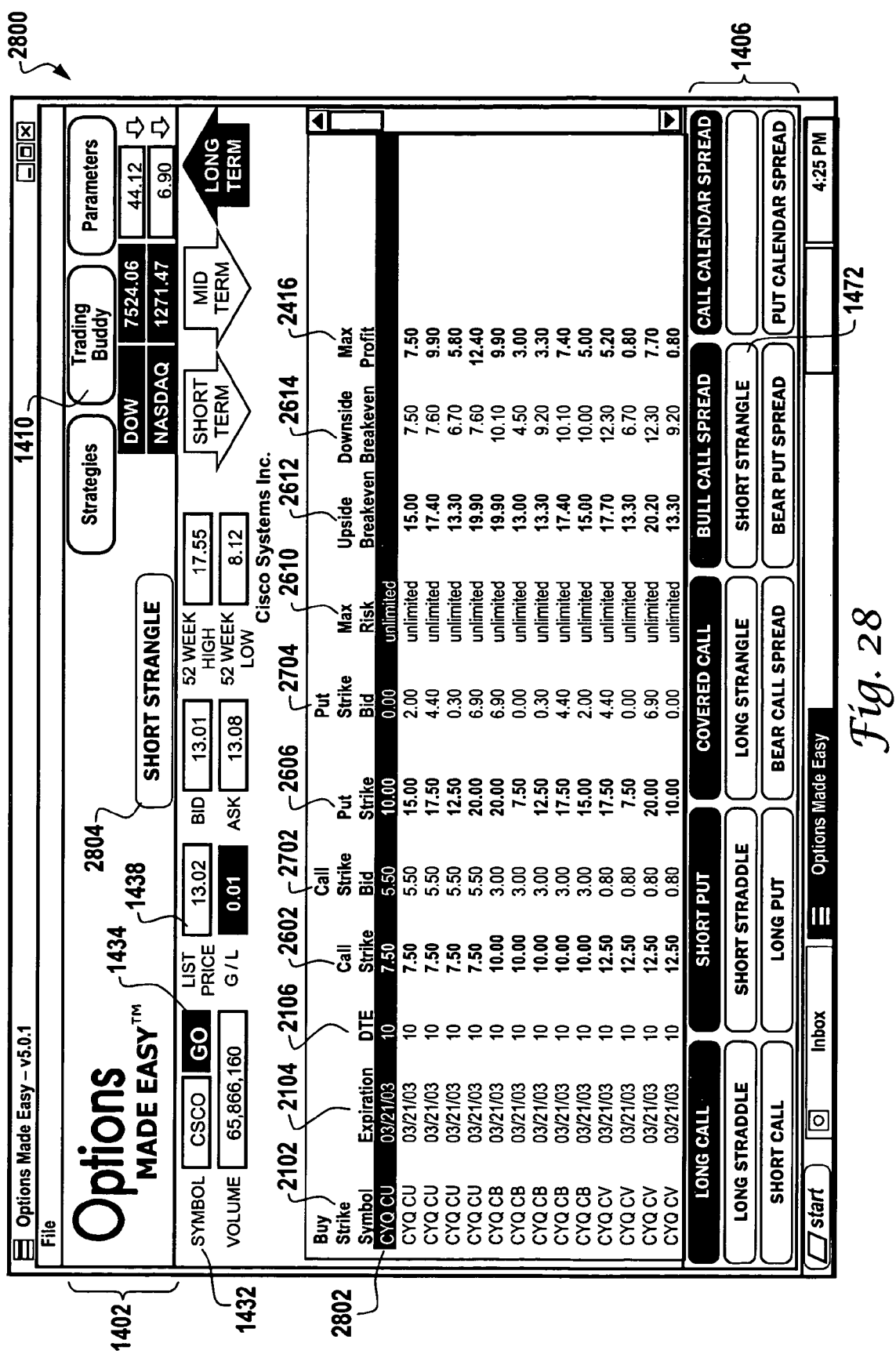

FIG. 28 is a strategy data screen 2800 for the Short Strangle strategy, which is accessible via button 1472. A Short Strangle is writing a put option and a call option with the same expiration dates and strike prices which are out of the money (the stock price is above the strike price for the put option and below the strike price for the call option). Screen 2800 displays the option symbol 2102, expiration date 2104, number of days until expiration ("DTE") 2106, call strike price 2602, call bidding price 2702, put strike price 2606, put bidding price 2704, risk 2610, upside break even price 2612, downside breakeven price 2614 and maximum profit 1616. The expiration date 2104 is the date on which the options and the right to exercise them cease to exist. The strike prices 2602 and 2608 (also referred to as the striking price, strike or exercise price) are the prices at which the owner of an option can purchase the underlying stock (call strike 2602) and sell the underlying stock (put strike 2608). The bidding prices 2702 and 2704 are the bidding prices for the options (call strike bidding price 2702 and put strike bidding price 2704). The maximum risk 2610 is the amount of money that can be lost using this option strategy. The upside break even price 2612 is the stock price at which the option strategy results in a profit if the stock price rises. The downside break even price 2614 is the stock price at which the option strategy results in a profit if the stock price goes down. The maximum profit 2616 is the maximum amount of money that can be gained using this option strategy. The user can select an option 2802 by clicking anywhere on the line with option data. The option data can then be sent to a trading buddy using the trading buddy button 1410. The type of strategy (e.g., Short Strangle 2804) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 29:
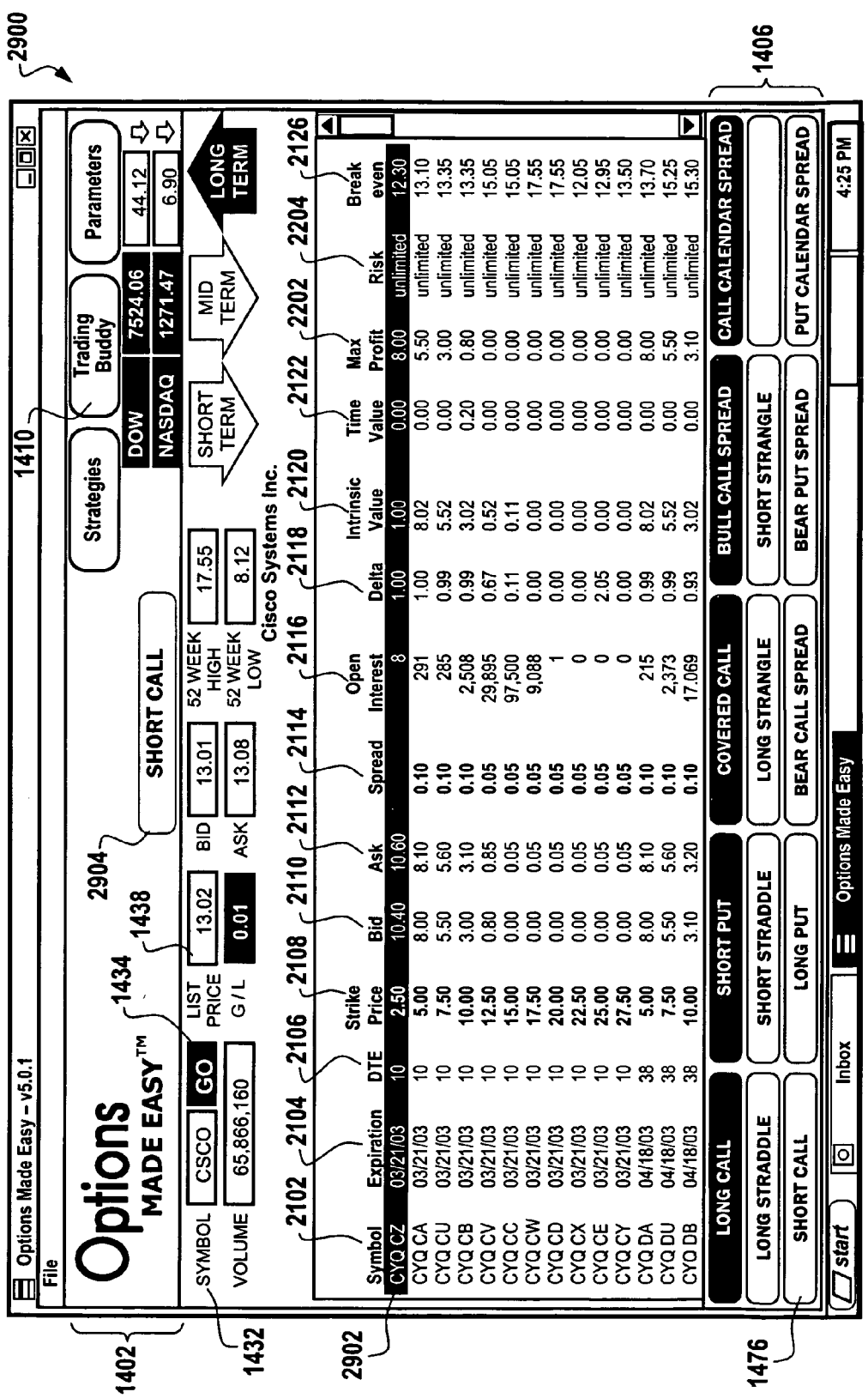

FIG. 29 is a strategy data screen 2900 for the Short Call strategy, which is accessible via button 1476. A Short Call is the writing of a call option, which represents the option to buy stock at a specific price (strike price 2108) in the future (on or before the expiration date 2104). Screen 2900 displays the option symbol 2102, expiration date 2104, number of days until expiration ("DTE") 2106, strike price 2108, bid price 2110, asking price 2112, spread 2114, open interest 2116, delta 2118, intrinsic value 2120, time value 2122, maximum risk 2124 and break even price 2126. The expiration date 2104 is the date on which the option and the right to exercise it cease to exist. The strike price 2108 (also referred to as the striking price, strike or exercise price) is the price at which the owner of an option can purchase the underlying stock. The spread 2114 is the difference between the bid price 2110 and the asking price 2112. Open interest 2116 is the total number of outstanding option contracts on a given series. Delta 2118 is the measure of the rate of change in an option's theoretical value for a one-unit change in the price of the underlying stock. Intrinsic value 2120 is the in-the-money portion of an option's price. A call option is in-the-money if the stock price 1438 is above the strike price 2108. The time value 2122 is the part of an option's total price that exceeds its intrinsic value 2120. The price of an out-of-the-money option consists entirely of time value. Maximum profit 2202 is the maximum amount of money that can be gained using this option strategy. Risk 2204 is the maximum amount of money that can be lost using this option strategy. Break even 2126 is the stock price at which the option strategy results in neither a profit nor a loss. The user can select an option 2802 by clicking anywhere on the line with option data. The option data can then be sent to a trading buddy using the trading buddy button 1410. The type of strategy (e.g., Short Call 2904) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 30:
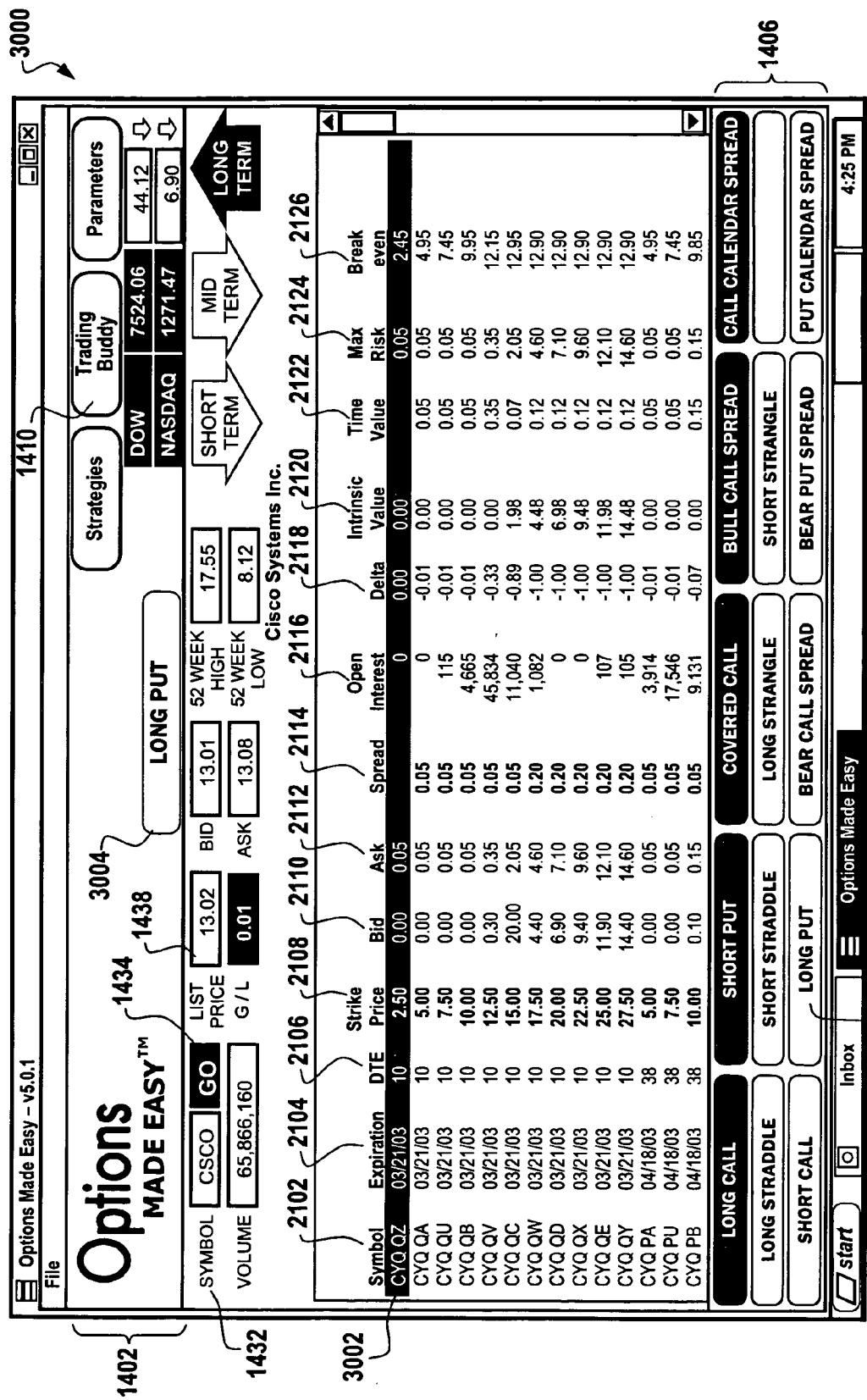

FIG. 30 is a strategy data screen 3000 for the Long Put strategy, which is accessible via button 1478. A Long Put is the purchase of a put option, which represents the option to sell stock at a specific price (strike price 2108) in the future (on or before the expiration date 2104). Screen 2300 displays the option symbol 2102, expiration date 2104, number of days until expiration ("DTE") 2106, strike price 2108, bid price 2110, asking price 2112, spread 2114, open interest 2116, delta 2118, intrinsic value 2120, time value 2122, maximum risk 2124 and break even price 2126. The expiration date 2104 is the date on which the option and the right to exercise it cease to exist. The strike price 2108 (also referred to as the striking price, strike or exercise price) is the price at which the owner of an option can sell the underlying stock. The spread 2114 is the difference between the bid price 2110 and the asking price 2112. Open interest 2116 is the total number of outstanding option contracts on a given series. Delta 2118 is the measure of the rate of change in an option's theoretical value for a one-unit change in the price of the underlying stock. Intrinsic value 2120 is the in-the-money portion of an option's price. A put is in-the-money if the stock price 1438 is below the strike price 2108. The time value 2122 is the part of an option's total price that exceeds its intrinsic value 2120. The price of an out-of-the-money option consists entirely of time value. Maximum risk 2124 is the maximum amount of money that can be lost using this option strategy. Break even 2126 is the stock price at which the option strategy results in neither a profit nor a loss. The user can select an option 3002 by clicking anywhere on the line with option data. The option data can then be sent to a trading buddy using the trading buddy button 1410. The type of strategy (e.g., Long Put 3004) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 31:
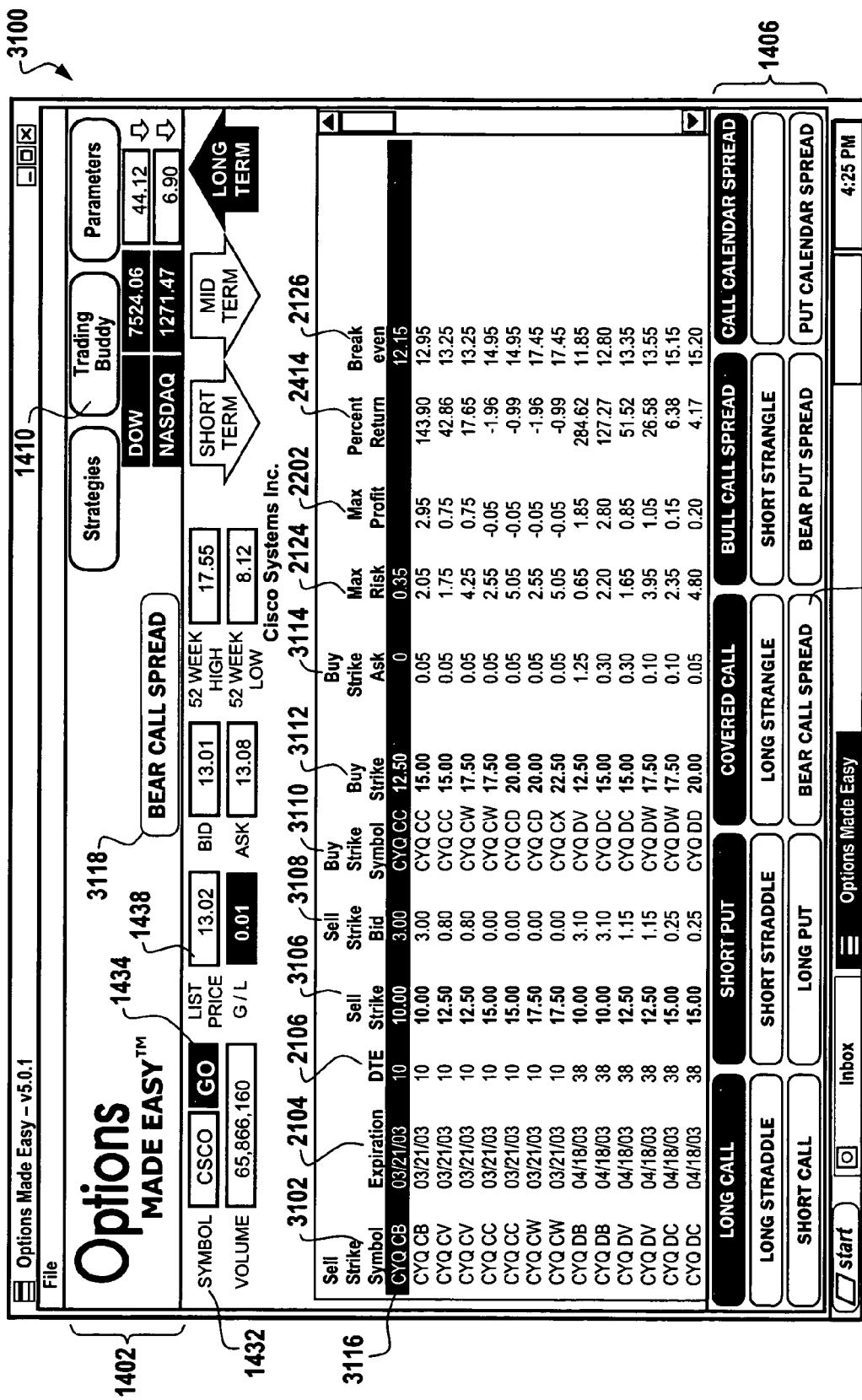

FIG. 31 is a strategy data screen 3100 for the Bear Call Spread strategy, which is accessible via button 1480. A Bear Call Spread is the simultaneous writing of one call option with a lower strike (sell strike price 3106) and the purchase of another call option with a higher strike price (buy strike price 3110) (e.g., writing one XYZ May 60 call and buying one XYZ May 65 call). Screen 3100 displays the buy strike symbol 3102 for the call to be written, expiration date 2104, number of days until expiration ("DTE") 2106, strike price 3106 for the call to be written, bidding price 3108 for the call to be written, option symbol 3110 for the call to be purchased, strike price 3112 for the call to be purchased, asking price 3114 for the call to be purchased, maximum risk 2124, maximum profit 2202, percent return 2414 and break even price 2126. The expiration date 2104 is the date on which both options and the right to exercise them cease to exist. The strike prices 3106 and 3112 (also referred to as the striking price, strike or exercise price) are the prices at which the owner of an option can purchase the underlying stock. Maximum risk 2124 is the maximum amount of money that can be lost using this option strategy. Maximum profit 2202 (typically displayed in green if a gain and red if a loss) is the maximum amount of money that can be made using this option strategy. Percent return 2414 (typically displayed in green if a gain and red if a loss) is based on the maximum profit 2202 and the maximum risk 2124. Break even 2126 is the stock price at which the option strategy results in neither a profit nor a loss. The user can select an option 3116 by clicking anywhere on the line with option data. The option data can then be sent to a trading buddy using the trading buddy button 1410. The type of strategy (e.g., Bear Call Spread 3118) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 32:
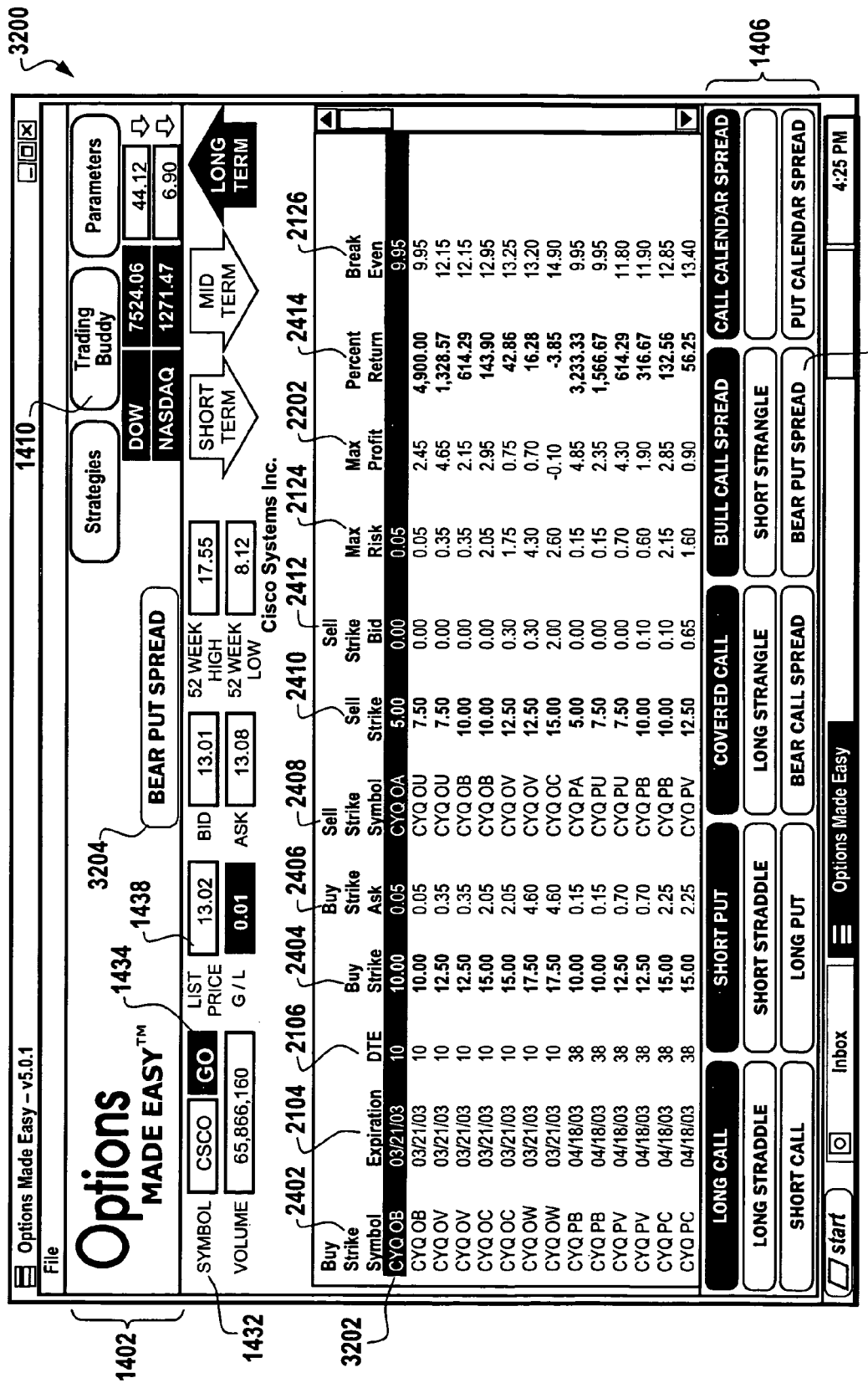

FIG. 32 is a strategy data screen 3200 for the Bear Put Spread strategy, which is accessible via button 1482. A Bear Put Spread is the simultaneous purchase of one put option with a higher strike (buy strike price 2404) and the writing of another put option with a lower strike price (sell strike price 2410) (e.g., buying one XYZ May 60 put and writing one XYZ May 55 put). Screen 3200 displays the buy strike symbol 2402 for the put to be purchased, expiration date 2104, number of days until expiration ("DTE") 2106, strike price 2404 for the put to be purchased, asking price 2406 for the put to be purchased, option symbol 2408 for the put to be written, strike price 2410 for the put to be written, bidding price 2412 for the put to be written, maximum risk 2124, maximum profit 2202, percent return 2414 and break even price 2126. The expiration date 2104 is the date on which both options and the right to exercise them cease to exist. The strike prices 2404 and 2410 (also referred to as the striking price, strike or exercise price) are the prices at which the owner of an option can sell the underlying stock. Maximum risk 2124 is the maximum amount of money that can be lost using this option strategy. Maximum profit 2202 (typically displayed in green if a gain and red if a loss) is the maximum amount of money that can be made using this option strategy. Percent return 2414 (typically displayed in green if a gain and red if a loss) is based on the maximum profit 2202 and the maximum risk 2124. Break even 2126 is the stock price at which the option strategy results in neither a profit nor a loss. The user can select an option 3202 by clicking anywhere on the line with option data. The option data can then be sent to a trading buddy using the trading buddy button 1410. The type of strategy (e.g., Bear Put Spread 3204) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 33:
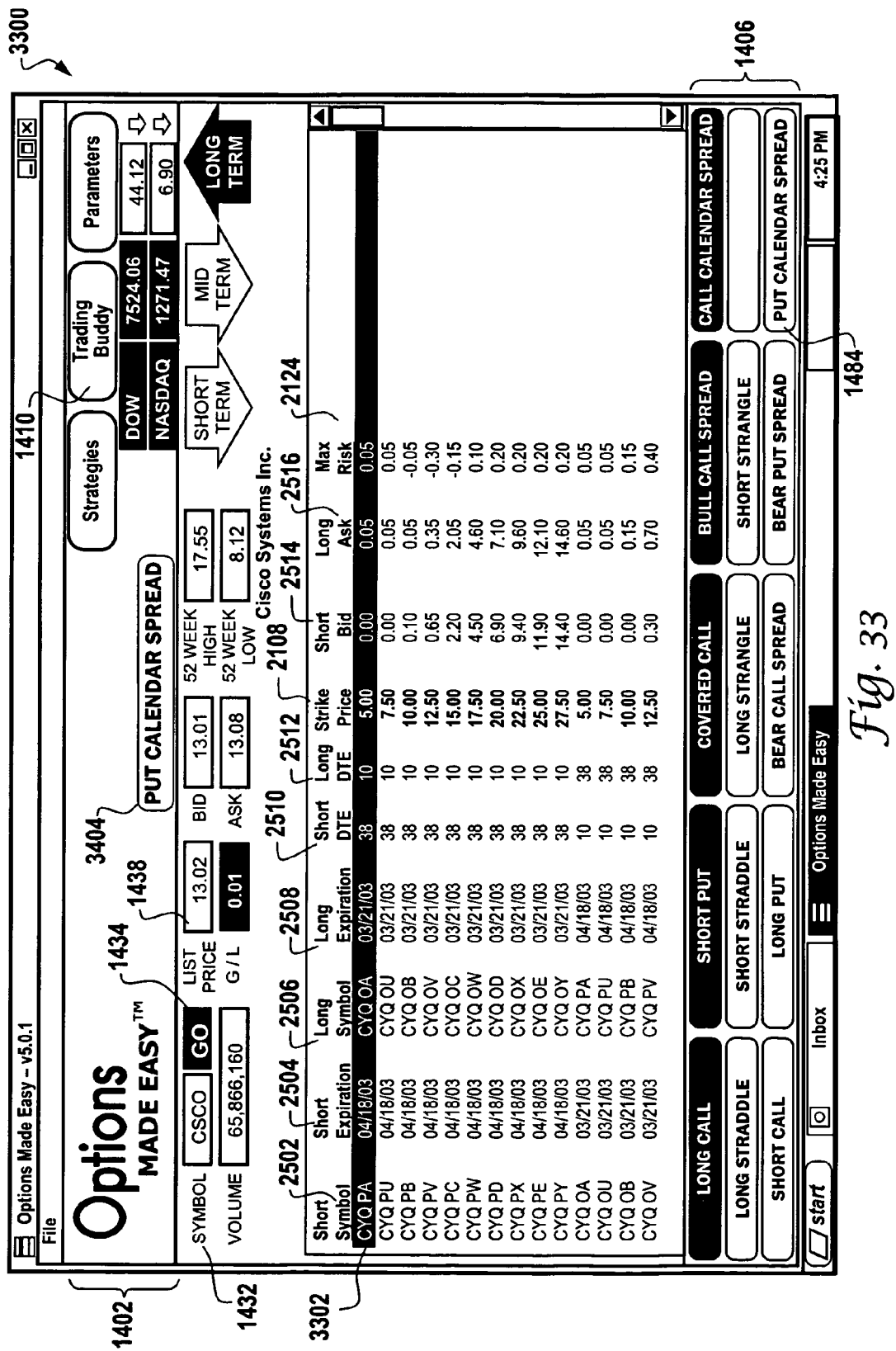

FIG. 33 is a strategy data screen 3300 for the Put Calendar Spread strategy, which is accessible via button 1484. A Put Calendar Spread is the purchase of a farther-term put (long symbol 2506 with long expiration 2508) and the writing of a nearer-term put (short symbol 2502 with short expiration 2504) at the same strike price 2508 (e.g., buying one XYZ May 60 put (far term) and writing one XYZ March 60 put (near term)). Screen 3300 displays the short symbol 2502 for the near term put to be purchased, short expiration 2504 for the near term put to be purchased, long symbol 2506 for the far term put to be written, long expiration 2508 for the far term put to be written, number of days until expiration of the near term put to be purchased ("Short DTE") 2510, number of days until expiration of the far term put to be written ("Long DTE") 2512, strike price 2108 for both the puts, bidding price 2514 for the near term put to be purchased, asking price 2516 for the far term put to be written and maximum risk 2124. The expiration dates 2504 and 2508 are the dates on which the respective options and the right to exercise them cease to exist. The strike price 2108 (also referred to as the striking price, strike or exercise price) is the price at which the owner of an option can sell the underlying stock. Maximum risk 2124 is the maximum amount of money that can be lost using this option strategy. The user can select an option 3302 by clicking anywhere on the line with option data. The option data can then be sent to a trading buddy using the trading buddy button 1410. The type of strategy (e.g., Put Calendar Spread 3304) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 34:
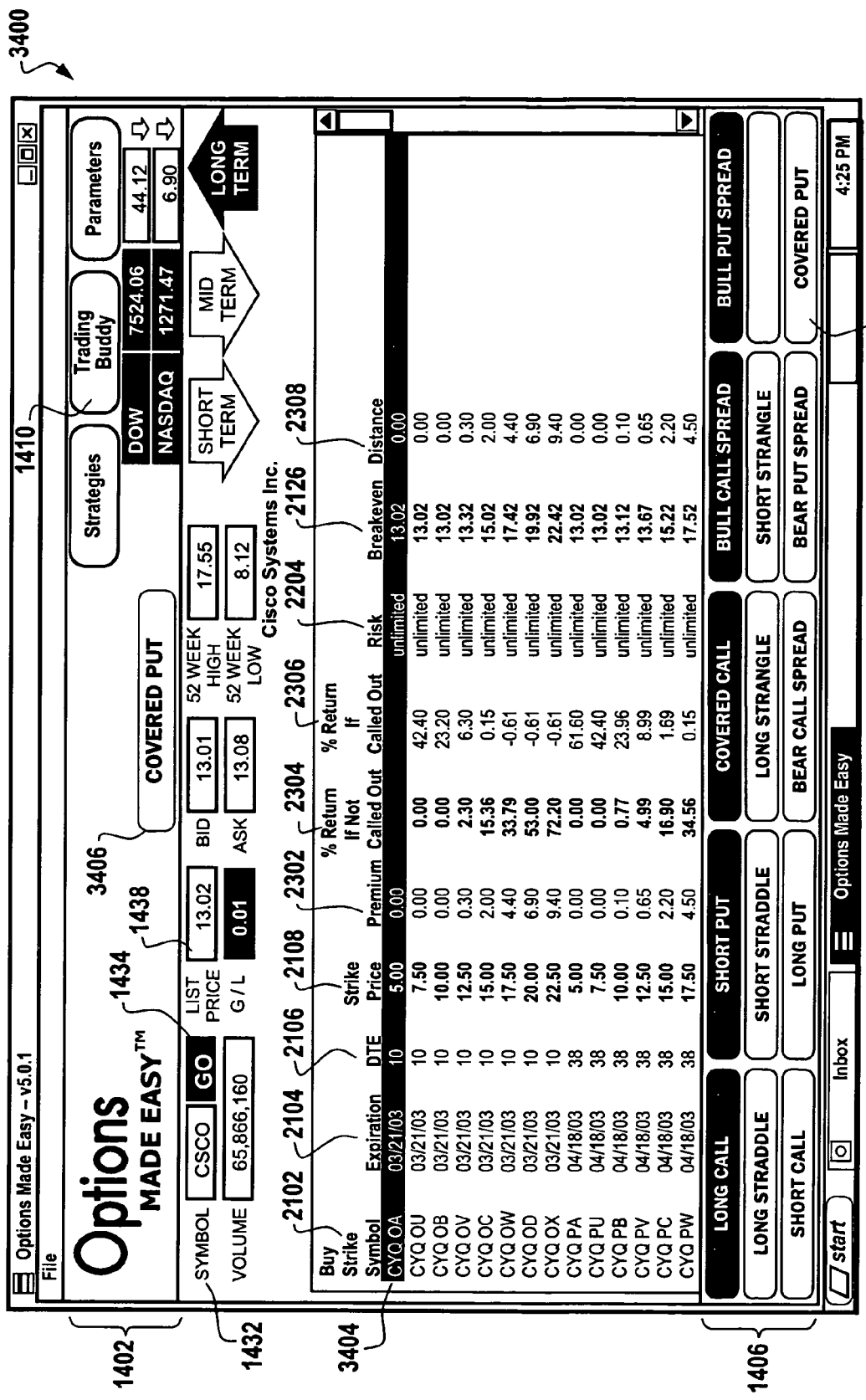

FIG. 34 is a strategy data screen 3400 for the Covered Put strategy, which is accessible via button 3402. A Covered Put is the writing of a put option against a sufficient amount of cash or T-bills. Screen 3400 displays the option symbol 2102, expiration date 2104, number of days until expiration ("DTE") 2106, strike price 2108, premium 2302, percent if not called out 2304, percent if called out 2306, risk 2204, break even price 2126 and distance 2308. The expiration date 2104 is the date on which the option and the right to exercise it cease to exist. The strike price 2108 (also referred to as the striking price, strike or exercise price) is the price at which the owner of an option can sell the underlying stock. The premium 2302 is the total price of the option (intrinsic value plus time value). The percent return if not called out 2304 (typically displayed in green if a gain and red if a loss) is the percent gain/loss made if the put is exercised ((Last Price 1438−(Strike Price 2108 +Premium 2302))/Last Price 1438). The percent return if called out 2306 (typically displayed in green if a gain and red if a loss) is the percent gain/loss made if the put is not exercised (Premium 2302/Last Price 1438). Risk 2204 is the amount of money that can be lost using this strategy. Break even 2126 is the stock price at which the option strategy results in neither a profit nor a loss. Distance 2308 is the difference between the last price 1438 and the break even price 2126). The user can select an option 3404 by clicking anywhere on the line with option data. The option data can then be sent to a trading buddy using the trading buddy button 1410. The type of strategy (e.g., Covered Put 3406) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 35:
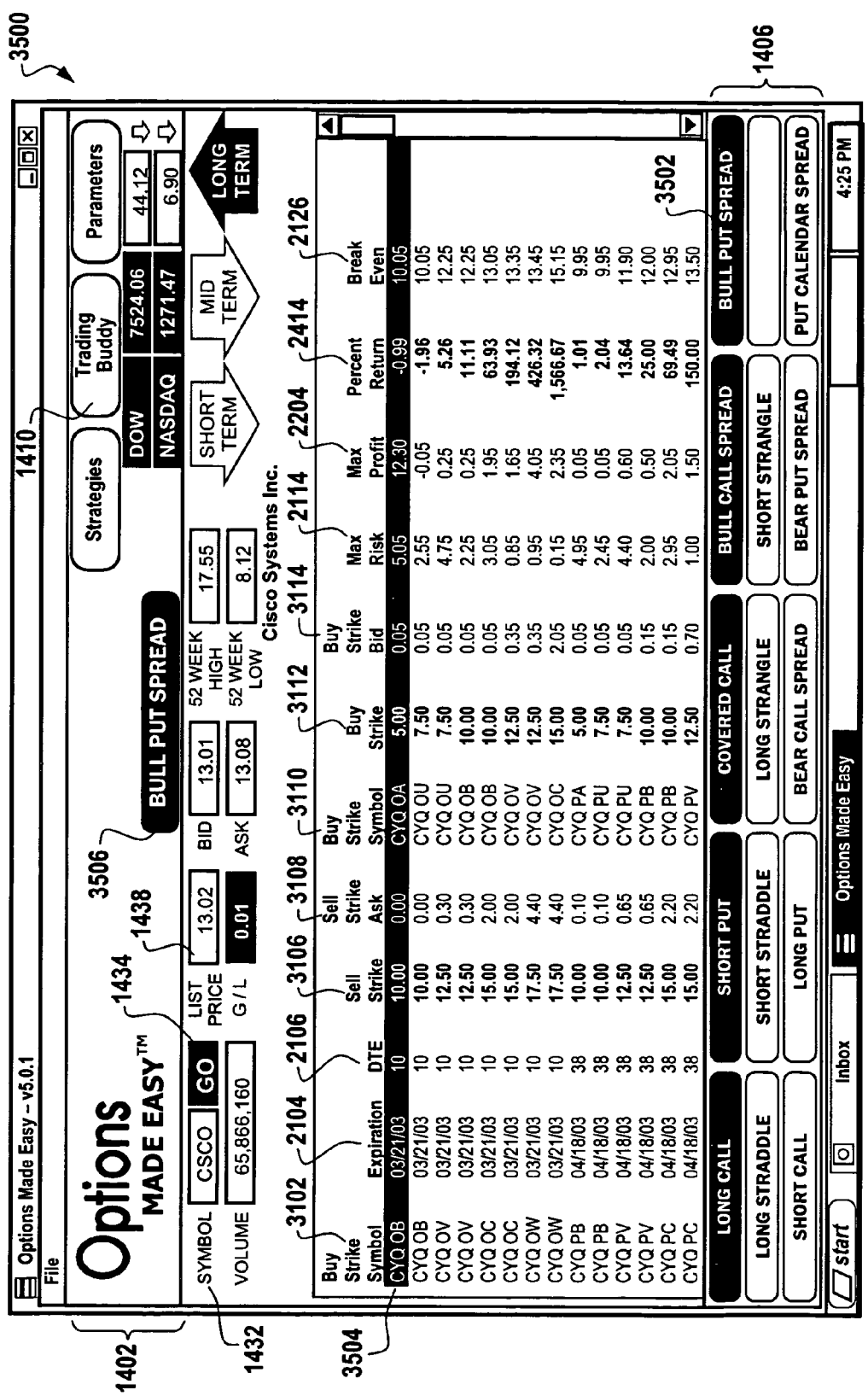

FIG. 35 is a strategy data screen 3500 for the Bull Put Spread strategy, which is accessible via button 3502. A Bull Put Spread is the simultaneous writing of one put option with a higher strike (sell strike price 3106) and the purchase of another put option with a lower strike price (buy strike price 3110) (e.g., writing one XYZ May 60 put and buying one XYZ May 55 put). Screen 3500 displays the buy strike symbol 3102 for the put to be written, expiration date 2104, number of days until expiration ("DTE") 2106, strike price 3106 for the put to be written, bidding price 3108 for the put to be written, option symbol 3110 for the put to be purchased, strike price 3112 for the put to be purchased, asking price 3114 for the put to be purchased, maximum risk 2124, maximum profit 2202, percent return 2414 and break even price 2126. The expiration date 2104 is the date on which both options and the right to exercise them cease to exist. The strike prices 3106 and 3112 (also referred to as the striking price, strike or exercise price) are the prices at which the owner of an option can sell the underlying stock. Maximum risk 2124 is the maximum amount of money that can be lost using this option strategy. Maximum profit 2202 (typically displayed in green if a gain and red if a loss) is the maximum amount of money that can be made using this option strategy. Percent return 2414 (typically displayed in green if a gain and red if a loss) is based on the maximum profit 2202 and the maximum risk 2124. Break even 2126 is the stock price at which the option strategy results in neither a profit nor a loss. The user can select an option 3504 by clicking anywhere on the line with option data. The option data can then be sent to a trading buddy using the trading buddy button 1410. The type of strategy (e.g., Bull Put Spread 3506) being displayed is shown in the header area 1402. Other strategies can be viewed by clicking on any of the strategy buttons in the footer area 1406. Moreover, the data being displayed can be updated by clicking the GO button 1434. The data can also be changed to a new stock by entering the new ticker symbol 1432 and clicking the GO button 1434.

Figure 36A:
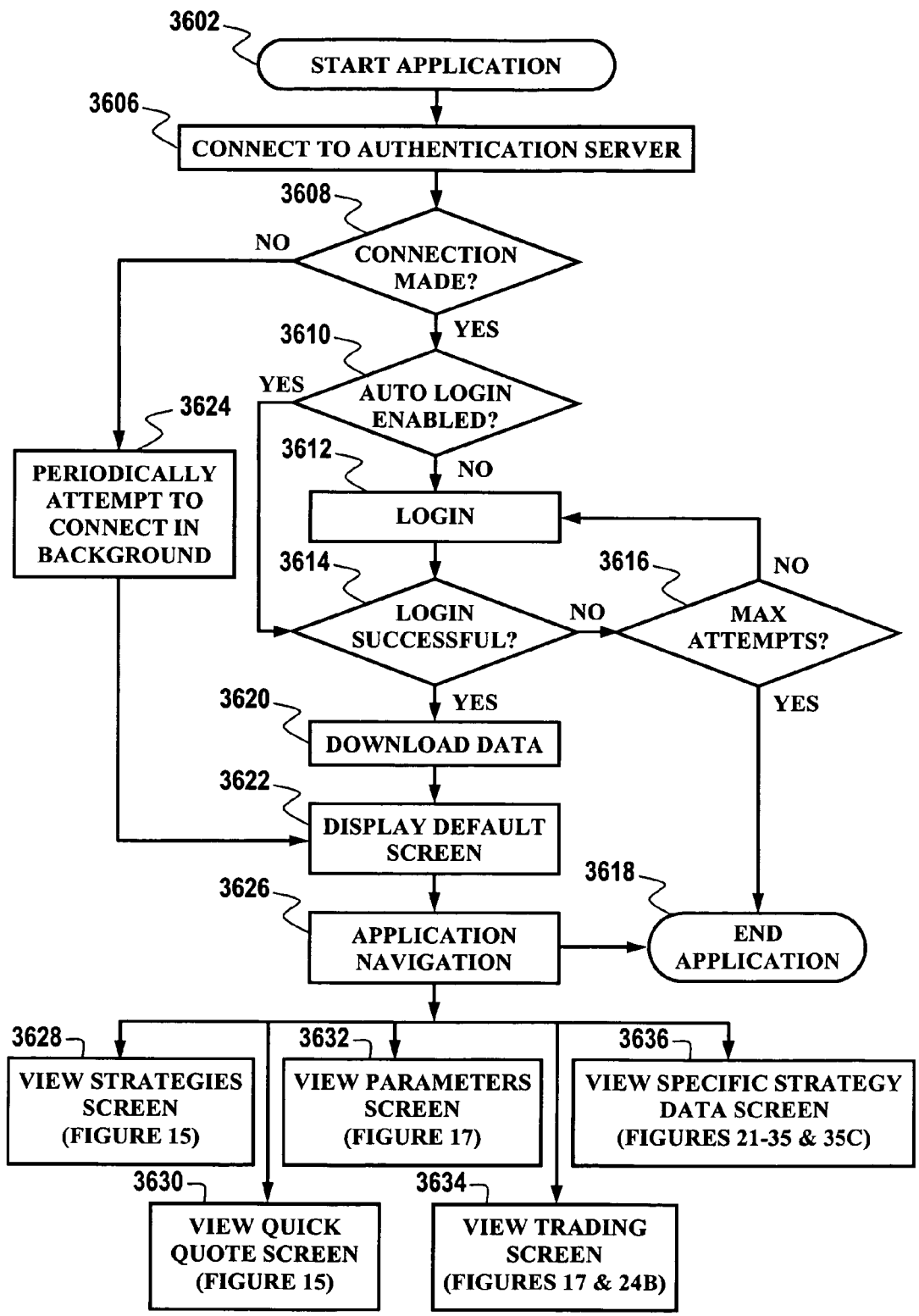
FIG. 36A is a flowchart illustrating the application start-up and processing flow in accordance with an options embodiment of the present invention.
Figure 36B:
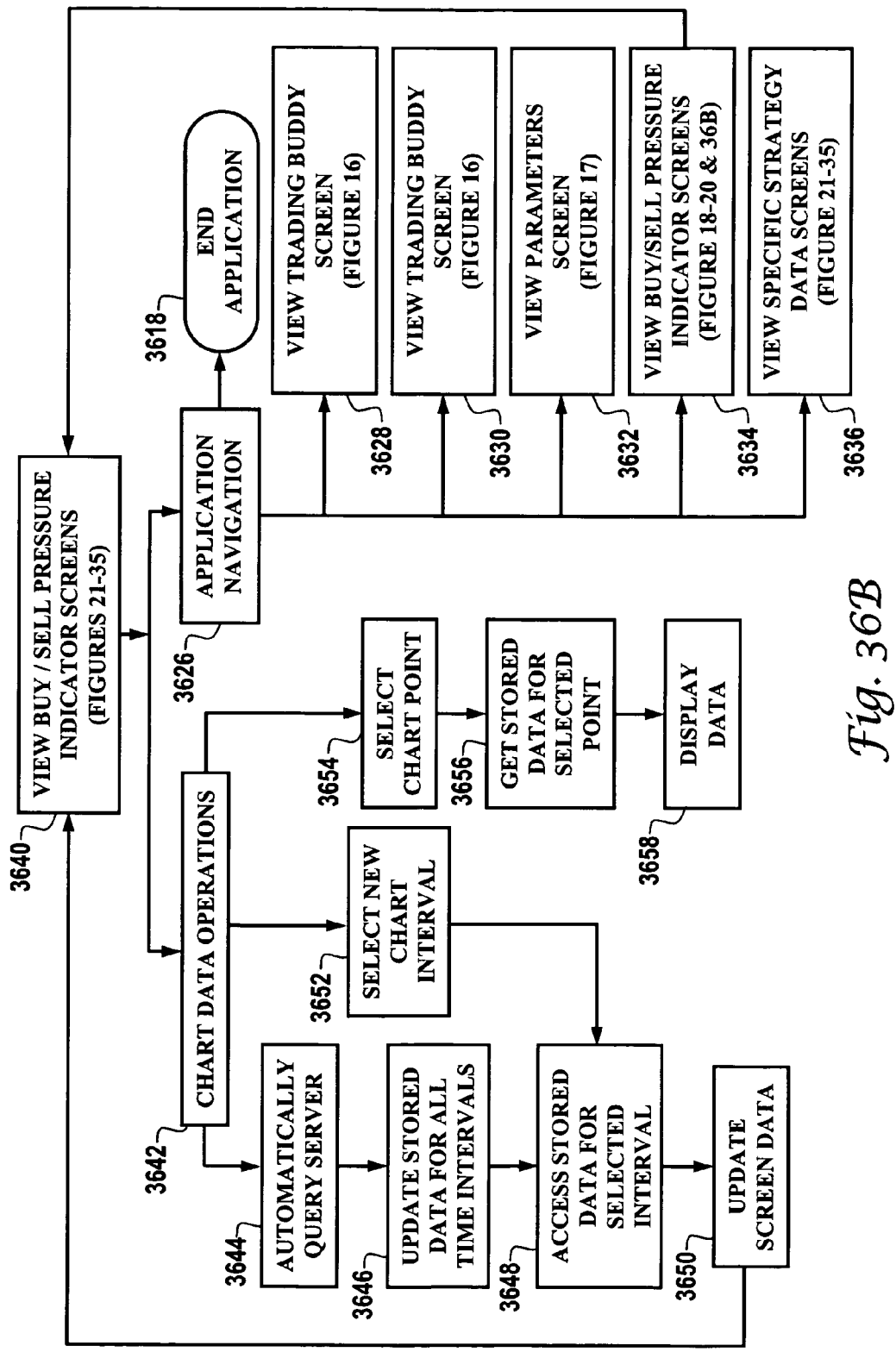
FIG. 36B is a flowchart illustrating the processing flow for the Buy/Sell Pressure Indicator Screens in accordance with an options embodiment of the present invention.
Figure 36C:
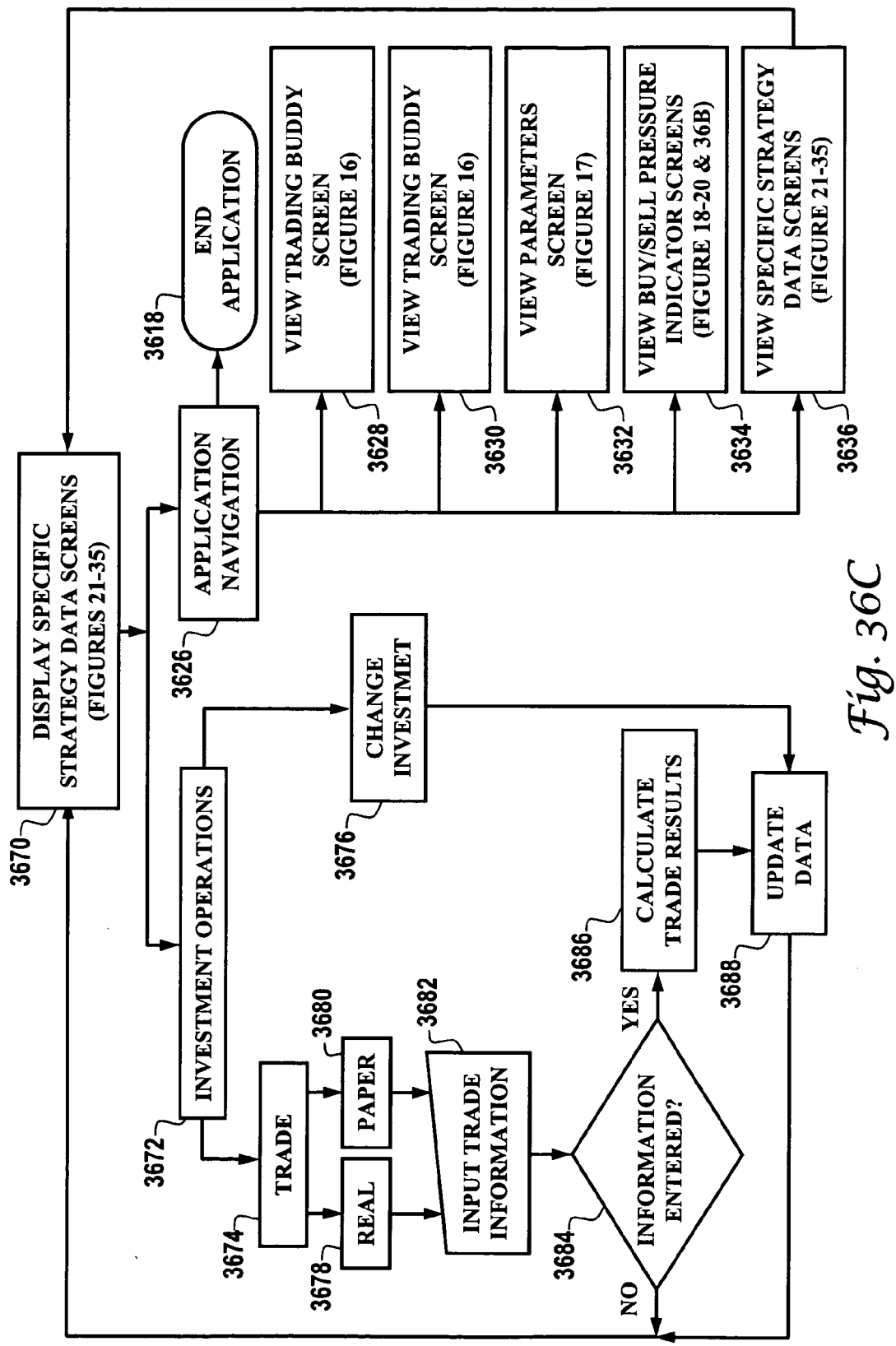
FIG. 36C is a flowchart illustrating the processing flow for the Specific Strategy Data Screen in accordance with an options embodiment of the present invention.

FIGS. 36A-36C display the processing flows for the options of screens FIGS. 14-35. Application Navigation 3626 is the same in each of the system screens. Selecting View Strategies Screen 3628 displays the screen shown in FIG. 15. Selecting Trading Buddy Screen 3630 displays the screen shown in FIG. 16. Selecting View Parameters Screen 3632 displays the screen shown in FIG. 17. Selecting View Buy/Sell Pressure Indicator Screens 3634 displays one of the screens shown in FIGS. 18-20 depending on the selection made by the investor, enabling its associated processing of FIG. 36B. Selecting View Specific Strategy Data Screens 3636 displays one of the screens shown in FIGS. 21-35 depending on the selection made by the investor, enabling the associated processing of FIG. 36C.

FIG. 36A focuses on the application start-up of this embodiment of the present invention. The present invention starts in block 3602 where the investor 150-160 (FIG. 1) connects to the authentication server (options market 120 FIG. 1) in block 3606. The specific servers that may be connected to and the details regarding the connection to be established are typically setup during the installation process of the software. If the connection is made, as determined in decision block 3608, and the auto login is not enabled, as determined in decision block 3610, the present invention prompts the investor to login in block 3612, which preferably supplies investment information updates in real-time or near-real-time. If the login is successful, as determined in decision block 3612, the application downloads investment information (data) in block 3620 and displays the Initial Screen (FIG. 14) in block 3622. If, however, the connection was not made, as determined in decision block 3608, the process will periodically attempt to connect to the authentication server in the background in block 3624 and displays the Initial Screen (FIG. 14) in block 3622. Thereafter, the investor is free to navigate through the application in block 3626. If, however, the auto login feature was enabled, as determined in decision block 3610, the investor's login information will be entered and the login will be automatically attempted, and if successful, as determined in decision block 3614, the investment information (data) will be downloaded in block 3620. If, however, the login was not successful, as determined in decision block 3614, and a maximum number of login attempts have not been made, as determined in decision block 3616, the investor is prompted to reenter the login information in block 3612. If, however, the maximum number of login attempts has been made, as determined in decision block 3616, the application ends in block 3618.

The processing of the View Buy/Sell Pressure Indicator Screens 3634 (See FIGS. 18-20) is shown in FIG. 36B. The Buy/Sell Pressure Indicator Screens 1800 (FIG. 18) is displayed in block 3640. As previously described, the investor can navigate through the application via block 3626 to the various screens 3628, 3630, 3632, 3634, 3636 or end the application in block 3618. The investor can also modify the charts displayed on the Buy/Sell Pressure Indicator Screens 1800 (FIG. 18) using the chart data operations in block 3642. More specifically, the investor can update the data in block 3644, select a new chart interval in block 3652 or select a chart point in block 3654. The system will periodically update the data by automatically querying the server in block 3644 and updating the stored data for all time intervals in block 3646. The stored data is then accessed for the selected interval in block 3648, the screen data is updated in block 3650 and the Buy/Sell Pressure Indicator Screen is displayed in block 3640. The investor may select a new chart interval in block 3652, whereby the system will access the stored data for the selected interval in block 3648, update the screen data in block 3640 and display the Buy/Sell Pressure Indicator Screen in block 3640. The investor can also select a chart point in block 3652, whereby the system will get the stored data for the selected point in block 3656 and display the data for the selected point in block 3658.

The processing of the View Specific Strategy Data Screens 3636 (See FIGS. 21-35) is shown in FIG. 36C. The Specific Strategy Data Screen (FIG. 21-35) is displayed in block 3670. As previously described, the investor can navigate through the application via block 3626 to the various screens 3628, 3630, 3632, 3634, 3636 or end the application in block 3618. The investor can also view trading strategies and trade using the investment operations in block 3672. More specifically, the investor can initiate a trade in block 3674 or change the investment being displayed in block 3676. To initiate a trade in block 3674, the investor selects either a real trade in block 3678 or a paper trade in block 3680. The process flows for the real trade 3648 and paper trade 3650 are identical except for the data used and the calculations performed. These calculations were previously described above. In order to perform the calculations, the system must have trade information with which to operate. Therefore, the investor has to supply trade information in block 3682. If the investor has not input trade information, as determined in decision block 3684, the system continues to display the current Specific Strategy Data Screen in block 3670. If, however, the investor has entered the trade information, the system calculates the trade results in block 3686, updates the data in block 3688 and displays the Specific Strategy Data Screen in block 3670. If the investor wants to change the investment being displayed in block 3676, the investor enters the new investment in block 3676 and the system updates the data in block 36882 and displays the Specific Strategy Data Screen in block 3670.

The present invention can be implemented on a computer having the following specifications:

| | |
|---|---|
| Operating System: | Windows 98/ME/2000/XP/NT 4.0 (Service Pack 3) |
| RAM: | Minimum - 64 MB |
| | Recommended - 128 MB |
| Processor: | Minimum - 333 MHz Pentium II |
| | Recommended - 500 MHz Pentium III or compatible |
| CD-Rom | |
| Available Hard Disk Space: | 25 MB |
| Internet Connection: | DSL, Cable modem, T1, or ISDN is the preferred connection. 56K modem will work, but a connect speed of over 49K is recommended. You may experience slow throughput and updates with a connect speed lower then 49K. |
| Data Feed: | Level I or Level II |

It will be apparent that other programs are readily devised to create charts of the type described and that some commercially available charting programs can be adapted to display only the charts and not the trade indicators. It is not intended that the invention be limited to the particular format shown in FIGS. 1 through 36. As described above, Applicant's invention comprises the development of indicators and their display in such a manner that traders can anticipate price trends and trades using the cross over method signaling buys and sells opportunities.

What is claimed is:

1. A computerized method for determining and displaying trading trends comprising the steps of:

obtaining market information for an investment underlying one or more options for a time period, wherein the market information comprises at least (a) a first set of market data for the underlying investment based on a series of consecutive first time intervals within the time period comprising a first opening price and a first closing price for each consecutive first time interval, (b) a second set of market data for the underlying investment based on a series of consecutive second time intervals within the time period comprising a second opening price and a second closing price for each consecutive second time interval, and (c) the first time interval is not equal to the second time interval;

calculating a first opening price trend for the first time intervals using a market trend indicator and the first opening prices for the underlying investment, and a second opening price trend for the second time intervals using the market trend indicator and the second opening prices for the underlying investment;

calculating a first closing price trend for the first time intervals using the market trend indicator and the first closing prices for the underlying investment, and a second closing price trend for the second time intervals using the market trend indicator and the second closing prices for the underlying investment;

simultaneously displaying in real-time at least a first visual favorable/unfavorable trade indicator for the first time intervals and a second visual favorable/unfavorable trade indicator for the second time intervals, wherein the first time intervals are not equal to the second time intervals;

wherein the first visual favorable/unfavorable trade indicator for the first time intervals is based on a comparison of the first opening price trend to the first closing price trend for the underlying investment, wherein the first visual favorable/unfavorable trade indicator is a first color whenever the first closing price trend is greater than the first opening price trend and the first visual favorable/unfavorable trade indicator is a second color whenever the first closing price trend is lower than the first opening price trend;

wherein the second visual favorable/unfavorable trade indicator for the second time intervals is based on a comparison of the second opening price trend to the second closing price trend for the underlying investment, wherein the second visual favorable/unfavorable trade indicator is the first color whenever the second closing price trend is greater than the second opening price trend and the second visual favorable/unfavorable trade indicator is the second color whenever the second closing price trend is lower than the second opening price trend;

wherein the first and second visual favorable/unfavorable trade indicators signal whether it will be favorable or unfavorable to execute a trade involving one of the options for the underlying investment for the respective time intervals; and wherein the forgoing steps are executed by a computer.

2. The method as recited in claim 1, wherein the first color is green.

3. The method as recited in claim 1, wherein the second color is red.

4. The method as recited in claim 1, wherein the first visual favorable/unfavorable trade indicator displays the first time interval and the second visual favorable/unfavorable trade indicator displays the second time interval.

5. The method as recited in claim 1, further comprising the step of displaying the first opening price trend as a first line and the first closing price trend as a second line in a graph.

6. The method as recited in claim 5, further comprising the step of displaying a list of information about a point selected on either the first line or the second line.

7. The method as recited in claim 1, wherein the market trend indicator comprises one or more regression algorithms selected from: stochastics, relative strength, directional movement, commodity channel, simple average, exponential average, weighted average, MACD (simple), MACD (exponential), momentum/ROC, midrange, William's % R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence- divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

8. The method as recited in claim 1, wherein the first opening price trend is calculated without using the first opening price from the most recent first time interval within the time period.

9. The method as recited in claim 1, further comprising the steps of:

selecting a market information source; and communicably connecting to the market information source.

10. The method as recited in claim 1, further comprising the step of executing a trade involving one of the options for the underlying investment.

11. The method as recited in claim 1, further comprising the step of simulating an execution of a trade involving one of the options for the underlying investment.

12. The method as recited in claim 1, further comprising the step of calculating a potential tax liability for an execution of a trade involving one of the options for the underlying investment.

13. The method as recited in claim 1, further comprising the step of searching for one or more investment trading opportunities based on one or more search criteria.

14. The method as recited in claim 1, further comprising the step of selecting the first time interval or the second time interval.

15. The method as recited in claim 1, wherein the first time interval is a first preset time interval and the second time interval is a second preset time interval based on a user profile.

16. The method as recited in claim 1, further comprising the step of repeating the steps of obtaining the market information, calculating the opening price trends and the closing price trends, and displaying the visual favorable/unfavorable trade indicators for a set of different time intervals.

17. The method as recited in claim 16, wherein the set of different time intervals comprises daily, weekly and monthly intervals.

18. The method as recited in claim 1, further comprising the step of repeating the steps of obtaining the market information, calculating the opening price trends and the closing price trends, and displaying the visual favorable/unfavorable trade indicators for two or more investments.

19. The method as recited in claim 1, further comprising the step of updating the opening prices the closing prices, the opening price trends, the closing price trends and the visual favorable/unfavorable trade indicators.

20. The method as recited in claim 19, further comprising the step of signaling a user whenever any of the visual favorable/unfavorable trade indicators change.

21. A computer program embodied in a computer readable medium that is executed by a computer for determining and displaying trading trends comprising:
 obtaining market information for an investment underlying one or more options for a time period, wherein the market information comprises at least (a) a first set of market data for the underlying investment based on a series of consecutive first time intervals within the time period comprising a first opening price and a first closing price for each consecutive first time interval, (b) a second set of market data for the underlying investment based on a series of consecutive second time intervals within the time period comprising a second opening price and a second closing price for each consecutive second time interval, and (c) the first time interval is not equal to the second time interval;
 calculating a first opening price trend for the first time intervals using a market trend indicator and the first opening prices for the underlying investment, and a second opening price trend for the second time intervals using the market trend indicator and the second opening prices for the underlying investment;
 calculating a first closing price trend for the first time intervals using the market trend indicator and the first closing prices for the underlying investment, and a second closing price trend for the second time intervals using the market trend indicator and the second closing prices for the underlying investment;
 simultaneously displaying in real-time at least a first visual favorable/unfavorable trade indicator for the first time intervals and a second visual favorable/unfavorable trade indicator for the second time intervals, wherein the first time intervals are not equal to the second time intervals;
 wherein the first visual favorable/unfavorable trade indicator for the first time intervals is based on a comparison of the first opening price trend to the first closing price trend for the underlying investment, wherein the first visual favorable/unfavorable trade indicator is a first color whenever the first closing price trend is greater than the first opening price trend and the first visual favorable/unfavorable trade indicator is a second color whenever the first closing price trend is lower than the first opening price trend;
 wherein the second visual favorable/unfavorable trade indicator for the second time intervals is based on a comparison of the second opening price trend to the second closing price trend for the underlying investment, wherein the second visual favorable/unfavorable trade indicator is the first color whenever the second closing price trend is greater than the second opening price trend and the second visual favorable/unfavorable trade indicator is the second color whenever the second closing price trend is lower than the second opening price trend; and
 wherein the first and second visual favorable/unfavorable trade indicators signal whether it will be favorable or unfavorable to execute a trade involving one of the options for the underlying investment for the respective time intervals.

22. The computer program as recited in claim 21, further comprising displaying the first opening price trend as a first line and the first closing price trend as a second line in a graph.

23. The computer program as recited in claim 22, further comprising displaying a list of information about a point selected on either the first line or the second line.

24. The computer program as recited in claim 21, wherein the market trend indicator comprises one or more regression algorithms selected from: stochastics, relative strength, directional movement, commodity channel, simple average, exponential average, weighted average, MACD (simple), MACD (exponential), momentum/ROC, midrange, William's % R, parabolic stop, volatility stop, trailing stop, high low stop, Bollinger Bands, Keltner Channel, uniform channel, regression channel, swing lines, cycle forecast, on balance volume, overlay chart, point & figure, moving average, moving linear regression, upper envelope, lower envelope, % K, % D, % D slow, % D averaged, % R, RSI, momentum, acceleration, moving average oscillator, moving average momentum, moving average convergence-divergence oscillator, moving average convergence-divergence, MACD signal line, commodity channel index, rate of change in prices, on balance volume variance, standard deviation, volatility ratio, volatility, skew, kurtosis, Williams Accumulated Distribution, Arm's Ease of Movement, plus directional indicator, minus directional indicator, directional movement and average directional movement.

25. The computer program as recited in claim 21, further comprising:
 selecting a market information source; and
 communicably connecting to the market information source.

26. The computer program as recited in claim 21, further comprising executing a trade involving one of the options for the underlying investment.

27. The computer program as recited in claim 21, further comprising simulating an execution of a trade involving one of the options for the underlying investment.

28. The computer program as recited in claim 21, further comprising calculating a potential tax liability for an execution of a trade involving one of the options for the underlying investment.

29. The computer program as recited in claim 21, further comprising searching for one or more investment trading opportunities based on one or more search criteria.

30. The computer program as recited in claim 21, further comprising selecting the first time interval or the second time interval.

31. The computer program as recited in claim 21, further comprising repeating the steps of obtaining the market information, calculating the opening price trends and the closing price trends, and displaying the visual favorable/unfavorable trade indicators for a set of different time intervals.

32. The computer program as recited in claim 21, further comprising repeating the steps of obtaining the market information, calculating the opening price trends and the closing price trends, and displaying the visual favorable/unfavorable trade indicators for two or more investments.

33. The computer program as recited in claim 21 further comprising updating the opening prices, the closing prices, the opening price trends, the closing price trends and the visual favorable/unfavorable trade indicators.

34. The computer program as recited in claim 33 further comprising signaling a user whenever any of the visual favorable/unfavorable trade indicators change.

35. An apparatus for determining and displaying trading trends comprising:
- a computer communicably connected to a market information source;
- a display communicably connected to the computer; and
- the computer (1) obtaining market information for an investment underlying one or more options-for a time period, wherein the market information comprises at least (a) a first set of market data for the underlying investment based on a series of consecutive first time intervals within the time period comprising a first opening price and a first closing price for each consecutive first time interval, (b) a second set of market data for the underlying investment based on a series of consecutive second time intervals within the time period comprising a second opening price and a second closing price for each consecutive second time interval, and (c) the first time interval is not equal to the second time interval, (2) calculating a first opening price trend for the first time intervals using a market trend indicator and the first opening prices for the underlying investment, and a second opening price trend for the second time intervals using the market trend indicator and the second opening prices for the underlying investment, (3) calculating a first closing price trend for the first time intervals using the market trend indicator and the first closing prices for the underlying investment, and a second closing price trend for the second time intervals using the market trend indicator and the second closing prices for the underlying investment, and (4) simultaneously displaying in real-time at least a first visual favorable/unfavorable trade indicator for the first time intervals and a second visual favorable/unfavorable trade indicator for the second time intervals, wherein the first time intervals are not equal to the second time intervals and the first visual favorable/unfavorable trade indicator for the first time intervals is based on a comparison of the first opening price trend to the first closing price trend for the underlying investment, wherein the first visual favorable/unfavorable trade indicator is a first color whenever the first closing price trend is greater than the first opening price trend and the first visual favorable/unfavorable trade indicator is a second color whenever the first closing price trend is lower than the first opening price trend, the second visual favorable/unfavorable trade indicator for the second time intervals is based on a comparison of the second opening price trend to the second closing price trend for the underlying investment, wherein the second visual favorable/unfavorable trade indicator is the first color whenever the second closing price trend is greater than the second opening price trend and the second visual favorable/unfavorable trade indicator is the second color whenever the second closing price trend is lower than the second opening price trend, and the first and second visual favorable/unfavorable trade indicators signal whether it will be favorable or unfavorable to execute a trade involving one of the options for the underlying investment for the respective time intervals.

* * * * *